US011387772B2

(12) United States Patent
Tordo

(10) Patent No.: US 11,387,772 B2
(45) Date of Patent: Jul. 12, 2022

(54) SOLAR TRACKER WITH KINEMATIC COUPLING

(71) Applicant: NEXANS SOLAR TECHNOLOGIES, Châteauneuf-le-Rouge (FR)

(72) Inventor: Jérome Marc Tordo, Aix-en-Provence (FR)

(73) Assignee: NEXANS, Courbevoie (FR)

( * ) Notice: Subject to any disclaimer, the term of this patent is extended or adjusted under 35 U.S.C. 154(b) by 176 days.

(21) Appl. No.: 16/325,642

(22) PCT Filed: Aug. 16, 2017

(86) PCT No.: PCT/EP2017/070734
§ 371 (c)(1),
(2) Date: Feb. 14, 2019

(87) PCT Pub. No.: WO2018/033561
PCT Pub. Date: Feb. 22, 2018

(65) Prior Publication Data
US 2019/0199277 A1  Jun. 27, 2019

(30) Foreign Application Priority Data

Aug. 17, 2016  (FR) ........................................ 1601234
Feb. 17, 2017  (EP) ..................................... 17305176

(51) Int. Cl.
*H02S 20/32* (2014.01)
*F24S 25/13* (2018.01)
(Continued)

(52) U.S. Cl.
CPC ............ *H02S 20/32* (2014.12); *F16B 7/0406* (2013.01); *F24S 25/13* (2018.05); *F24S 25/60* (2018.05);
(Continued)

(58) Field of Classification Search
CPC .......... H02S 20/10; H02S 20/30; H02S 20/32; H02S 30/10; H02S 20/20; F24S 2025/015;
(Continued)

(56) References Cited

U.S. PATENT DOCUMENTS

2004/0238025 A1  12/2004 Shingleton
2008/0230047 A1   9/2008 Shugar et al.
(Continued)

FOREIGN PATENT DOCUMENTS

CL         201900403      2/2019
DE     10 2006 027152   12/2007
(Continued)

OTHER PUBLICATIONS

English machine translation of Cortec (DE 20 2014 100 397 U1) provided by the EPO website. All Pages. 2020. (Year: 2020).*
(Continued)

*Primary Examiner* — Daniel P Malley, Jr.
(74) *Attorney, Agent, or Firm* — Sofer & Haroun, LLP

(57) ABSTRACT

The present invention concerns a solar tracker (1000) comprising at least:
  A drive module (1100) comprising at least one mobile device comprising at least:
  At least one additional module (1200) configured to be driven by the drive module (1100), each additional module (1200) comprising at least one additional mobile device comprising at least:
characterized in that:
  Said solar tracker (1000) comprises at least one kinematic device (1300) for coupling said drive module (1100) and said additional module (1200);
  Said kinematic coupling device (1300) comprising at least one first part (1330) and at least one second part (1340),
(Continued)

said first part (1330) being entirely supported by the mobile device of the drive module (1100) and said second part (1340) being entirely supported by the additional mobile device of the additional module (1200).

14 Claims, 30 Drawing Sheets

(51) Int. Cl.
*F24S 30/425* (2018.01)
*F24S 25/70* (2018.01)
*F24S 25/60* (2018.01)
*F16B 7/04* (2006.01)
*F24S 30/00* (2018.01)

(52) U.S. Cl.
CPC ............ *F24S 25/70* (2018.05); *F24S 30/425* (2018.05); *F24S 2030/11* (2018.05); *F24S 2030/12* (2018.05); *F24S 2030/131* (2018.05); *F24S 2030/136* (2018.05); *Y02E 10/47* (2013.01)

(58) Field of Classification Search
CPC ........... F24S 2025/019; F24S 2030/134; F24S 2030/136; F24S 25/12; F24S 25/13; F24S 25/16; F24S 25/20; F24S 25/35; F24S 25/37; F24S 25/63; F24S 25/65; F24S 25/67; F24S 25/70; F24S 2030/11
See application file for complete search history.

(56) References Cited

U.S. PATENT DOCUMENTS

| | | |
|---|---|---|
| 2008/0308091 A1 | 12/2008 | Corio |
| 2014/0054433 A1 | 2/2014 | Reisch et al. |
| 2014/0069483 A1 | 3/2014 | Wolter et al. |
| 2016/0013751 A1 | 1/2016 | Michotte De Welle et al. |
| 2016/0020724 A1 | 1/2016 | Remy et al. |
| 2016/0365830 A1* | 12/2016 | Bailey ..................... H02S 20/32 |
| 2018/0091088 A1* | 3/2018 | Barton .................. F16H 19/001 |

FOREIGN PATENT DOCUMENTS

| | | | |
|---|---|---|---|
| DE | 202014100397 U1 * | 2/2015 | ............ F24S 30/425 |
| EP | 2154449 | 2/2010 | |
| EP | 2 385 327 | 11/2011 | |
| WO | 2005003647 | 1/2005 | |
| WO | 2008/058411 | 5/2008 | |
| WO | 2009-009915 | 1/2009 | |
| WO | 2014118395 | 8/2014 | |
| WO | 2016094864 | 6/2016 | |

OTHER PUBLICATIONS

Chilean Office Action dated Jan. 20, 2020.
French Search Report dated Apr. 7, 2017.
EU search Report dated Apr. 20, 2017.
French Search Report dated Mar. 21, 2017.
International Search Report dated Oct. 25, 2017.
SN Office Action dated Sep. 16, 2021.

* cited by examiner

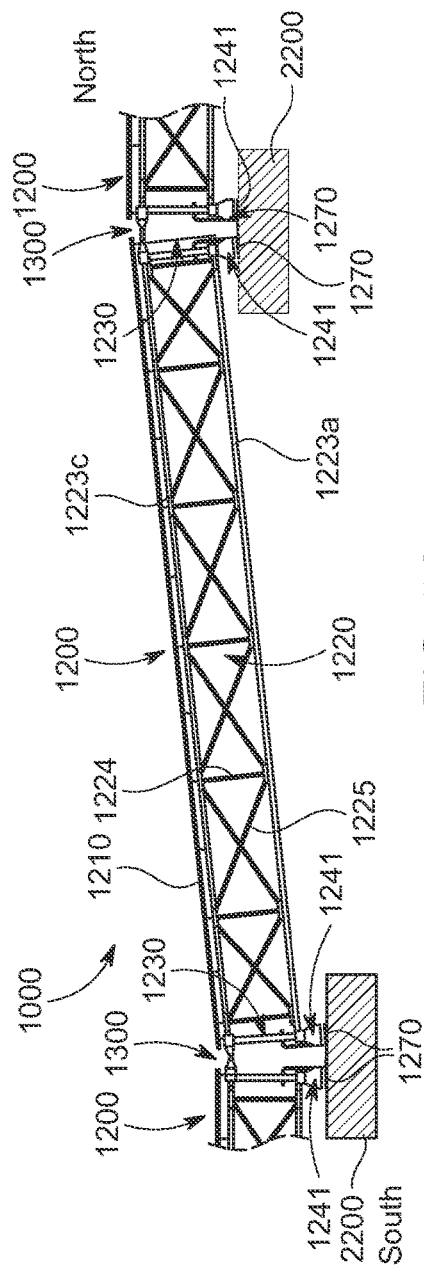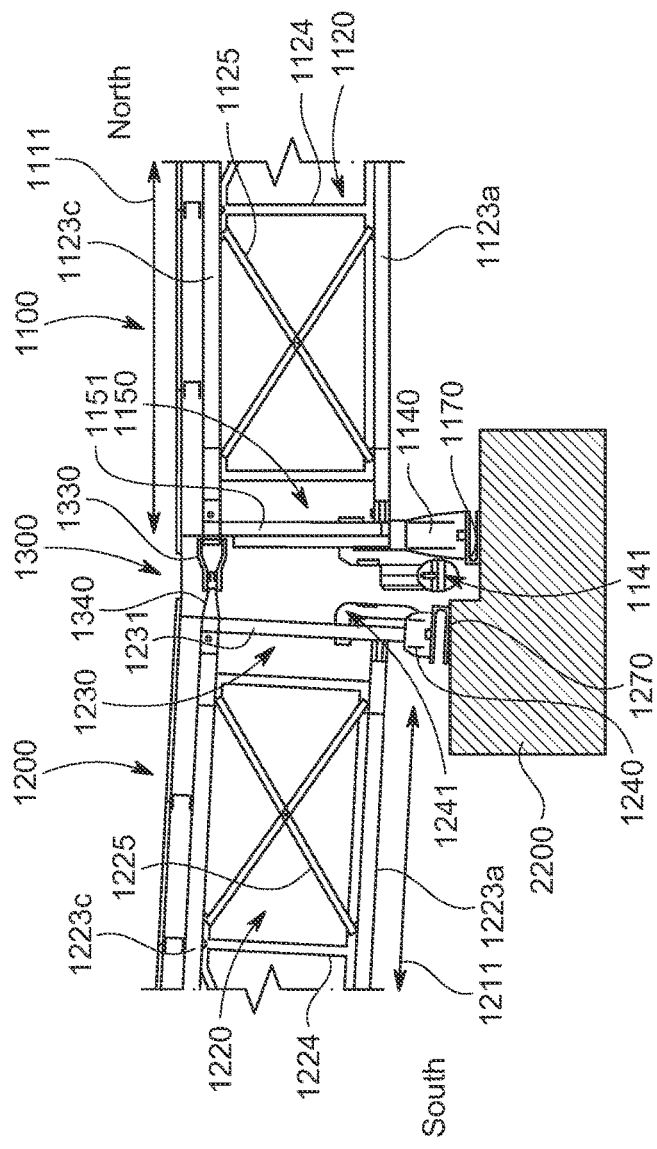
FIG. 5A
FIG. 5B

SOLAR TRACKER WITH KINEMATIC COUPLING

Related Applications:

This application is a National Phase Application of PCT/EP2017/070734 filed on Aug. 16, 2017, which in turn claims the benefit of priority from French Patent Application No. 16 01234, filed on Aug. 17, 2016, and European Patent Application No. 17 305 176.4, Feb. 17, 2017, the entirety of which are incorporated herein by reference.

TECHNICAL FIELD OF THE INVENTION

The present invention concerns the field of solar energy in general, and more particularly the field of solar trackers. It will find an advantageous application to solar fields for example.

PRIOR ART

Solar energy is today an energy at the core of numerous technological innovations. At a time when energy requirements are at their highest, numerous states worldwide are tending toward the use of this renewable energy on a large scale.

Whether by means of photovoltaic panels or solar reflectors, numerous problems are encountered by these solar installations.

One of the principal problematics resides in the alignment and the adjustment of the tables that carry the solar energy collector devices.

Thus it is necessary to align these tables on a North/South axis and to motorize them in order for the movement of the sun in the sky to be tracked by the tables, in order to maximize the solar energy collected.

However, a major obstacle arises for this type of installation, namely the terrain on which they are constructed. Indeed, it is difficult to find a perfectly flat terrain in order to dispose thereon lines of tables over very long distances. Now, faced with the necessity of optimizing the installations, it is necessary to group them.

Moreover, in the context of reducing costs and imparting synchronicity to the movements of the tables, the same solar tracking drive system is generally provided for a plurality of tables in the same line conforming to a perfect alignment and therefore a flat terrain.

In order to satisfy the alignment criterion, solar field terrains are managed and terraced, resulting in high supplemental installation costs and time, thereby reducing the motivation on some states to invest in this type of technology.

The current solutions for compensating the irregularities of the ground are therefore based primarily on structuring the terrain or adjusting the alignment of the lines of reflectors.

Faced with this problematic the current solutions therefore remain very costly and very complex.

The present invention aims to solve, at least in part, the problematics referred to above.

SUMMARY OF THE INVENTION

The present invention concerns a solar tracker comprising at least:
A drive module comprising at least:
  a mobile device comprising at least:
    a table extending longitudinally in a principal direction and comprising at least one solar energy collector device;
    a structure, preferably a lattice structure, extending longitudinally in said principal direction and supporting said table;
    a first support arch of the lattice structure, preferably of elliptical shape;
  a first ground support configured to support said first support arch;
  a kinematic device for driving rotation of said mobile device relative to the first ground support.

The solar tracked preferably comprises at least one additional module configured to be driven by the drive module, each additional module comprising at least:
  an additional mobile device comprising at least:
    an additional table extending longitudinally in an additional direction comprising at least one additional solar energy collector device;
    an additional structure, preferably a lattice structure, extending longitudinally in said additional direction and supporting said additional table;
    an additional support arch, preferably of elliptical shape, supporting said additional lattice structure;
  an additional ground support configured to support said additional support arch.

In one embodiment said first ground support comprises at least one and preferably a plurality of rollers rotatably, preferably freely rotatably, mounted and configured to support the first support arch, the first support arch extending primarily from the first ground support to the lattice structure.

In one embodiment said additional ground support comprises at least one and preferably a plurality of additional rollers rotatably, preferably freely rotatably, mounted and configured to support the additional support arch, the additional support arch extending primarily from the additional ground support to the additional lattice structure.

The rollers preferably support on their own the mobile device and the additional mobile device.

In one embodiment said rotation kinematic drive device is configured to drive, preferably directly, the first support arch with a first kinematic movement relative to said first ground support about at least one principal rotation axis.

In one embodiment said additional ground support comprises an additional rotation guide device configured to guide, preferably directly, the additional support arch in a second kinematic movement relative to said additional ground support about at least one additional rotation axis possibly different from said principal rotation axis.

In one embodiment said solar tracker comprises at least one kinematic device for coupling said drive module with said additional module, configured so that the second kinematic movement is a function of the first kinematic movement.

In one embodiment said kinematic coupling device comprises at least one first part and at least one second part, said first part being entirely supported by the mobile device of the drive module and said second part being entirely supported by the additional mobile device of the additional module.

In one embodiment the first and second parts are adapted to cooperate so as:
  to drive the additional mobile device in rotation about the additional rotation axis when the mobile device of the drive module is driven in rotation by the kinematic drive device about the principal rotation axis, to allow relative movement in translation of said mobile device of the drive module and said additional mobile device of the additional module the one relative to the other.

The present invention therefore enables production of a solar tracker that is able to adapt on the one hand to static irregularities of the ground and on the other hand to dynamic irregularities of the ground.

Indeed, the tracker according to the present invention uses a single motorized drive for a plurality of tables of the same line for transmission of the kinematic movement through the intermediary of at least one kinematic coupling device configured to adapt to at least some static and dynamic irregularities.

The kinematic coupling device therefore transmits the rotation movement of a first table to an additional table even when their respective rotation axes are not colinear or even coplanar.

Moreover, the present invention enables exact or close reproduction of the movement of the first table by the additional table via this kinematic coupling device.

The degrees of freedom of the kinematic coupling device enable the tracker of the present invention to adapt to dynamic variations of irregularities of the ground and also to thermal expansion and contraction to which the structure of the solar tracker is subjected.

In one embodiment, said first support arch and said second support arch are configured to support said lattice structure. In one nonlimiting embodiment, said first support arch and said second support arch are configured to support said lattice structure on their own.

The first kinematic movement is a rotation movement, preferably about an axis parallel to said principal direction of said table of the drive module.

The second kinematic movement is a rotation movement, preferably about an axis parallel to said additional direction of said table of the additional module.

The arches of the mobile device and the additional mobile device are contained in planes respectively perpendicular to the principal direction and to the additional direction.

The arches of the mobile device and the additional mobile device are contained in planes respectively perpendicular to the principal rotation axis and the additional rotation axis.

In one embodiment, the center of rotation of the first and second arches passes through the principal rotation axis.

The principal rotation axis advantageously passes through the centers of the ellipses that the first and second support arches form.

In one embodiment, the additional rotation axis passes through the center of rotation of the additional support arch.

The additional rotation axis advantageously passes through the center of the ellipse that the additional support arch forms.

By providing a coupling device carried entirely by the mobile devices of two adjacent modules, the invention makes it possible to dispense with additional structures to be fixed to the ground in order to provide transmission of movement between these two movements.

Thus the invention provides an effective and robust solution at limited cost for effecting accurate tracking of the sun even on terrain that is not perfectly flat.

In another aspect, the present invention relates to a solar field comprising a plurality of solar trackers according to the present invention.

In another aspect, the present invention relates to a solar power plant comprising at least one solar field according to the present invention.

BRIEF DESCRIPTION OF THE FIGURES

The aims, objects, features and advantages of the invention will emerge better from the detailed description of embodiments thereof illustrated by the following accompanying drawings in which:

FIG. 2a is a perspective view of a solar tracker, FIG. 2b a side view of the solar tracker showing the variations of level present, and FIG. 2c a view from above of the same solar tracker.

FIGS. 5a and 5b show an application of a first embodiment of the present invention.

FIG. 14c shows an off-axis situation.

FIG. 22a shows a lattice structure according to this fourth embodiment of the present invention.

Figure 1:
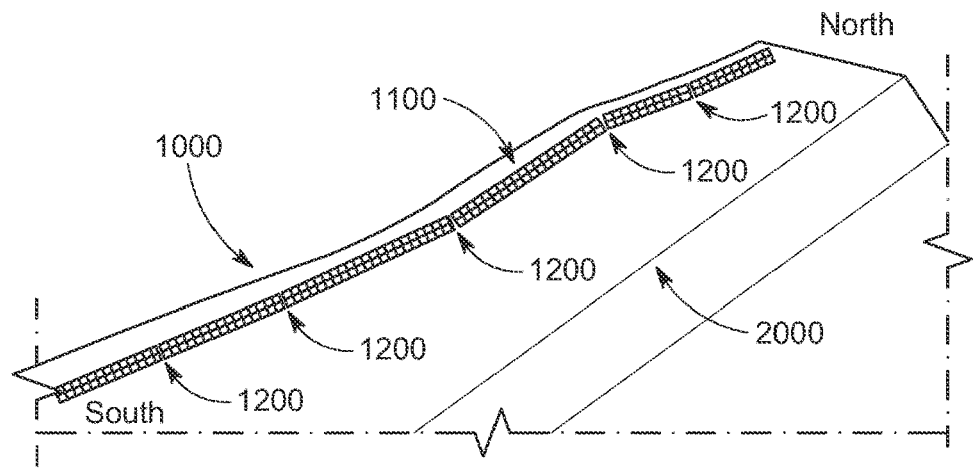
FIG. 1 is a general layout view showing the installation on terrain having variations in altitude difference of a solar tracker according to one nonlimiting embodiment of the present invention.

The appended drawings are provided by way of example and are not limiting on the invention. These drawings are diagrammatic representations and are not necessarily at the scale of the practical application.

DETAILED DESCRIPTION OF THE INVENTION

It is specified here that in the context of the present invention the term "solar energy collector device" and its equivalents have the following definition: a device configured to convert directly or indirectly solar energy into another form of energy. A device of this kind may for example be a photovoltaic panel, a solar reflector, a thermal solar panel or a solar concentrator for example.

It is specified here that in the context of the present invention the term "kinematic" and its equivalents have the following definition: all of the physical characteristics and parameters that can be used to describe a movement of a body in a frame of reference.

In the following description, by "universal joint connection" is meant an articulation between two members having three degrees of freedom in rotation. A universal joint connection mobile in translation will then be understood as an articulation between two members having three degrees of freedom in rotation and at least one degree and preferably two degrees of freedom of movement in translation of one member relative to the other.

Before undertaking a detailed review of embodiments of the invention, there are set out hereinafter optional features that may be used in addition or instead:

In one embodiment, the lattice structure comprises first and second ends disposed on either side of a middle of the lattice structure and supporting said table.

In one embodiment, the first and second parts are configured to form a sliding pivot connection. In another embodiment, the first and second parts are configured to form an annular linear connection, that is to say one of the first and second parts is able to move in translation along one axis and to turn about three axes within the other of the first and second parts. In these two embodiments, the first and second parts are adapted to cooperate so as:

to enable transmission of a torque between the mobile device and the additional mobile device. Thus the coupling between the first and second parts enables the additional mobile device to be driven in rotation about the additional rotation axis when the mobile device of the drive module is driven in rotation by the kinematic drive device about the principal rotation axis, to allow relative movement in translation of said mobile device of the drive module and said additional mobile device of the additional module relative to one other.

In one embodiment, the mobile device and the additional mobile device are disposed so that the principal direction and the additional direction are substantially aligned relative to one another along the North/South axis.

In one embodiment, the mobile device and the additional mobile device are disposed so that the principal direction and the additional direction are substantially disposed in the same vertical plane.

In one embodiment, the mobile device comprises first and second ends and the mobile device and the additional mobile device are disposed so that the first end or the second end of the mobile device faces an end of the additional mobile device.

In one embodiment, the first support arch has two ends fastened to the lattice structure, preferably at least in accordance with the first kinematic movement, so that the first support arch extends from the second beam to the third beam at the level of the first beam.

In one embodiment, the additional support arch has two ends fastened to the additional lattice structure, preferably in accordance with the second kinematic movement, so that this additional support arch extends from the second additional beam to the third additional beam and passes at the level of the first additional beam.

In one embodiment, the first support arch and the additional support arch respectively extend on either side of the principal direction and the additional direction.

In one embodiment, the first support arch and the additional support arch are respectively disposed, preferably entirely, at a lower level than the table and the additional table.

The first support arch and the additional support arch respectively extend substantially from the lattice structure and the additional lattice structure to the ground, preferably over at least 70%, and advantageously over at least 80%, of the height separating the ground and respectively the principal rotation axis and the additional rotation axis.

In one embodiment, the first ground support and the additional ground support are respectively disposed, preferably entirely, at a lower level than the table and the additional table.

In one embodiment, the structure comprises at least one first, one second and one third beam parallel to one another and extending in the principal direction so as to form a lattice structure.

In one embodiment, the additional structure comprises at least one first, one second and one third additional beam parallel to one another and extending in the additional direction so as to form a lattice structure.

In one nonlimiting embodiment, the solar tracker according to the present invention employs a lattice structure in which each element preferably contributes to the resistance of the solar tracker to static and dynamic mechanical stresses.

Thus it is specified here that, in the context of the present invention, the term "lattice structure" and its equivalents have the following definition: a mechanical structure comprising beams connected by small beams, also termed crossmembers, and tie-rods, the whole forming a rigid, preferably triangulated structure. Without this being limiting on the invention, each structural element (beam, small beam, tie-rod) is preferably configured, shaped and positioned to enable the lattice structure to support a predetermined mechanical stress, typically its maximum loading capacity. In this type of structure, each structural element is preferably indispensable for supporting said maximum loading capacity. For a mechanical stress, typically the loading capacity, all the small beams and preferably all the tie-rods are loaded, preferably in traction.

In one embodiment, the lattice structure and the additional lattice structure respectively comprise at least one plurality of small beams and at least one plurality of additional small beams respectively distributed along the principal direction and along the additional direction and respectively interconnecting the first, second and third beams and the first, second and third additional beams so that the beams and the additional beams respectively form a first plurality of triangles and a plurality of additional triangles.

In one embodiment, at least one small beam of the plurality of small beams is disposed relative to the first support arch along its diameter, this small beam preferably defines a diameter of the first support arch, and at least one additional small beam of the plurality of additional small beams is preferably disposed relative to the additional support arch along its diameter, and this additional small beam preferably defines a diameter of the additional support arch.

In one embodiment, at least some of the triangles and at least some of the additional triangles are respectively contained in a plane perpendicular to the principal direction and in a plane perpendicular to the additional direction.

In one embodiment, the lattice structure comprises a plurality of tie-rods, preferably extending primarily along the principal direction and mechanically stressing the lattice structure in tension by mechanically interconnecting at least two triangles of the plurality of triangles.

In one embodiment, the additional lattice structure comprises a plurality of additional tie-rods, preferably extending primarily along the additional direction and mechanically stressing in tension the additional lattice structure by mechanically interconnecting at least two additional triangles of the plurality of additional triangles.

In one embodiment, the first part of the coupling device and the second part of the coupling device are disposed facing each other.

In one embodiment, the first support arch of the lattice structure is disposed between the first end of said lattice structure and said middle of the lattice structure. In one nonlimiting instance of this embodiment, the arch is situated at the level of the first end.

In one embodiment, the second support arch of the lattice structure is disposed between the second end of said lattice structure and said middle of the lattice structure, thus preferably creating an overhang for example. In one nonlimiting instance of this embodiment, the arch is situated at the level of the first end.

In one embodiment, the mobile device comprises a second support arch of the lattice structure, preferably of elliptical shape, preferably disposed between a portion of the second end of said lattice structure and said middle of the lattice structure.

The kinematic device for driving said mobile device in rotation relative to the first ground support is preferably directly coupled only to the first arch.

Said first ground support advantageously comprises said rotation kinematic rotation drive device.

In another embodiment, the drive device comprises a motor element distinct from the drive module.

In one instance, the motor element comprises a motor remote from the drive module and a transmission shaft for transmitting movement from the motor to the drive module.

In another instance, the motor element is another module kinematically coupled to the drive module.

The second kinematic movement and the first kinematic movement advantageously share at least one common kinematic characteristic from at least one of the following kinematic characteristics: rotation angle, rotation amplitude, acceleration, speed, movement vector.

This enables the additional table to reproduce the kinematic movement of the table in order to ensure tracking of the sun by the two tables regardless of the non-colinearity of their rotation axes.

This enables the additional table to reproduce accurately the kinematic movement of the table.

Said at least one kinematic coupling device advantageously comprises at least one universal joint connection mobile in translation along at least the translation axis relative to the additional module and the drive module and preferably in rotation about a plurality of rotation axes.

This enables the present invention to adapt to irregularities of the ground via the kinematic coupling device, which has numerous degrees of freedom. The universal joint connection mobile in translation in said secondary direction enables adaptation of the solar tracker to changes of slope of the terrain along the line of tables. Said universal joint connection is advantageously mobile along at least the translation axis relative to the additional module and the drive module and preferably in rotation about a plurality of rotation axes, and preferably along at least one axis transverse to said translation axis relative to the additional module and the drive module.

Said at least one universal joint connection mobile in translation advantageously comprises:
  at least one female part fastened to one of the mobile device of the drive module and the additional mobile device of the additional module, and
  at least one male part fastened to the other of the mobile device of the drive module and the additional mobile device of the additional module.

Said at least one female part is advantageously mechanically connected to said at least one drive module and said at least one male part is advantageously mechanically connected to said at least one additional module.

This enables the kinematic coupling device to move independently in translation relative to the supports.

In one embodiment, at least one female part is mechanically connected to said at least one second support arch and said at least one male part is mechanically connected to said at least one additional support arch.

This enables transmission of the first kinematic movement to the additional table via this mechanical coupling.

In one embodiment, said at least one female part is mechanically connected to said at least one lattice structure and said at least one male part is mechanically connected to said at least one additional lattice structure.

This enables transmission of the first kinematic movement to the additional table via this mechanical coupling.

Said at least one female part advantageously extends primarily in one of said principal direction and said additional direction.

Said at least one male part advantageously extends primarily in the other of said principal direction and said additional direction.

Said at least one female part advantageously comprises a jaw and said at least one male part advantageously comprises a tongue configured so that the jaw fits tightly around it in such a manner as to enable sliding of the tongue in the jaw.

The jaw or the tongue advantageously comprises shoes forming an interface between the jaw and the tongue in order to facilitate said sliding.

Said shoes preferably comprise a material having a low coefficient of friction such as for example bronze, PTFE or again a synthetic material or a metal or an element comprising balls.

In another embodiment, the jaw and/or the tongue comprise(s) at least one universal joint.

Said at least one female part advantageously comprises a sheath or a cubic cavity and the male part advantageously comprises a cylinder, an at least partially spherical structure or a block having shapes and dimensions complementary to the female part in order to be introduced into the latter.

In one embodiment, said at least one female part comprises at least one of the following elements: a jaw, a sheath, an oblong hole, a cubic cavity. More generally, said at least one female part has any form able to accept a male part leaving it the degrees of freedom required to provide a universal joint-slide type connection or a universal joint-pivot-slide type connection. By way of nonlimiting example, said at least one female part for example comprises any type of housing of complementary shape to said male part enabling movement in translation along at least two axes and enabling formation of a complete universal joint.

In one embodiment said at least one male part comprises at least one of the following elements: a tongue, a cylinder mounted on a spherical structure, a cube. More generally, said at least one female part comprises any male part able to provide the connection with a female part of complementary shape whilst leaving the degrees of freedom required for a universal joint-slide type connection or a universal joint-pivot-slide type connection.

This enables use of numerous technological solutions to produce the kinematic coupling device as a function of installation circumstances and requirements.

At least one kinematic coupling device is advantageously disposed, preferably eccentrically, relative to the center of gravity of said additional support arch and relative to the center of gravity of said second support arch.

For example, if the arches belonging to two adjacent and mutually coupled modules are circular arches then the kinematic coupling device is situated at distance from the center of each of these two arches, the two arches being configured to turn about their center.

For example, if the arches belonging to two adjacent and mutually coupled modules are portions of an ellipse then the kinematic coupling device is situated at distance from the center of each of these two arches, the two arches being configured to turn about their center.

In one advantageous embodiment, the coupling device is preferably situated on the circle or ellipse portion defined by the arch or arches. Thus it is at a distance from the center of rotation of the arches.

This enables provision of at least only one universal joint connection mobile in translation in order to simplify the assembly of the present invention and to reduce the installation costs.

This also enables considerable reduction of the forces to which said at least one kinematic coupling device is subjected. Indeed, the farther the kinematic coupling device is from the rotation axis and/or from the center of gravity of the arch or arches, the lower are the forces that said at least one coupling device is subjected to.

In one embodiment, the solar tracker comprises a plurality of kinematic coupling devices. One of these kinematic coupling devices is disposed on a straight line passing through the rotation axis of the arch, typically on a straight line passing through the center of the circle or ellipse portion defined by the arch. One or more other kinematic coupling devices are preferably disposed at a distance from the rotation axis of the arch, preferably on the circle or ellipse portion defined by the arch.

Said at least one male part is advantageously disposed, preferably eccentrically, relative to the center of gravity of said at least one second support arch.

Said at least one female part is advantageously disposed, preferably eccentrically, relative to the center of gravity of said at least one additional support arch.

In one embodiment, said at least one kinematic coupling device is preferably disposed at the level of the center of rotation of said additional support arch and at the level of the center of rotation of said second support arch.

This enables provision of only one universal joint connection mobile in translation in order to simplify assembly of the present invention and to reduce installation costs.

In one embodiment, said at least one kinematic coupling device is preferably disposed at the level of the center of gravity of said additional support arch and at the level of the center of gravity of said second support arch.

This enables provision of only one universal joint connection mobile in translation in order to simplify the assembly of the present invention and to reduce the installation costs.

In one embodiment, said at least one male part is disposed substantially at the center of rotation of said at least one second support arch.

In another embodiment, said at least one male part is disposed substantially at the center of gravity of said at least one second support arch.

In one embodiment, said at least one female part is disposed substantially at the center of rotation of said at least one additional support arch.

In another embodiment, said at least one female part is disposed substantially at the center of gravity of said at least one additional support arch.

In another embodiment, the kinematic coupling between the two modules comprises at least one kinematic coupling device, the latter preferably comprising a universal joint connection mobile in translation along the translation axis relative to the additional module relative to the drive module.

In another preferred embodiment, the kinematic coupling between the two modules comprises two, preferably three, or even more, kinematic coupling devices. Each of them preferably comprises a universal joint connection mobile in translation along the translation axis relative to the additional module relative to the drive module.

In one embodiment, the solar tracker comprises at least one kinematic coupling device, preferably at least three kinematic coupling devices and advantageously at least three kinematic coupling devices.

This enables distribution of the mechanical forces across three universal joint connections mobile in translation in order to enable the production of universal joint connections mobile in translation at lower cost.

When the solar tracker comprises at least three kinematic coupling devices, at least one of the at least three kinematic coupling devices is preferably disposed at the level of the principal and/or additional rotation axis.

The solar tracker advantageously comprises at least one universal joint connection mobile in translation along the translation axis relative to the additional module relative to the drive module, preferably at least two universal joint connections mobile in translation and advantageously at least three universal joint connections mobile in translation.

When the solar tracker comprises at least three universal joint connections mobile in translation, at least one of the at least three universal joint connections mobile in translation is preferably disposed at the level of the main and/or additional rotation axis.

In one embodiment, the solar tracker comprises two or three coupling devices between said drive device and said additional drive device.

In one embodiment, the solar tracker comprises three or more coupling devices between said drive device and said additional drive device.

In one embodiment, the solar tracker comprises only one coupling device between said drive device and said additional drive device.

The kinematic coupling device advantageously comprises at least one kinematic transfer shaft, a first pivot articulation device and a second pivot articulation device, the first pivot articulation device making a mechanical connection between the second support arch and said kinematic transfer shaft and the second pivot articulation device making a mechanical connection between the additional support arch and said kinematic transfer shaft.

This enables the present invention to adapt to irregularities of the ground via the kinematic coupling device that has numerous degrees of freedom, the kinematic transfer shaft enables adaptation of the solar tracker to changes of slope of a terrain along the line of tables via the two coupling pivot articulation devices.

The transfer shaft is preferably a bar, preferably a metal bar, preferably of circular section.

At least one lattice structure of said first lattice structure and said additional lattice structure and at least one support arch of said first support arch, said second support arch and said additional support arch are advantageously mechanically interconnected by at least one pivot connection enabling one degree of freedom in rotation between said at least one lattice structure and said at least one support arch.

This enables improvement of the transmission of the first kinematic movement to the additional table.

At least one, preferably both, of the first ground support and the additional ground support is or are advantageously disposed on at least one ground suspension having an elasticity in compression along at least one vertical axis.

In one embodiment, the additional ground support is disposed on at least two ground suspensions.

The presence of at least one ground suspension enables better functioning of the present invention.

This also enables compensation of irregularities of the ground, and also variations of temperature inducing mechanical expansion and compression.

In a preferred embodiment, said at least one ground suspension is in the shape of a "U". This "U" shape, preferably on its side, imparts additional degrees of freedom to the ground supports relative to irregularities of the terrain via its capacity for elastic deformation in compression along at least one vertical axis.

This ground suspension advantageously has a synergistic effect with other features relating to the kinematic coupling device.

This ground suspension enables absorption of some mechanical forces caused by the kinematic coupling of the modules.

The ground suspension is preferably configured to have some elasticity in order to absorb the mechanical forces caused by the kinematic coupling of the modules.

The ground suspension is advantageously made of metal, preferably of spring quality, for example spring steel.

Said at least one ground suspension advantageously has elastic properties.

The mobile device advantageously comprises a second support arch that rests on at least one second ground support of the drive module, said second ground support comprising at least one rotation guide device configured to guide, preferably directly, the second support arch in said first kinematic movement relative to said second ground support about said main rotation axis.

This makes it possible to support at least in part the weight of the table.

The ground suspension may advantageously comprise a coil spring or a set of elastomer members (of Silentbloc™ type for example).

In one embodiment, the second ground support is disposed on at least one ground suspension, preferably on at least two ground suspensions.

This enables compensation of irregularities of the ground, and also variations of temperature causing mechanical expansion and contraction.

This ground suspension enables absorption of some mechanical forces caused by the kinematic coupling of the modules.

The second support arch advantageously rests on at least one second ground support comprising at least one rotation guide device configured to guide, preferably directly, the second support arch in said kinematic movement relative to said second ground support about said rotation axis.

This enables support at least in part of the weight of the table whilst accompanying the kinematic movement of the table.

Said at least one rotation guide device advantageously comprises at least two rollers configured to be directly in contact with the second support arch.

This enables the table to be accompanied in its kinematic movement in order to reduce the mechanical forces to which the lattice structure is subjected.

The additional rotation guide device advantageously comprises at least two rollers configured to be directly in contact with the additional support arch so as to guide said additional support arch in said second kinematic movement relative to said at least one additional ground support about said additional rotation axis.

This enables the additional table to be accompanied in its kinematic movement in order to reduce the mechanical forces to which the additional lattice structure is subjected.

In one embodiment, the ground support comprises a base or a sole anchored at least in part in the ground. The base is for example made of concrete. The roller or rollers is or are mounted to rotate relative to the base.

In one embodiment, the solar tracker is configured so that the rollers and the additional rollers support the mobile device, preferably on their own.

Said rotation kinematic drive device advantageously comprises at least one drive system and preferably pinion or sprocket means.

This enables precise control of tracking of the sun by the present invention.

Said at least one first ground support advantageously comprises at least one chain or a system of cylinders configured to provide the drive system of the drive module.

Said at least one first ground support advantageously comprises at least one pinion and the first support arch advantageously comprises at least one rack disposed on at least one part of the first support arch, preferably oriented toward the ground, said at least one pinion and said at least one rack being configured to drive kinematically in rotation said first support arch relative to said at least one first ground support about said principal rotation axis.

This makes it possible to limit deterioration of the rack and the pinion by the environment. Indeed, in this configuration grains of sand for example cannot remain in the rack and with difficulty in the pinion.

In another embodiment, said at least one first ground support comprises at least one sprocket and the first support arch comprises at least one chain disposed on at least one part of the first support arch, preferably oriented toward the ground, said at least one sprocket and said at least one chain being configured to drive kinematically in rotation said first support arch relative to said at least one first ground support about said principal rotation axis.

The principal direction and the additional direction advantageously have a relative slope variation greater than 1%, preferably greater than 3% and advantageously greater than 6%.

This enables installation of the present invention on terrain having variations in topography along the same line of tables.

Said first lattice structure advantageously comprises at least one, preferably at least two and advantageously at least three lattice beams.

This enables reinforcement of the lattice structure by distribution of mechanical forces.

Said solar energy collector device is advantageously at least one of the following: a photovoltaic panel, a solar reflector, a thermal solar sensor.

The additional solar energy collector device is advantageously at least one of the following: a photovoltaic panel, a solar reflector, a thermal solar sensor.

In one embodiment, the lattice structure may be made of steel.

In one embodiment, the support arches comprise or are formed of steel.

In one embodiment, the ground supports comprise or are formed of steel.

In one embodiment, the ground suspension comprises or is formed of steel.

In one embodiment, the roller or rollers may comprise or be formed of steel, preferably covered with polyurethane so as to enable them to accommodate load variations during movement of the support arches for example.

In one embodiment, said female part comprises or is formed of steel.

In one embodiment, said male part comprises or is formed of steel.

The present invention finds its preferred field of application in the production of solar fields, that is to say expanses of lines of tables supporting solar energy collector devices.

As described hereinafter the present invention notably solves the problematic of the alignment of the tables and the kinematic coupling thereof on terrain featuring static but also dynamic irregularities.

Indeed, while a terrain may feature along a North/South axis altitude differences varying over a greater or lesser distance relative to a table, it may equally feature dynamic irregularities of geological origin, of greater or lesser magnitude.

A second source of dynamic irregularities to which a solar tracker is subjected, although not generated by the terrain itself, is thermal expansion of the materials constituting the solar tracker.

For example, in a desert environment the temperature at ground level may be very high during the day and very low at night. In addition to adapting to static and dynamic irregularities of the terrain, the present invention also adapts to irregularities of a thermal order.

The present invention will now be described by means of a plurality of figures serving to illustrate the implementation of the present invention in accordance with a plurality of embodiments. Unless mentioned otherwise, each of the features described with reference to a given embodiment is applicable to the other embodiments.

We will begin this description with a general presentation of the present invention that will thereafter be broken down into four nonlimiting embodiments.

General

The passages of the description that are to follow aim to present the present invention in a general manner, and also the basic elements and features constituting the present invention and possibly common to a number of embodiments.

These elements and these features must be interpreted in such a manner as to apply as much to the drive module as to the additional module. For example, when the term "module" is used on its own, the features and the elements of that "module" will be common to the drive module and to the additional module, and the same goes for the terms "table", "beam", "arch", "bearing", . . . etc . . . .

As introduced above, the disposition of a solar tracker comprising a plurality of modules aligned along a North/South axis is problematic when the terrain does not have virtually perfect flatness.

FIG. 1 illustrates the case of a terrain 2000 of this kind comprising varying altitude differences along a North/South axis. In this figure a solar tracker 1000 according to one embodiment of the present invention is installed on this irregular terrain 2000.

The solar tracker 1000 from FIG. 1 preferably comprises at least one drive module 1100 and a plurality of additional modules 1200, which may be termed "trackers". Another way of presenting the connection between the drive module 1100 and the additional modules 1200 is to term as the "master" the drive module 1100 and as the "slaves" the additional modules 1200, in the sense that the present invention is configured so that the kinematic movements of the drive module 1100 are transmitted at least in part to the additional modules 1200.

It will be noted that these "drive module" and "tracker module" terms are valid for all the pairs formed by two consecutive modules. If a first module is situated between a second module and a third module disposed on respective opposite sides of the first module, then the first module may be a tracker in relation to the second module and a driver in relation to the third module. Indeed, rotation of the second module drives the first module which in turn drives in rotation the third module.

It will be noted that in a preferred embodiment the drive module 1100 and the tracker module 1200 are disposed so that one of the ends of the drive module 1100 faces one of the ends of the tracker module 1200.

In FIG. 1, the drive module 1100 advantageously comprises a drive system configured to ensure that the drive module 1100 tracks the sun. This drive system is either integrated into the drive module 1100 or mechanically transmitted to the drive module 1100.

In relation to the drive module 110, the additional modules 1200 are those configured to be driven by the drive module 1100 so as also to track synchronously with the drive module 1100 the movement of the sun even though altitude differences and/or misalignments in space and/or in parallel horizontal planes exist between the drive module 1100 and the additional modules 1200, and even between the additional modules 1200 themselves.

The drive module 1100 is preferably disposed between two additional modules 1200, as in FIG. 1, so as to distribute the drive torques throughout the solar tracker 1000.

The present invention then concerns the kinematic coupling between the drive module 1100 and the additional modules 1200 so that the tracking movement of the drive module 1100 is reproduced in a simple, reliable and relatively low-cost manner by the additional modules 1200. This kinematic coupling has the advantage of having been developed through developing a kinematic coupling device 1300 according to the present invention.

Kinematic Coupling Device

As introduced above, the kinematic coupling device 1300 is configured to enable the sharing of least one kinematic characteristic between a first kinematic movement effected by the drive module 1100 and a second kinematic movement that is performed by the additional module or modules 1200.

By "kinematic characteristic" and its equivalents is advantageously meant all characteristics enabling the precise description of a kinematic movement, that is to say for example a rotation angle, a rotation amplitude, a movement vector, a translation amplitude, a speed, an acceleration.

Figure 2A:
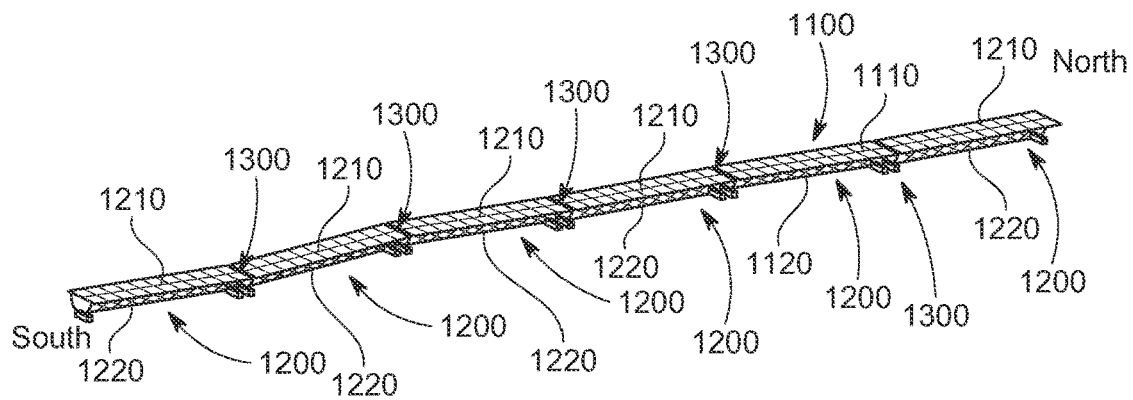
FIGS. 2a, 2b and 2c show a solar tracker according to one nonlimiting embodiment of the present invention.
Figure 2B:
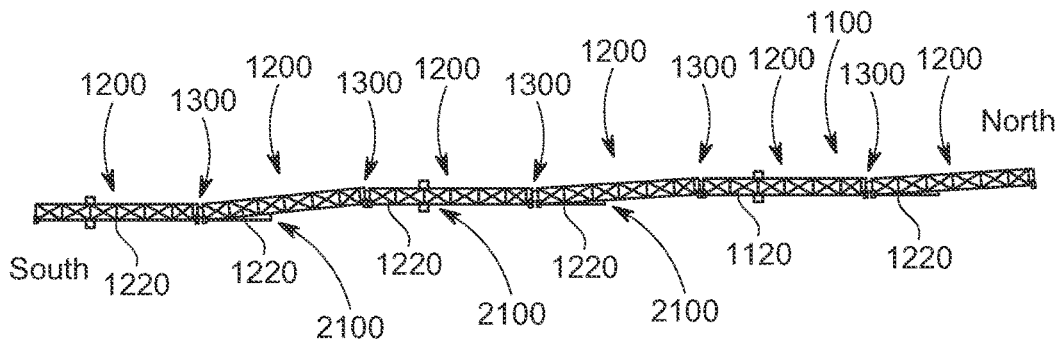
Figure 2C:
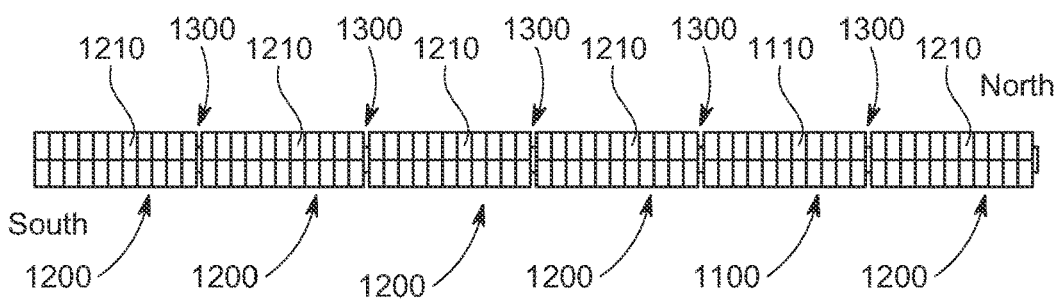

FIGS. 2*a*, 2*b* and 2*c* show three different views of a solar tracker 1000 extending in a North/South direction. In these figures, tables 1110 and 1210 comprising solar energy collector devices 1112 and 1212, not referenced in these figures, are mounted on lattice structures 1120 and 1220 having at each of their ends a support arch 1130, 1150 and 1230, not referenced in these figures. For each module 1100, 1200, the table, the lattice structure and the arches form a mobile device. In one embodiment of the present invention, in each module 1100, 1200, this mobile device rests on a ground support 1140, 1160 and 2140, not referenced in these figures.

FIG. 2*a* is a perspective view of a solar tracker 1000. The solar tracker 1000 preferably comprises a drive module 1100 and a plurality of additional modules 1200 so as to form a line.

In one embodiment, the drive module 1100 may be found at the beginning or at the end of the line of modules. This enables easy maintenance of the drive system.

In another embodiment, the drive module 1100 is found between two additional modules 1200.

The drive module 1100 is preferably found at the level of the center of the solar tracker 1000 so as to distribute the drive torque throughout the solar tracker 1000.

In FIG. 2*a* the kinematic coupling device 1300 situated between the modules of each pair is represented somewhat sketchily. A more precise description of it will be given hereinafter, preferably via four embodiments.

FIG. 2*b* is a profile view of the solar tracker 1000 from the preceding FIG. 2*a*. Here again are found the tables 1110 and 1210, the lattice structures 1120 and 1220 and the kinematic coupling devices 1300 disposed between the modules of each pair.

In this figure the altitude differences 2100 have been transferred over in order to illustrate the adaptability of the present invention to the terrain 2000.

Indeed, in FIG. 2*b*, it is notable that the altitude difference 2100 between a plurality of modules is different, but, nevertheless, the present invention enables transmission of a movement tracking the travel of the sun from the drive module 1100 to each additional module 1200 via the kinematic coupling devices 1300.

FIG. 2*c* is a view from above of the solar tracker 1000 according to FIG. 2*a*. In the situation illustrated by this figure, the solar tracker 1000 has a quasi-perfect alignment along the North/South axis. Indeed, it is to be noted that by virtue of the choice of a North/South alignment, the solar tracker 1000 according to the present invention has to adapt to the irregularities of the terrain 2000. The present invention thus enables a North/South alignment to be maintained without structuring the terrain 2000 whilst retaining a solar tracker 1000 comprising a plurality of modules.

In a preferred embodiment, the drive module 1100 comprises at least one mobile device (1110, 1120, 1130, 1150), at least one first ground support 1140 and at least one rotation kinematic drive device 1141. The additional module 1200 also comprises at least one additional mobile device (1210, 1220, 1230), at least one additional ground support 1240 and at least one additional rotation guide device 1241.

The kinematic coupling device is preferably supported entirely by said mobile device and/or said additional mobile device.

The coupling device 1300 advantageously comprises at least one first part 1330 and at least one second part 1340, the first part 1330 being supported entirely by the mobile device (1110, 1120, 1130, 1150) and the second part 1340 being supported entirely by the additional mobile device (1210, 1220, 1230).

In a preferred embodiment, the first part 1330 of the coupling device 1300 and the second part 1340 of the coupling device 1300 are disposed facing one another.

The invention cleverly enables adjustment of the alignment of the coupling points between two modules during installation of the solar tracker to be dispensed with.

Module

Figure 3A:
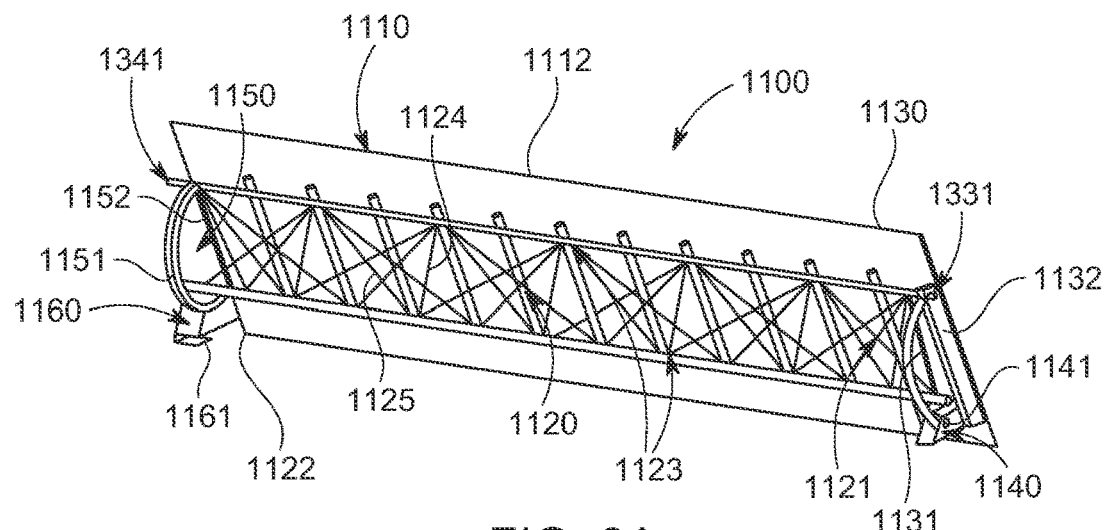
FIGS. 3a, 3b and 3c are different views of a drive module according to one nonlimiting embodiment of the present invention in a position inclined at an angle of 60 degrees.
Figure 3B:
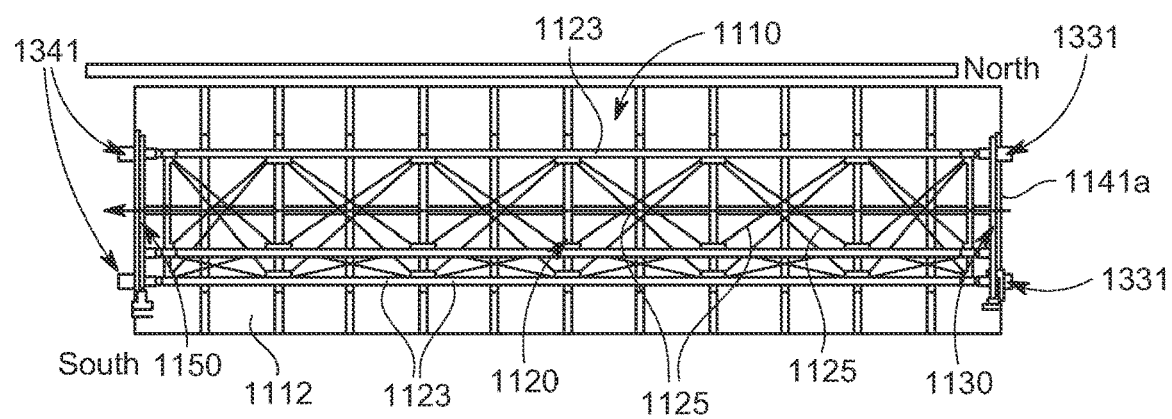
Figure 3C:
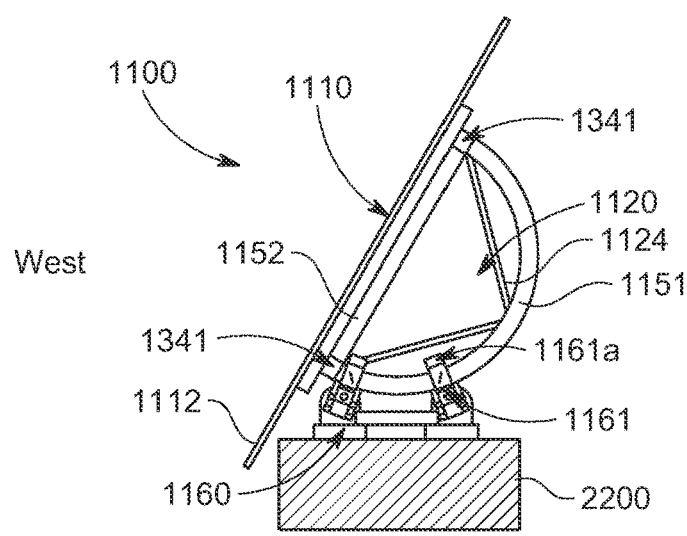

FIGS. 3a, 3b and 3c show a module according to one embodiment of the present invention that may be a drive module 1100 or an additional module 1200 depending on whether or not it includes a drive system, not shown in these figures. The module shown in these figures is in a position inclined at 60 degrees toward the West.

Indeed, in one embodiment of the present invention, the drive module 1100 of a solar tracker is distinguished from the additional modules 1200 only by the presence of a drive system. This drive system is advantageously disposed at the level of a ground support 1140 configured to carry a support arch 1130. The presence of the drive system of the drive module at ground level enables reduction of the weight of the module.

FIG. 3a is a perspective view of a module 1100 for example comprising a table 1110 mounted on a lattice structure 1120. In the conventional way a lattice structure is a structure comprising beams or structural sections extending in at least two different directions and fastened to one another.

In an embodiment like that shown in FIG. 3a, each end 1121 and 1122 of the lattice structure 1120 is supported by a support arch 1130 and 1150.

Figure 22A:
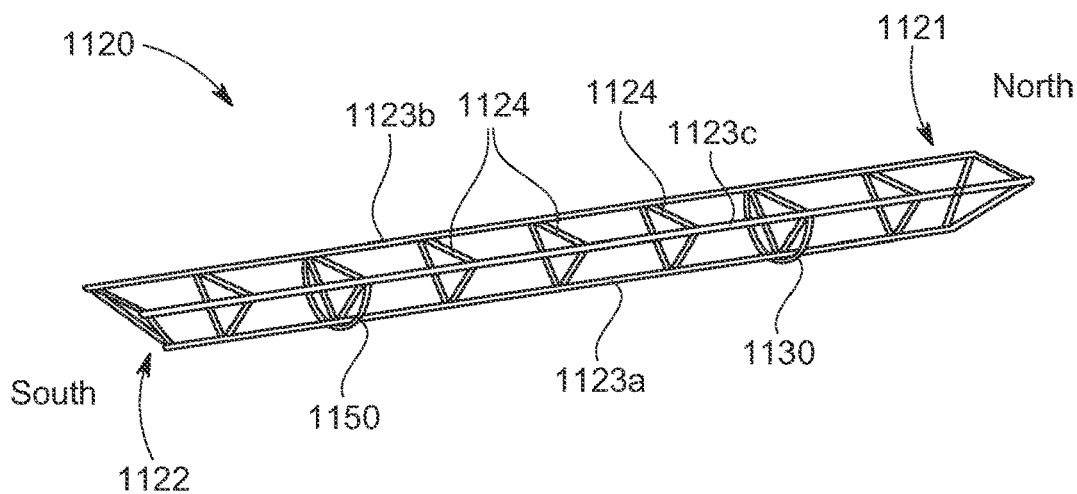
FIGS. 22a, 22b and 22c show the position of a support arch relative to a kinematic coupling device and to the lattice structure according to the fourth embodiment of the present invention.

In another embodiment like that shown in FIG. 22a, the lattice structure 1120 is supported by one or two support arches 1130 and 1150 respectively disposed between the middle and respectively each of the two ends 1121 and 1122 of the lattice structure 1120.

In another embodiment, more than two arches may support the lattice structure.

In one embodiment, as shown in FIGS. 3a and 22a for example, each support arch 1130, 1150 and 1230 rests on a ground support 1140, 1160 and 1240. The ground support 1140, 1160 and 1240 comprises a base or a sole anchored, at least in part, in the ground. The base is for example made of concrete.

In another embodiment, only one of the two support arches 1130 and 1150 rests on a ground support 1140.

Thus the drive module shown in FIG. 3a comprises a first support arch 1130 disposed at the level of a portion of the first end 1121 of the lattice structure 1120 and a second support arch 1150 disposed at the level of a portion of the second end 1122 of the lattice structure 1120.

The first support arch 1130 advantageously rests on a first ground support 1140 and the second support arch 1150 advantageously rests on a second ground support 1160.

In an embodiment shown in FIG. 3a, the first ground support 1140 comprises a ground suspension 1170 configured to enable positioning of the modules 1100 and 1200 in a simple and reliable manner and to contribute to compensating irregularities of the terrain 2000. This ground suspension 1170 will be described more precisely hereinafter.

FIG. 3b is a profile view of the module 1100 from FIG. 3a. The same elements are found therein. There is seen more clearly in this figure the presence at each end 1121 and 1122 of the module of a part of the kinematic coupling device 1300 in the first embodiment to be described hereinafter.

The first end 1121 comprises two female parts 1331 of the kinematic coupling device 1300 and the second end 1122 comprises two male parts 1341 of the kinematic coupling device 1300 according to the first embodiment of the present invention.

Each female part 1331 and each male part 1341 is respectively configured to cooperate respectively with each male part 1341 and each female part 1331 of the next module.

FIG. 3c represents a module 1100 seen in accordance with its principal extension dimension. This module 1100 is similar to the module from FIGS. 3a and 3b except that the second ground support 1160 rests on a support block 2200, for example made of concrete, formed during the installation of the solar tracker 1000. There are found in this figure the same structural elements as in the preceding FIGS. 3a and 3b.

Lattice Structure and Support Arch

FIGS. 4a, 4b, 4c and 4d are three different views of a lattice structure 1120 according to one embodiment of the present invention comprising an arch 1130 and an arch 1150 at its ends 1121 and 1122.

Figure 4A:
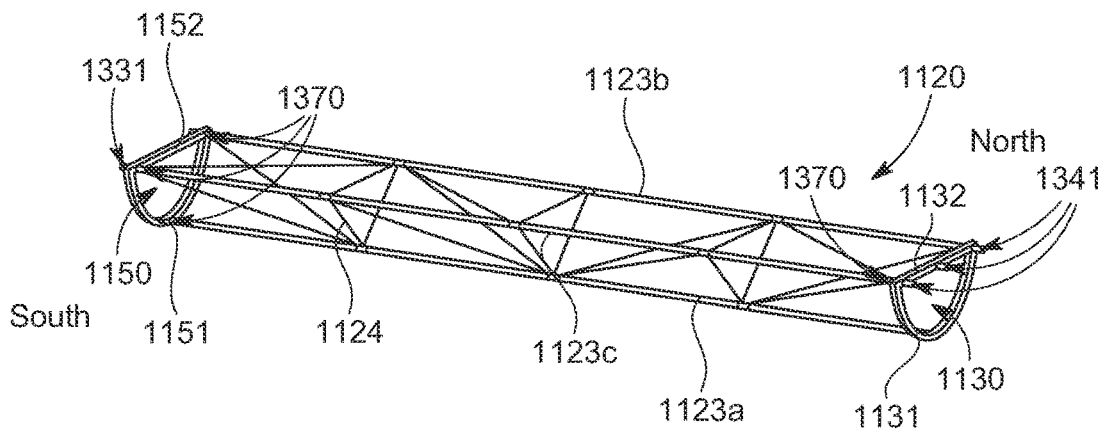
FIGS. 4a, 4b, 4c and 4d are different views of a lattice structure according to one nonlimiting embodiment of the present invention.

FIG. 4a is a perspective view of a lattice structure 1120 comprising a first end 1121 and a second end 1122. This lattice structure 1120 is configured to receive a table 1110 comprising one or more solar energy collector devices 1112.

In one embodiment, this lattice structure 1120 comprises at least one beam 1123, preferably at least two beams 1123 and advantageously at least three beams 1123 each extending in accordance with the principal extension dimension of the lattice structure 1120.

These beams 1123 are preferably mechanically interconnected via one or more small beams 1124.

These beams 1123 are preferably parallel to one another.

The small beams 1124 are preferably disposed relative to the three beams 1123 so as to form triangles at least some of which are parallel to one another, preferably lying in planes orthogonal to the principal direction 1111.

The lattice structure 1120 advantageously comprises tie-rods 1125. These tie-rods 1125 are disposed to connect said triangles to one another, preferably two by two. These tie-rods 1125 are advantageously stressed in tension so as to increase the mechanical strength of the lattice structure 1120.

Two tie-rods 1125 crossing substantially at their middle are preferably bound together.

In one embodiment, a support arch 1130, 1150 is disposed at the level of each of the ends 1121 and 1122 of the lattice structure 1120.

In another embodiment, a support arch 1130, 1150 is disposed at the level of at least one of the ends 1121 and 1122 of the lattice structure 1120.

In one embodiment the beams 1123 are mechanically connected to the support arches 1130, 1150 via beam/support arch pivot connections 1370. In one embodiment of the present invention these pivot connections impart supplemental degrees of freedom to the lattice structure 1120 relative to the support arches 1130, 1150, 1230.

The support arches 1130, 1150, 1230 are advantageously circles and/or circular arcuate members and/or semicircles closed by a diameter 1132, 1152, 1232. Alternatively, the support arches 1130, 1150, 1230 are complete ellipses and/or ellipse portions.

In one embodiment, the centers of the (circular or elliptical) support arches 1130, 1150, 1230 of the same module 1100, 1200 form a straight line parallel to the principal extension direction of the mobile device of this module. This straight line is also parallel to the rotation axis about which the mobile device of this module turns to track the sun.

In one embodiment, the first beam 1123a is disposed at the level of the middle of the arcuate members 1131 and 1151 of the semicircles forming the two support arches 1131 and 1151 and the second beam 1123b and the third beam 1123c are disposed at the level of the two ends of the diameters 1132 and 1152 closing the arcuate members 1131 and 1151.

In one embodiment, at least one small beam 1124 is disposed relative to the first support arch 1130 according its diameter 1132, and this small beam 1124 preferably defines a diameter of the first support arch 1130.

Similarly, and as will be described hereinafter, in one embodiment, at least one additional small beam 1224 is disposed relative to the additional support arch 1230 along its diameter 1232, and this additional small beam 1224 preferably defines a diameter of the additional support arch 1230.

As described hereinafter, the beams 1123a, 1123b and 1123c may preferably be mobile in translation relative to the support arches 1130 and 1150, i.e. the beams 1123a, 1123b and 1123c may slide relative to the support arches 1130 and 1150 in the principal extension direction of the lattice structure 1120.

Figure 4B:
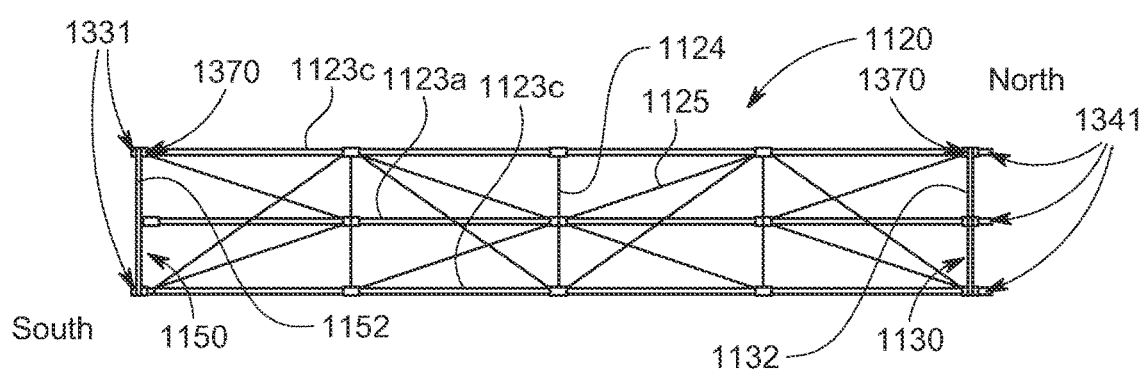
Figure 4C:
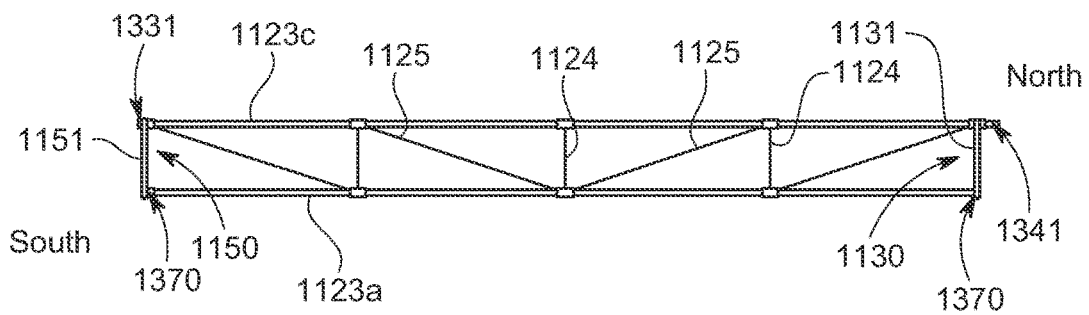

FIGS. 4b and 4c are respectively a view from above and a profile view of the lattice structure 1120 according to FIG. 4a. The same elements are found there. Note more clearly in this figure the presence at each end of the lattice structure 1120 of parts of kinematic coupling devices 1300 according to the second embodiment to be described hereinafter.

The first end comprises three female parts 1331 of three kinematic coupling devices 1300 and the second end comprises three male parts 1341 of three kinematic coupling devices 1300 according to the second embodiment of the present invention. In this second embodiment, only two kinematic coupling devices 1300 may suffice for implementation of the present invention.

Each female part 1331 and each male part 1341 is configured to cooperate with each male part 1341 and each female part 1331, respectively, of the next module.

Figure 4D:
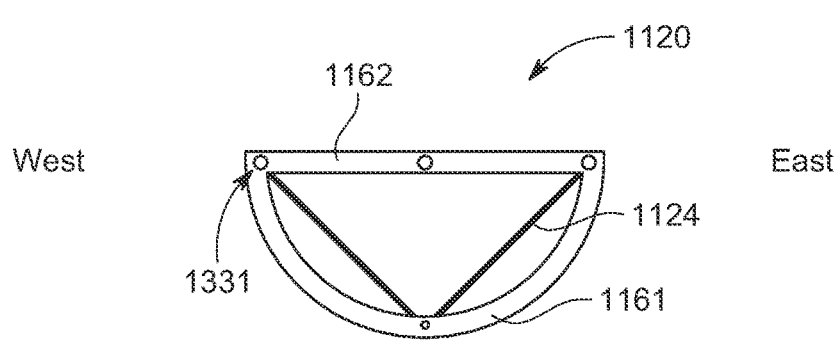

FIG. 4d is a view in accordance with the principal extension direction of a lattice structure 1120 in one embodiment. There is shown in this figure the positioning of the three female parts 1331 of the three kinematic coupling devices 1300 in accordance with the second embodiment of the present invention.

As indicated above, in a preferred embodiment the first support arch 1130 and the additional support arch 1230 respectively extend on respective opposite sides of the principal direction 1111 and the additional direction 1211.

Rotation Kinematic Drive Device

As indicated above, in one embodiment the drive module 1100 comprises a rotation kinematic drive device 1141. This rotation kinematic drive device 1141 is configured to enable among other things tracking by the drive module 1100 of the movement of the sun in the sky.

In one embodiment, this rotation kinematic drive device 1141 is configured to drive the drive module 1100 in rotation about a principal rotation axis 1141a. The principal rotation axis 1141a corresponds to a virtual axis extending from the first end 1121 to the second end 1122 of the lattice structure 1120 and preferably passing substantially through the center of the diameters 1132 and 1152 of the first support arch 1130 and the second support arch 1150.

Figure 10A:
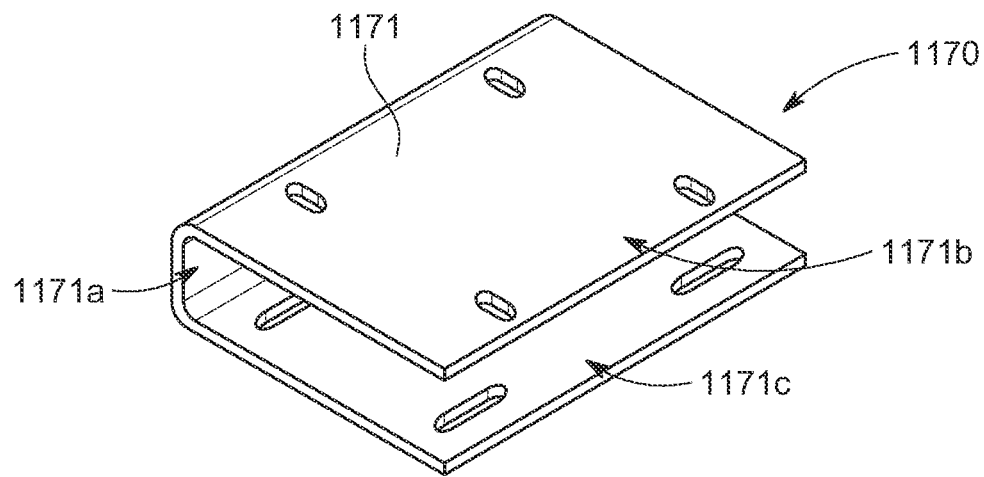
FIGS. 10a, 10b and 10c show a ground suspension according to one embodiment of the present invention and its position relative to one or two ground supports.
Figure 10B:
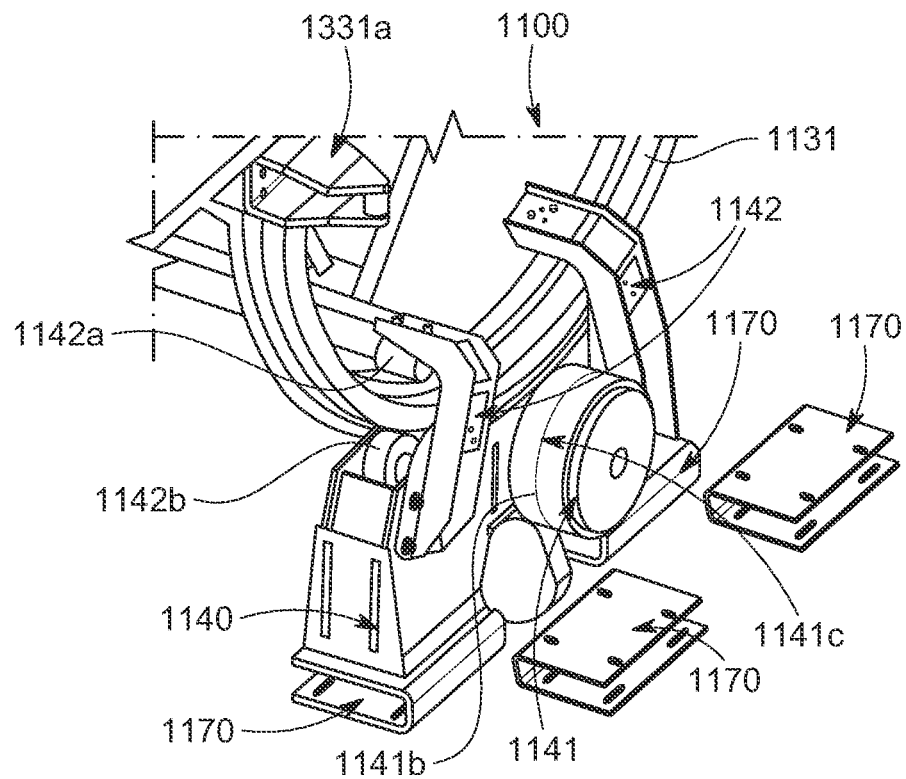
Figure 10C:
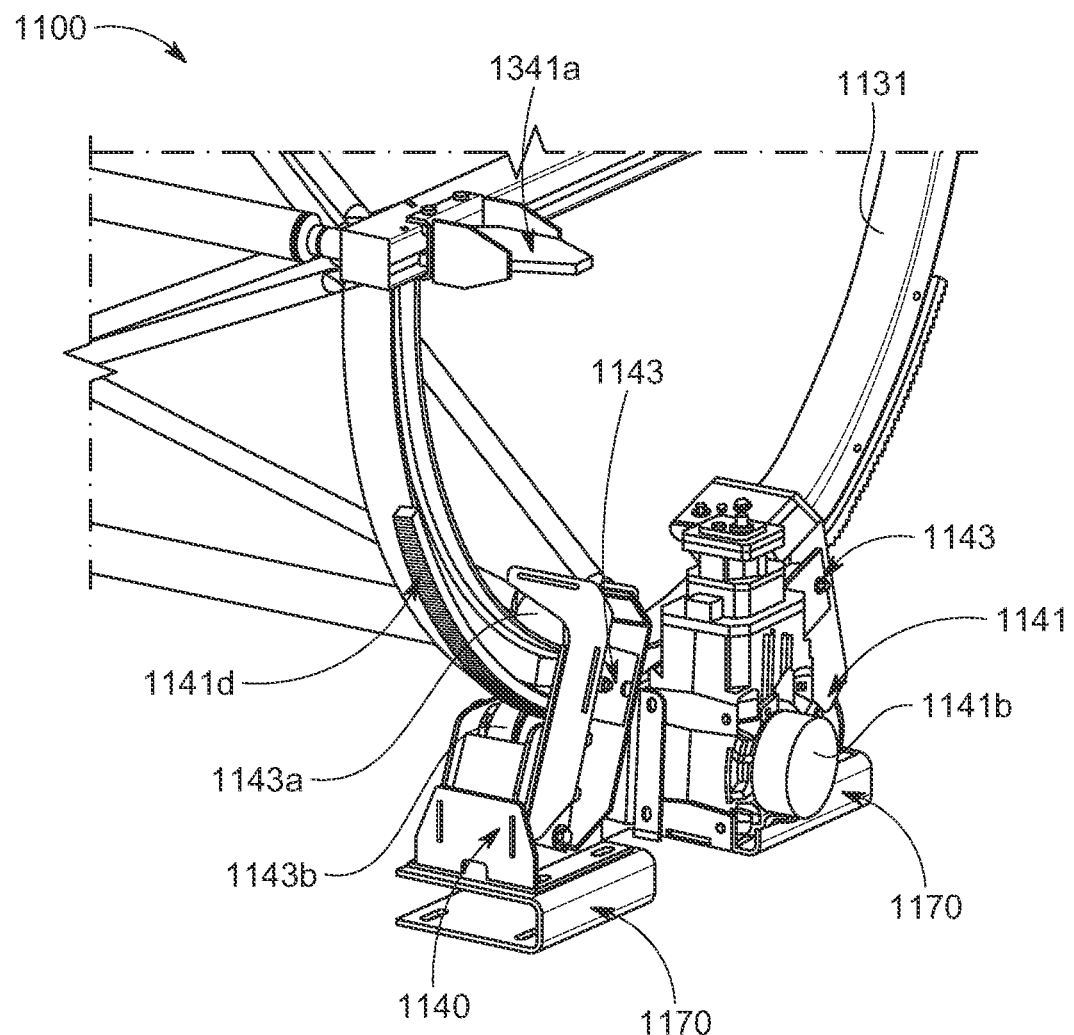

In an embodiment illustrated in FIGS. 5b, 10b and 10c for example, the rotation kinematic drive device 1141 is disposed at the level of a ground support 1140, 1160 and preferably at the level of the first ground support 1140 of the drive module 1100.

In one embodiment the rotation kinematic drive device 1141 comprises at least one pinion 1141c disposed at a lower level than a support arch 1130 of the drive module 1100, said support arch 1130 comprising a rack 1141d preferably disposed at the level of the external face of said support arch 1130 so as to cooperate with said pinion 1141c. This embodiment is for example illustrated in FIGS. 17a and 17b.

In one embodiment at least one, preferably at least two and advantageously at least three teeth of the pinion 1141c are in mechanical contact with the rack 1141d of the support arch 1130.

In another embodiment the rotation kinematic drive device 1141 comprises at least one mechanical system enabling rotation of the drive module 1100, and by way of nonlimiting example this may be one or more cylinders or a chain.

In one embodiment, a ground support 1140, 1160, 1240 may comprise a braking device 1142. This braking device 1142 is configured to brake the support arch 1130 in mechanical contact with the rotation kinematic drive device 1141, preferably using rollers.

Rotation Kinematic Guide Device

In a preferred embodiment, a ground support 1140, 1160, 1240 may comprise a rotation kinematic guide device 1161, 1241. This rotation kinematic guide device 1161, 1241 is configured to enable guiding of the support arch 1130, 1150, 1230 in mechanical contact with the rotation kinematic guide device 1161, 1241 with a movement of rotation in order to track the movement of the sun in the sky.

In an embodiment illustrated in FIGS. 8a, 10b, 10c, 12a and 12b for example, the rotation kinematic guide device 1161, 1241 comprises at least one roller and preferably at least one upper guide roller 1161a, 1241b and at least one lower guide roller 1161b, 1241c and preferably at least two upper guide rollers and at least two lower guide rollers. The roller or rollers is or are mounted to rotate relative to the base of the ground support. The solar tracker 1000 is preferably configured so that the mobile device 1110, 1120, 1130, 1150 is supported by the rollers, preferably only by the rollers. Thus all the weight of the mobile device is preferably transferred to the rollers, without passing through any other support structure as is generally the case in the prior art. This makes it possible to reduce the weight of and to simplify considerably the whole of the tracker. Its unit cost is moreover reduced.

The upper guide rollers 1161a, 1241b are disposed at a higher level than the arcuate member 1131, 1151, 1231 of the support arch 1130, 1150, 1230 whilst the lower rollers 1161b, 1241c are disposed at a higher level than the arcuate member 1131, 1151, 1231 of the support arch 1130, 1150, 1230 so as to support its weight, preferably entirely.

In another embodiment, the rotation kinematic guide device 1161, 1241 comprises only two lower guide rollers 1161b, 1241c.

The present invention enables a module to be guided in rotation via the particular shape of the support arches 1130, 1150, 1230 and their being supported by ground supports 1140, 1150, 1240 comprising rotation guide rollers.

Thus the walls of the support arches 1130, 1150, 1230 form rolling tracks for the rollers. The rotation axes of the rollers remain fixed relative to the ground supports.

By way of nonlimiting example, the lattice structure comprises at least one, preferably at least two beams.

The lattice structure advantageously comprises at least one support arch, preferably at least two support arches.

First Embodiment

There is now going to be described a nonlimiting first embodiment of the present invention. The features of this first embodiment remain compatible with the features described above and with those of embodiments to be described afterwards.

FIGS. 5a and 5b present two situations of application of the present invention, and more particularly of a kinematic coupling device 1300 according to this first embodiment.

Thus FIG. 5a is a profile view of a solar tracker 1000 centered on an additional module 1200 situated between two other additional modules 1200. This additional module 1200, as described above, comprises an additional table 1210 mounted on an additional lattice structure 1220 comprising three additional beams 1223a, 1223 and 1223c and two additional support arches 1230 disposed at the level of each end 1221 of the additional lattice structure 1220.

Each additional support arch 1230 rests on an additional ground support 1240 disposed on additional ground suspensions 1270 themselves placed on support blocks 2200.

The same support block 2200 may advantageously be configured to accept two ground supports 1140, 1160, 1240.

Additional small beams 1224 are disposed relative to the three additional beams 1223 so as to form additional triangles of which at least some are parallel to one another, preferably extending in planes orthogonal to the additional direction 1211.

The additional lattice structure 1220 advantageously comprises additional tie-rods 1225. These tie-rods 1225 are disposed so as to interconnect said additional triangles, preferably two by two. These additional tie-rods 1225 are advantageously stressed in tension so as to increase the mechanical strength of the additional lattice structure 1220.

Two additional tie-rods 1225 crossing substantially in their middle are preferably bound to one another.

FIG. 5b is a profile view of the kinematic coupling device 1300 in this first embodiment.

This figure shows a drive module 1100 and an additional module 1200.

The drive module 1100 comprises a table 1110 mounted on a lattice structure 1120 comprising a first support arch 1130 resting on a first ground support 1140 disposed on a first ground suspension 1170 and comprising a rotation kinematic drive device 1141.

This rotation kinematic drive device 1141 is configured to enable the solar tracker 1000 to track the movement of the sun by directly driving the drive module 1100 in a first kinematic movement and indirectly driving the additional module 1200 in a second kinematic movement via the kinematic coupling device 1330.

The additional module 1220 comprises an additional table 1210 mounted on an additional lattice structure 1220 comprising an additional support arch 1230 resting on an additional ground support 1240 disposed on an additional ground suspension 1270 and comprising an additional rotation kinematic guide device 1241.

This additional rotation kinematic guide device 1241 is configured to enable the additional module 1200 to track the movement of the sun by guiding it in a second kinematic movement via the kinematic coupling device 1300.

In FIG. 5b the same support block 2200 supports the drive module 1100 and the additional module 1200 at the level of the first ground support 1140 and the additional ground support 1240, respectively. It will be noted that this support block 2200 enables at least partial compensation of the large difference in level between these two modules.

As indicated above, in a preferred embodiment the first support arch and the additional support arch are respectively disposed, preferably entirely, at a lower level than the table 1110 and the additional table 1210. The expression at a lower level than means that they are situated lower in a projection onto a vertical plane. On the other hand, they are not necessarily situated entirely in line with the table.

In a similar and preferred manner, the first ground support 1140 and the additional ground support 1240 are respectively disposed, preferably entirely, at a lower level than the table 1110 and the additional table 1210.

The first support arch 1130 and the additional support arch 1230 advantageously respectively extend from the lattice structure 1120 and the additional lattice structure 1220 to the ground, preferably over at least 70%, and advantageously over at least 80% and advantageously over at least 90%, of the height separating the ground and respectively the principal rotation axis 1141a and the additional rotation axis 1241a. As shown in the figures, the height separating the arch from the ground is determined by the ground support and more precisely by the vertical dimension between the ground and the part (typically the support rollers) of the ground support on which the arches rest.

Universal Joint Connection Mobile in Translation

Figure 6A:
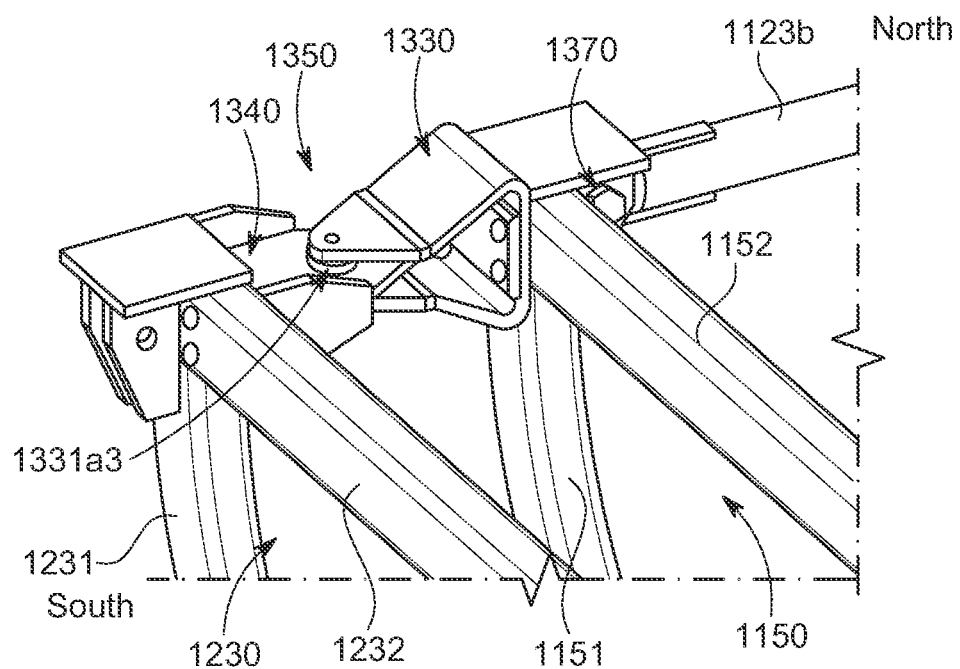
FIGS. 6a and 6b are two views of a kinematic coupling device comprising at least one universal joint connection mobile in translation according to the first embodiment of the present invention.
Figure 6B:
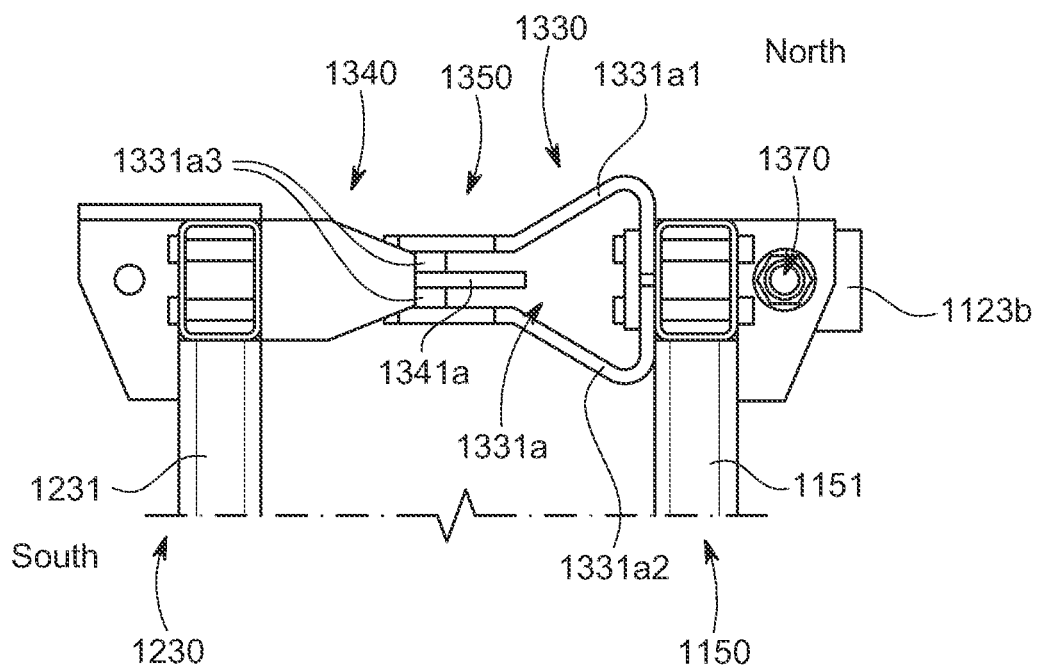

FIGS. 6a and 6b show two precise views of a kinematic coupling device 1300 in accordance with this first embodiment positioned between the drive module 1100 and the additional module 1200.

FIG. 6a is a perspective view of this kinematic coupling device 1300 in accordance with this first embodiment. This kinematic coupling device 1300 is formed in this first embodiment by a universal joint connection 1350 mobile in translation.

In this first embodiment, this kinematic coupling device 1300 comprises a first part 1330 and a second part 1340.

Each of these parts is advantageously fastened to a support arch 1150 and 1230. Thus the first part 1330 is advantageously fastened to the second support arch 1150 and the second part 1340 is advantageously fastened to the additional support arch 1230.

FIG. 6b is a profile view of this universal joint connection 1350 mobile in translation. In this figure the first part 1330 comprises a preferably metal jaw 1331a advantageously comprising shoes 1331a3 configured to limit friction and heating between the male and female parts. The shoes 1331a3 are preferably made of metal, preferably of bronze, advantageously of any type of material having a low coefficient of friction, such as PTFE for one nonlimiting example. In this jaw 1331a is disposed a preferably metal tongue 1341a forming in part at least the second part 1340 of the universal joint connection 1350 mobile in translation.

The jaw 1331a advantageously comprises any type of mechanical interface that makes it possible to limit the friction on the tongue 1341a (for example of thrust ball bearing type . . . ). By way of nonlimiting example, the jaw 1331a may comprise materials of metal spring type, i.e. treated steel or a composite material.

The universal joint connection 1350 mobile in translation is produced in this way. Indeed the tongue 1341a mechanically connected to the additional support arch 1230 is configured to cooperate with the jaw 1331a mechanically connected to the second support arch 1150. In this configuration, the connection 1350 formed in this way has degrees of freedom in rotation and in translation: the tongue 1341a may indeed be moved in the jaw 1331a with movements in translation, but also in rotation on the same terms as a universal joint. Indeed, the universal joint connection 1350 mobile in translation allows the existence of a relative angle between the tongue 1341a and the jaw 1331a.

The tongue 1341a may preferably comprise rigid steel.

Surprisingly, this universal joint connection 1350 mobile in translation produced at least in part by the coupling of the jaw 1331a and the tongue 1341a assures the transmission of high forces between the modules whilst being very robust. Moreover this universal joint connection 1350 mobile in translation allows relative movement in translation of the jaw 1331a and the tongue 1341a along numerous translation axes. Indeed, the relative movement in translation of the jaw 1331a and the tongue 1341a is not limited to only one translation axis.

Shoes 1331a3, preferably of bronze or composite material aiming to reduce friction, are advantageously disposed between the jaw 1331a and the tongue 1341a in order to limit mechanical friction stresses.

The shoes 1331a3 preferably comprise a material having ductility lower than that of the material or materials constituting the tongue 1341a and/or the jaw 1331a.

Figure 7A:
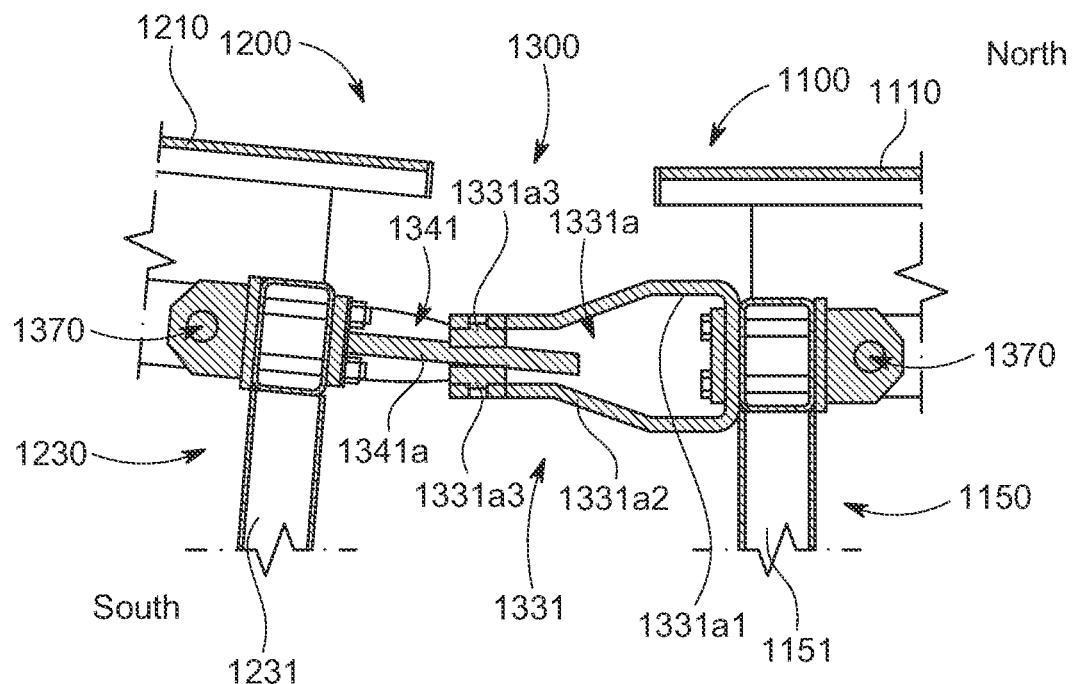
FIGS. 7a, 7b and 7c are a sectional view and perspective views of the elements forming the universal joint connection mobile in translation according to the first embodiment of the present invention.

FIG. 7a is a sectional view of the universal joint connection 1350 mobile in translation in this first embodiment. In this figure, it is to be noted that the jaw 1331a, that is to say the first part 1330 of the kinematic coupling device 1300, comprises an upper part 1331a1 and a lower part 1331a2 which are joined to form the jaw 1331a. Said jaw 1331a1 may preferably be constituted of a material imparting elasticity to it, for example of spring steel type or a composite material assembly, whilst enabling transmission of the forces linked to the torques and to the stresses to which the structure is subjected.

In this figure, there will be noted the presence of a beam/support arch pivot connection 1370 enabling a supplemental degree of freedom to be imparted to each of the modules.

Figure 7B:
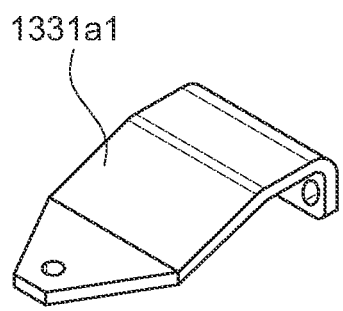

FIG. 7b is a perspective view of the upper part 1331a1 of the jaw 1331a. This upper part 1331a1 of the jaw 1331a is a mechanical part preferably in one piece. The lower part 1331a2 of the jaw 1331a is advantageously a mirror image of the upper part 1331a1 of the jaw 1331a. During production of the present invention this enables production of only one type of part adapted to serve as the upper part 1331a1 or the lower part 1331a2.

Figure 7C:
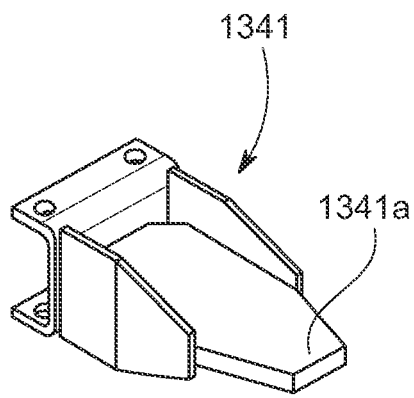

FIG. 7c is a perspective view of the tongue 1341a configured to be inserted into the jaw 1331a in order to define the universal joint connection 1350 mobile in translation in this first embodiment.

Nonlimiting Embodiments

Figure 8A:
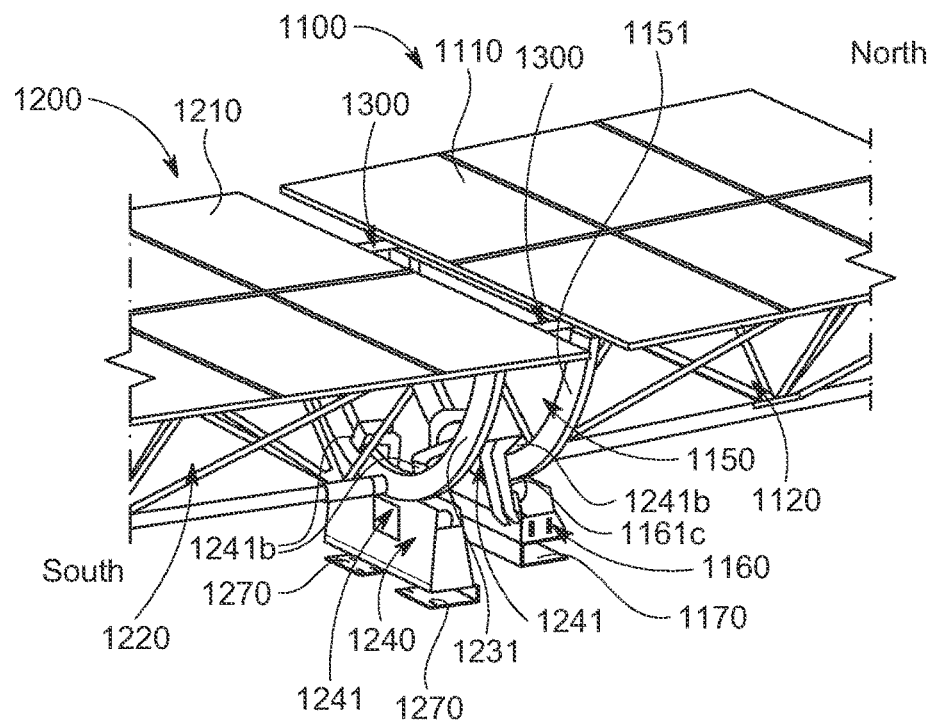
FIGS. 8a and 8b show an application of two universal joint connections mobile in translation according to the first embodiment of the present invention.
Figure 8B:
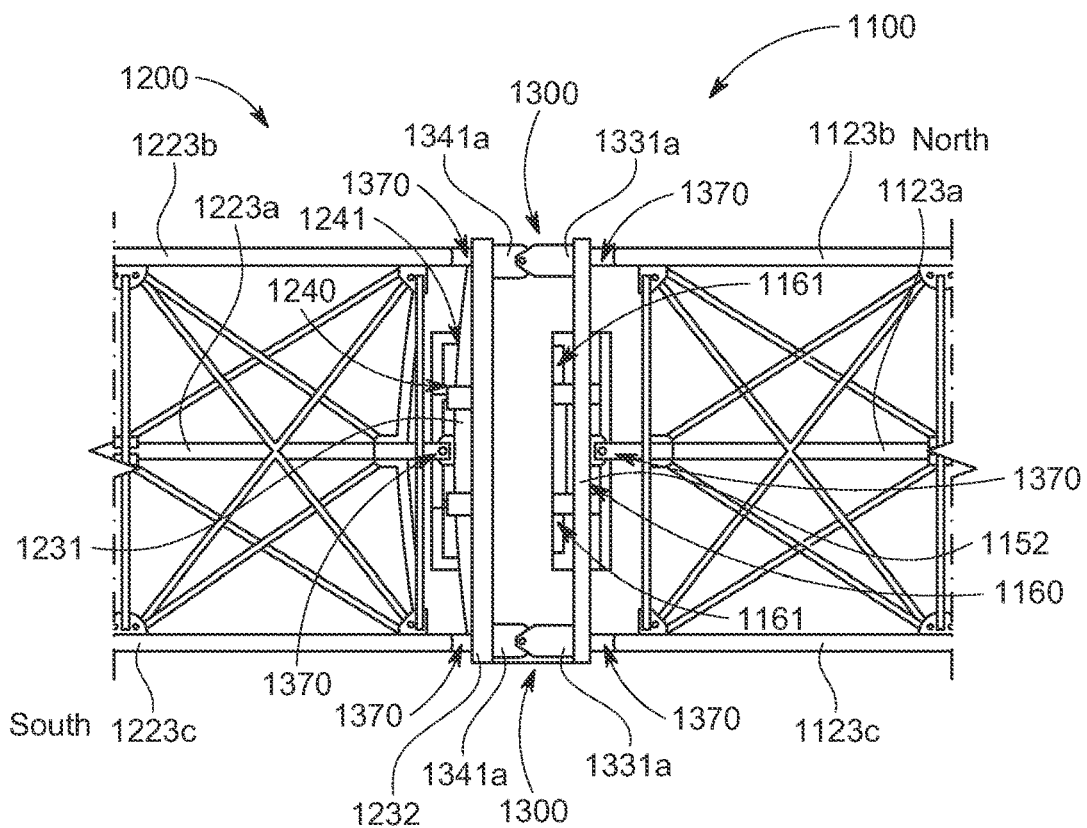

FIGS. 8a and 8b show a drive module 1100 and an additional module 1200 kinematically coupled via two universal joint connections 1350 mobile in translation in this first embodiment disposed at the level of the second support arch 1150 of the drive module 1100 and an additional support arch 1230, and preferably at the level of the ends of the diameters 1152 and 1132 of these additional support arches 1150 and 1230.

FIG. 8a is a perspective view showing the second ground support 1160 of the drive module 1100 and the additional ground support 1240 of the additional module 1200. Each of these ground supports 1160 and 1240 advantageously rests on at least one, preferably at least two, ground suspensions 1170 and 1270.

FIG. 8b is a view from above of FIG. 8a without the tables 1110 and 1210. The universal joint connections 1350 mobile in translation are shown in line with the beams 1123 and the additional beams 1223. Each beam 1123 and 1223 is advantageously mechanically connected to at least one support arch 1150 and 1230 via a beam/support arch pivot connection 1370.

In one embodiment, the first beam 1123a of the drive module 1100 is mechanically connected to the arcuate member 1151 of the second support arch 1150 and comprises a beam/support arch pivot connection 1370 the rotation axis of which is preferably perpendicular to the plane defined by the tables 1110 and 1210, termed the horizontal beam/support arch pivot junction 1371.

In one embodiment, the first additional beam 1223a of the additional module 1200 is mechanically connected to the arcuate member 1231 of the additional support arch 1230 and comprises a beam/support arch pivot connection 1370 the rotation axis of which is preferably perpendicular to the plane defined by the tables 1110 and 1210, termed the horizontal beam/support arch pivot connection 1371.

In one embodiment, the second beam 1123b and the third beam 1123c are mechanically connected to the diameter 1152 of the second support arch 1150 and comprise a beam/support arch pivot connection 1370 the rotation axis of which is preferably contained in a plane parallel to the plane defined by the tables 1110 and 1210, termed the vertical beam/support arch pivot connection 1372.

In one embodiment, the second additional beam 1223b and the third additional beam 1223c are mechanically connected to the additional diameter 1232 of the support arch 1230 and comprise a beam/support arch pivot connection 1371 the rotation axis of which is preferably contained in a plane parallel to the plane defined by the tables 1110 and 1210, termed the vertical beam/support arch pivot connection 1372.

FIGS. 9a to 9f are different views of a drive module 1100 and an additional module 1200 kinematically coupled by two universal joint connections 1350 mobile in translation and inclined at an angle of approximately 60 degrees to the North/South axis and having a non-zero altitude difference between them.

Figure 9A:
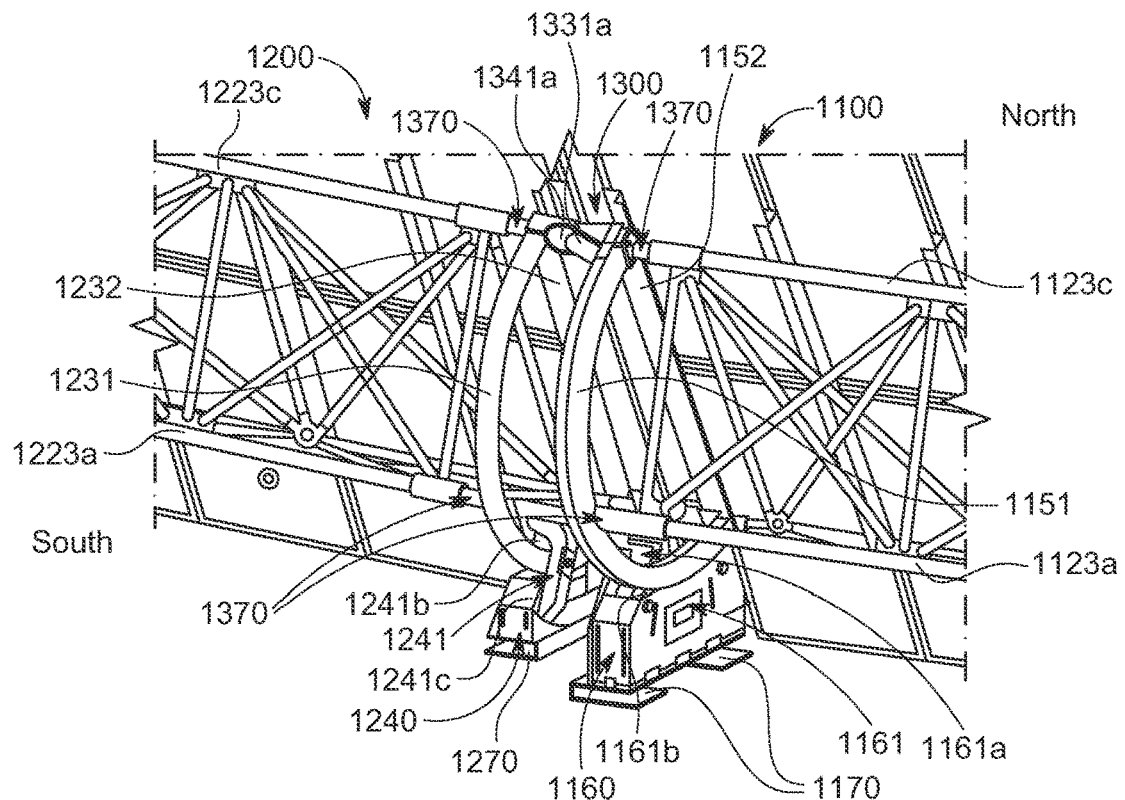
FIGS. 9a, 9b, 9c, 9d and 9e show an application of the two universal joint connections mobile in translation according to the first embodiment of the present invention in the presence of a misalignment between two modules.

FIG. 9a is a perspective view of these two modules 1100 and 1200 featuring on the one hand the universal joint connections 1350 mobile in translation and on the other hand the beam/support arch pivot connections 1370.

These connections 1350, 1370 are all respectively fastened to at least one support arch 1150 and 1230 respectively resting on a ground support 1160 and 1240 respectively placed on two additional ground suspensions 1170 and 1270.

It will be noted that the rotation kinematic guide devices 1161 and 1241 comprise respective upper rollers 1161a and 1241b and respective lower rollers 1161b and 1241c.

In this figure, the two modules 1100 and 1200 have a non-zero altitude difference between them. This altitude difference, shown more clearly in FIG. 9b, is not a limitation for the present invention to the kinematic coupling between the two modules 1100 and 1200.

As indicated above, in a preferred embodiment the first support arch 1130 has two ends fastened to the lattice structure 1120, preferably at least in accordance with the first kinematic movement, so that the first support arch 1130 extends from the second beam 1123b to the third beam 1123c at the level of the first beam 1123a and the additional support arch 1230 features two ends fastened to the additional lattice structure 1120, preferably at least in accordance with the second kinematic movement, so that the additional support arch 1230 extends from the second additional beam 1223b to the third additional beam 1223c at the level of the first additional beam 1223a.

Figure 9B:
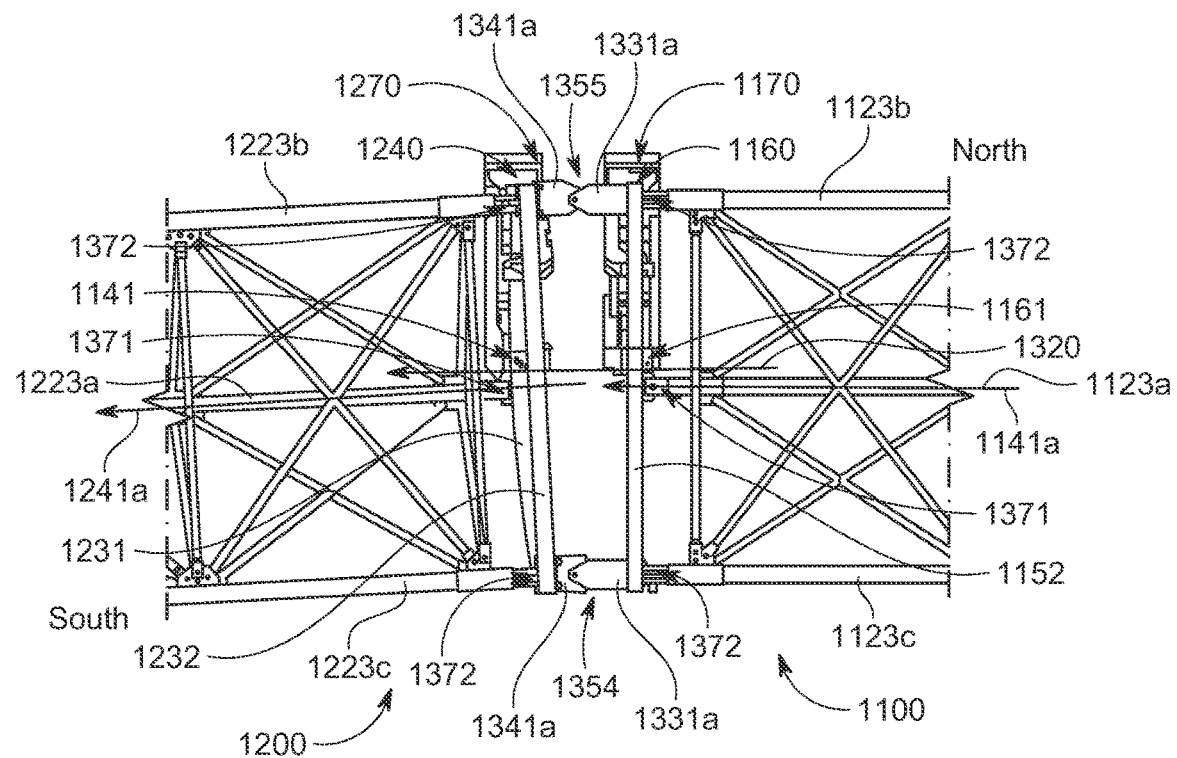

FIG. 9b is a view from above of FIG. 9a and enables the capacity for movement in translation of the universal joint connections 1350 mobile in translation relative to the two modules 1100 and 1200 in this first embodiment to be shown.

In one embodiment, the universal joint connections 1350 mobile in translation rotate about a secondary rotation axis 1320 as soon as the drive module 1100 is driven in rotation about the principal rotation axis 1141a, this enabling guiding in rotation about the secondary rotation axis 1241a via the kinematic coupling to the additional module 1200.

In one embodiment, the secondary rotation axis 1320 may be colinear with the principal rotation axis 1141a and/or the additional rotation axis 1241a.

Indeed, in this figure, the top universal joint connection 1355 mobile in translation in FIG. 9b has a male part 1341 and a female part 1331 spaced from one another whilst remaining in direct contact.

In a preferred embodiment, the tongue 1341a is therefore always in contact with the jaw 1331a and more particularly with the shoes 1331a3 of the jaw 1331a.

The bottom universal joint connection 1354 mobile in translation in FIG. 9b has a female part 1331 and a male part 1341 that are close to one another.

These two universal joint connections 1354 and 1355 mobile in translation perfectly illustrate the capacity for movement in translation of the kinematic coupling devices 1300 in this first embodiment. Thus in this first embodiment the present invention enables kinematic coupling of a drive module 1100 and an additional module 1200, preferably via two universal joint connections 1350 mobile in translation.

Three beam/support arch pivot connections 1370 are preferably configured to cooperate with the two universal joint connections 1350 mobile in translation in order to enable better kinematic coupling between the two modules 1100 and 1200.

Two ground suspensions 1170, 1270 supporting a ground support 1160, 1240 optionally provide by virtue of their mechanical configuration improved kinematic coupling between the two modules 1100 and 1200.

Figure 9C:
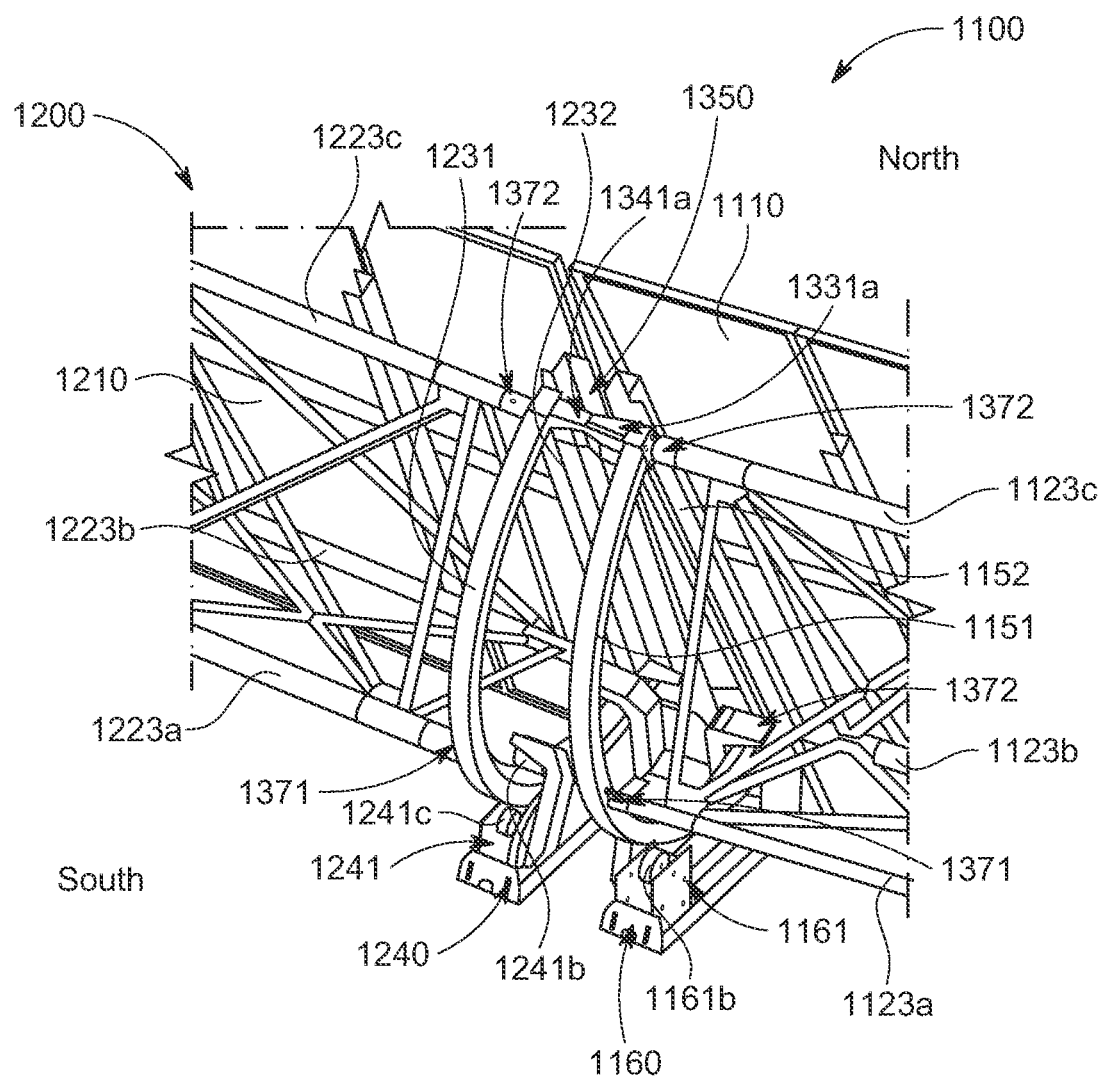
Figure 9D:
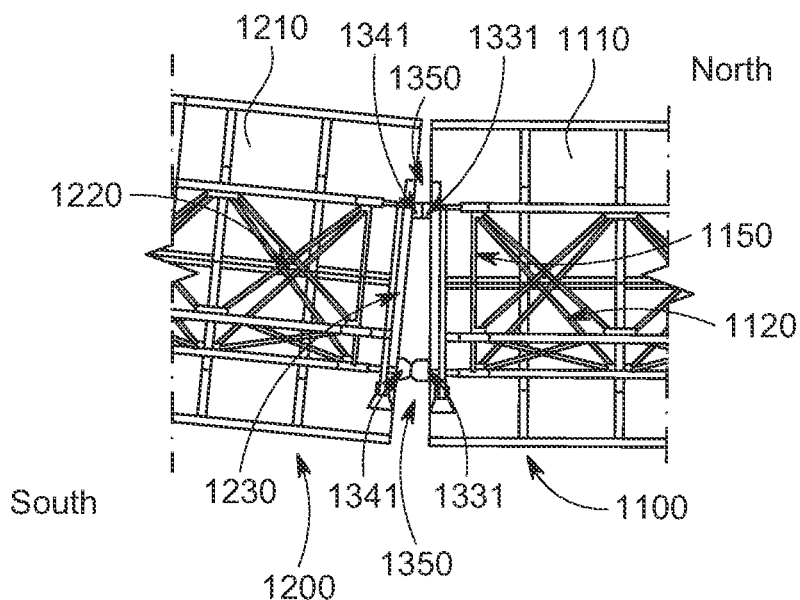
Figure 9E:
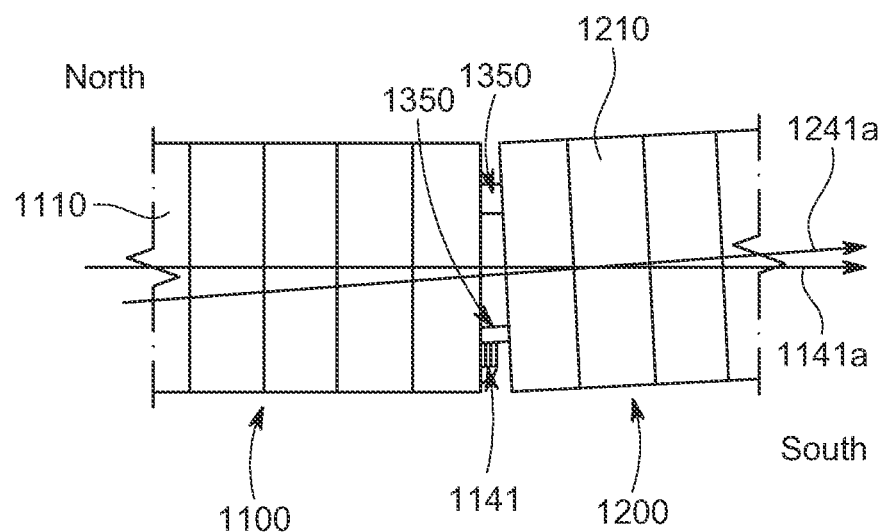

FIGS. 9c, 9d and 9e are three different views of a drive module 1100 and an additional module 1200 having their rotation axes 1141a and 1241a out of alignment and these two modules 1100 and 1200 are kinematically coupled by two kinematic coupling devices 1300 in accordance with this first embodiment and inclined at an angle close to 60 degrees. These three views represent the same set-up from three different points of view.

FIG. 9c is a perspective view in which the lower rollers 1241c and the upper rollers 1241b of the additional rotation kinematic guide device 1241 are shown. In this figure the movement in translation of the two tables 1110 and 1210 relative to one another via the two universal joint connections 1350 mobile in translation is also shown.

FIGS. 9d and 9e are profile views of the set-up shown in FIG. 9c. Note therein the altitude difference present between the drive module 1100 and the additional module 1200 and the opposite movement in translation of the two universal joint connections 1350 mobile in translation enabling continuity of kinematic movement from the drive module 1100 to the additional module 1200. The kinematic coupling between the two modules is therefore made possible by two universal joint connections 1350 mobile in translation in this first embodiment.

The kinematic coupling device 1300 in this first embodiment is configured to enable kinematic coupling and synchronized kinematic movements between two modules coupled by at least one kinematic coupling device 1300 in this first embodiment.

The present invention may advantageously comprise beam/support arch pivot connections 1370 configured to cooperate with this kinematic coupling device 1300 in order to enhance the effectiveness of this first embodiment.

The present invention may optionally but preferably comprise ground suspensions 1170, 1270 configured to cooperate with the kinematic coupling device 1300 in order to enhance the effectiveness of this first embodiment.

Ground Suspension

One embodiment of a ground suspension configured to cooperate with the present invention in order to improve the kinematic coupling between two modules will now be described.

FIG. 10a is a perspective view of a ground suspension 1170 in accordance with a preferred embodiment. This ground suspension 1170 comprises a preferably metal part of U shape 1171. This advantageous shape enables provision of a spring and thus suspension effect as soon as a branch 1171b or 1171c of the U is disposed on the ground and the other branch of the U supports a ground support 1140, 1160, 1240 of a module 1100, 1200.

In one embodiment, a ground support 1140, 1160, 1240 rests on only one ground suspension 1170 of U shape 1171.

In a preferred embodiment, a ground support 1140, 1160, 1240 rests on two ground suspensions 1170. This makes it possible to provide two degrees of freedom in suspension for the ground support and therefore both to provide better adaptability to irregularity of the terrain 2000 and also to improve the kinematic coupling between the two modules.

In FIG. 10b, as well as showing one use of the ground suspension 1170 of U shape 1171, the rotation kinematic drive device 1141 is shown. This device 1141 already described above enables the drive module 1100 to be driven in rotation about the principal rotation axis 1141a.

Similarly, in this figure, a braking device 1142 described above is also shown, in particular the brake rollers 1142a and 1142b.

In another embodiment, a single ground suspension 1170 may be common to two contiguous modules.

In a further embodiment, a single component may integrate two ground suspensions 1170 and be common to two contiguous modules.

In another embodiment, a plurality of ground suspensions 1170 may be common to two contiguous modules.

In FIG. 10c is shown a rotation kinematic drive device 1141. This device 1141 already described above enables the drive module 1100 to be driven in rotation about the principal rotation axis 1141a. In the embodiment illustrated by this FIG. 10c, the rotation kinematic drive device 1141 comprises a rack 1141d configured to cooperate with a pinion 1141c not shown in this figure.

An advantageous rotation kinematic accompanying device 1143 is represented in this figure. This device 1143 is configured to accompany the arcuate member 1131 of the first support arch 1130 in its movement in rotation. This accompaniment is advantageously achieved via accompanying rollers 1143*a* and 1143*b*. This rotation kinematic accompanying device 1143 comprises at least one upper accompanying roller 1143*a* and at least one lower accompanying roller 1143*b*.

Figure 11A:
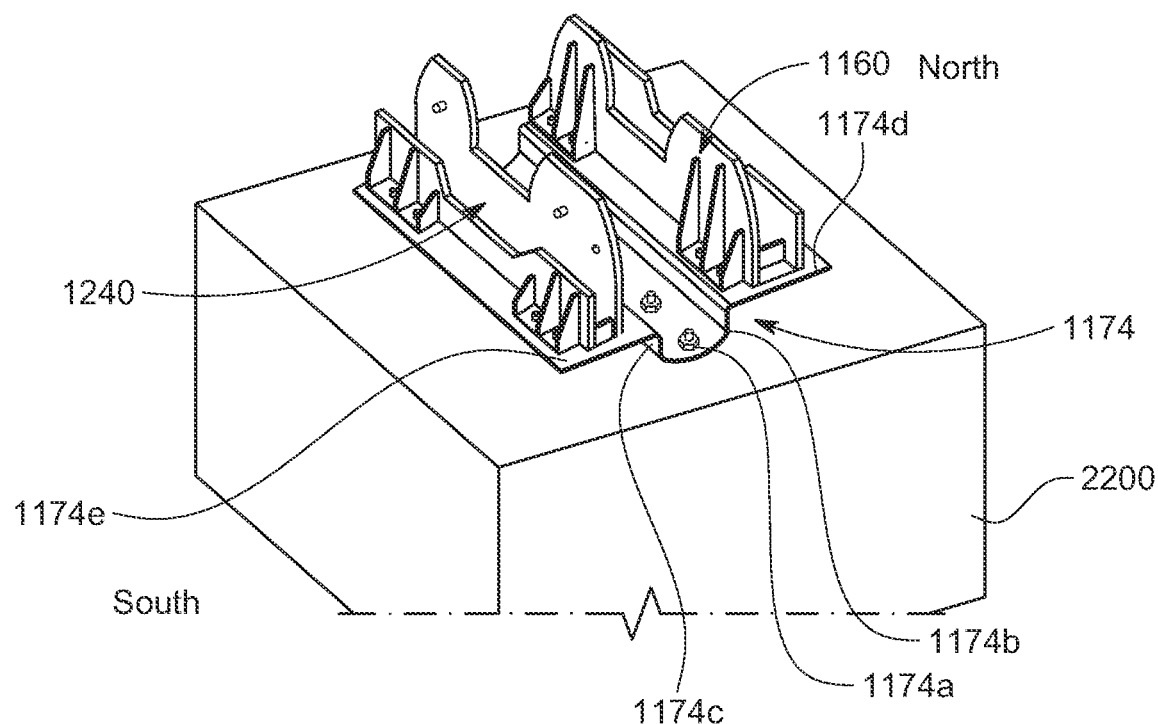
FIGS. 11a and 11b are two views of a ground suspension common to two modules according to one embodiment of the present invention.
Figure 11B:
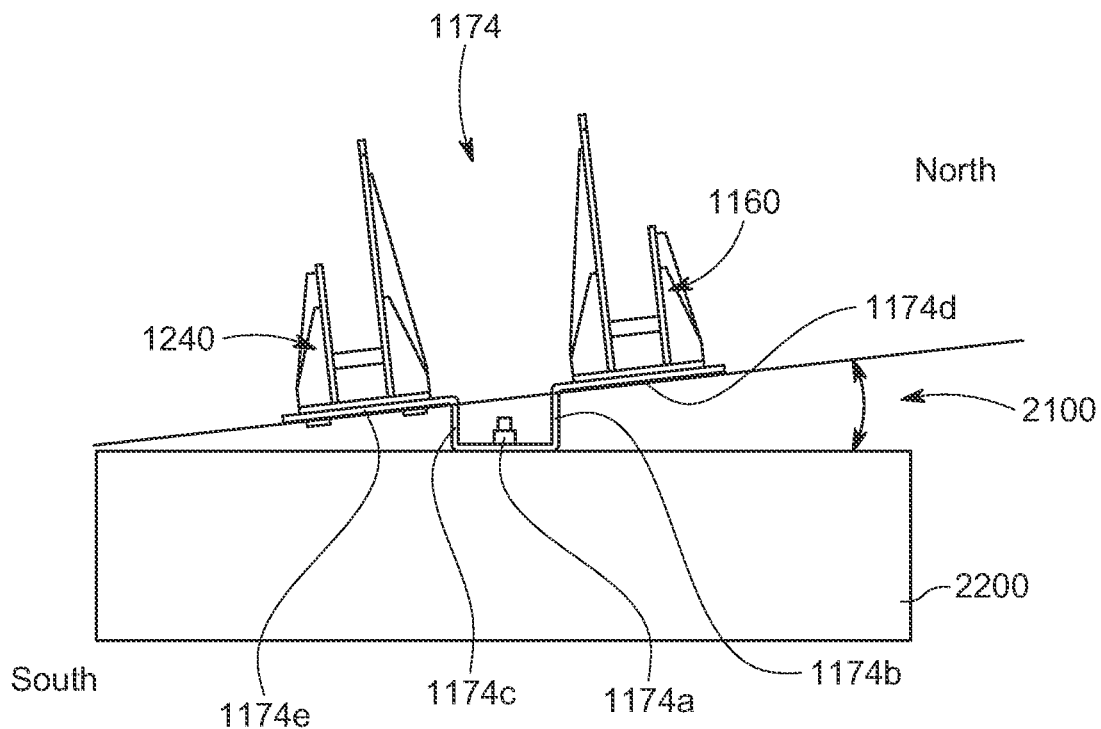

FIGS. 11*a* and 11*b* are views of a ground suspension 1174 in this other embodiment in which the latter is common to two contiguous modules.

In this embodiment, this common ground suspension 1174 comprises a base 1174*a*, two substantially vertical branches 1174*b* and 1174*c* and two substantially horizontal plates 1174*d* and 1174*e*.

The base 1174*a* of this common ground suspension 1174 rests at ground level, and preferably on a support block 2200.

The two substantially vertical branches 1174*b* and 1174*c* each support one of the two plates 1174*d* and 1174*e*.

Each plate 1174*d* and 1174*e* is configured to support a ground support 1160, 1240 in accordance with the present invention.

This, preferably metal, common ground suspension 1174 has by virtue of its shape a suspension effect at the level of each plate 1174*d* and 1174*e*.

Moreover, as shown in FIG. 11*b*, each plate 1174*d* and 1174*e* can be more or less inclined when assembling the solar tracker 1000 in order to compensate at least in part an altitude difference 2100 between two contiguous modules.

The ground suspensions 1170, 1174 operate in synergy with the coupling devices and enable a greater freedom of movement between two consecutive modules whilst allowing good transmission of rotation between these two modules.

Although operating in synergy with the coupling devices, the ground suspensions 1170, 1174 may function independently of one another. Protection for the ground suspensions 1170, 1174 may be claimed independently of protection for the coupling devices.

By way of nonlimiting example, the tongue comprises at least one material from at least the following materials: an elastic material or a material imparting elasticity to the system.

Second Embodiment

There will now be described a nonlimiting second embodiment of the present invention. The features of this second embodiment remain compatible with the features described above and with those of the embodiment to be described afterwards.

Figure 12A:
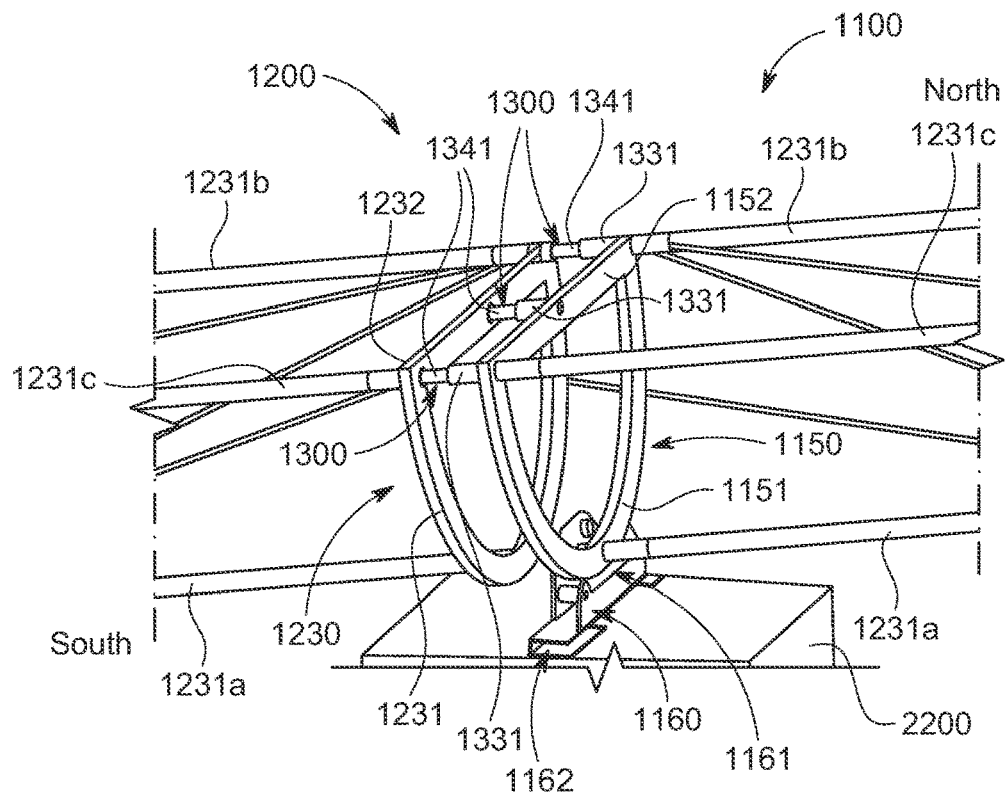
FIGS. 12a and 12b show an application of a second embodiment of the present invention.
Figure 12B:
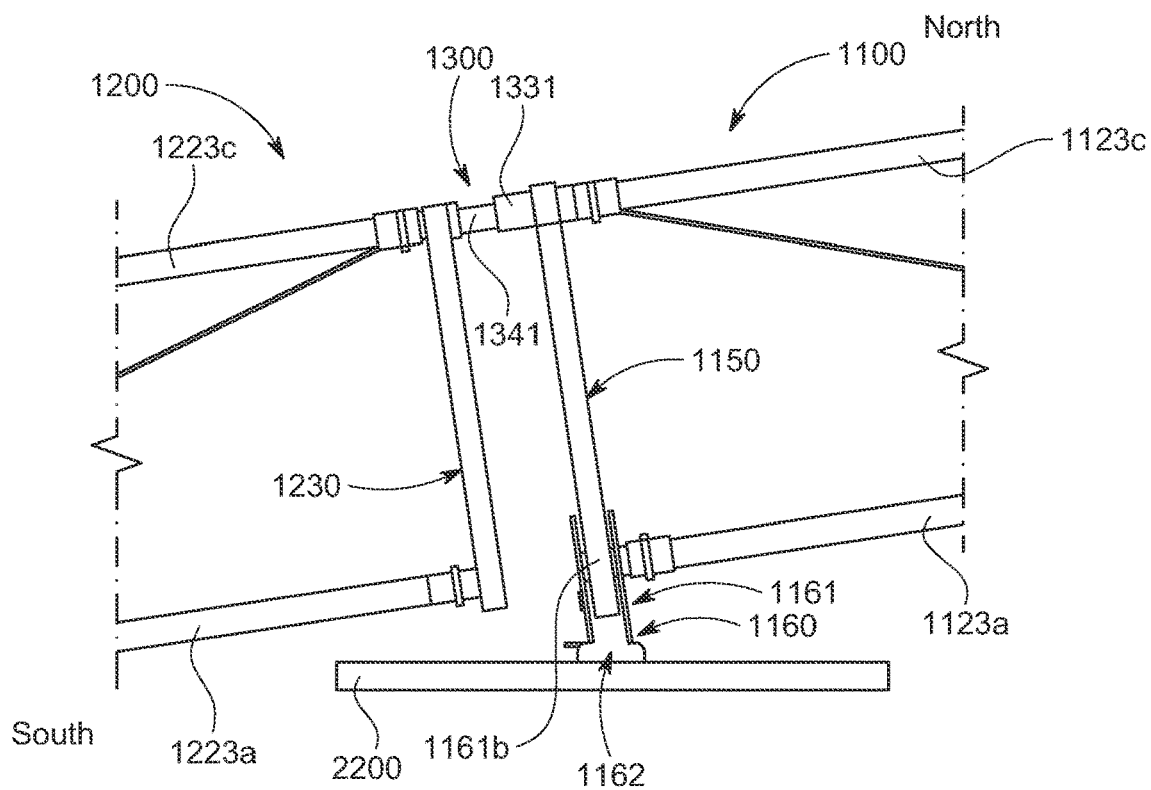

FIGS. 12*a* and 12*b* show an application of the present invention, and more particularly of a kinematic coupling device 1300 according to this second embodiment.

Thus FIG. 12*a* is a perspective view of three kinematic coupling devices 1300 in accordance with this second embodiment disposed between a drive module 1100 and an additional module 1200.

As before, the drive module 1100 comprises a lattice structure 1120 and a second support arch 1150 disposed at the level of the second end 1122 of the lattice structure 1120. The second support arch 1150 comprises three female parts 1331 configured to be mechanically coupled to three male parts 1341 carried by the additional support arch 1230 of the additional module 1200.

It will be noted that in one embodiment the additional support arch 1230 does not rest on a ground support 1240. Indeed, in this embodiment the additional module 1200 comprises only one ground support 1240 disposed at the level of the end of the additional lattice structure 1220 opposite the second ground support 1160 of the drive module 1100.

The second ground support 1160 advantageously rests on a support block 2200 similar to those described above.

As is shown in FIG. 12*b*, this second ground support 1160 rests on a pivot support 1162 configured to allow rotation of the second ground support 1160 and therefore of the second support arch 1150 about a rotation axis perpendicular to the principal rotation axis 1141*a* of the drive module 1100. This pivot support 1162 confers on the present invention a supplemental degree of freedom so as to compensate at least in part irregularities of the terrain 2000.

As before for the first embodiment, the kinematic coupling devices 1300 in accordance with this second embodiment are configured to enable tracking of the movement of the sun by all of the additional modules 1200 of the solar tracker 1000 by kinematically coupling the drive module 1100 and the additional modules 1200.

Universal Joint Connection Mobile in Translation

Figure 13A:
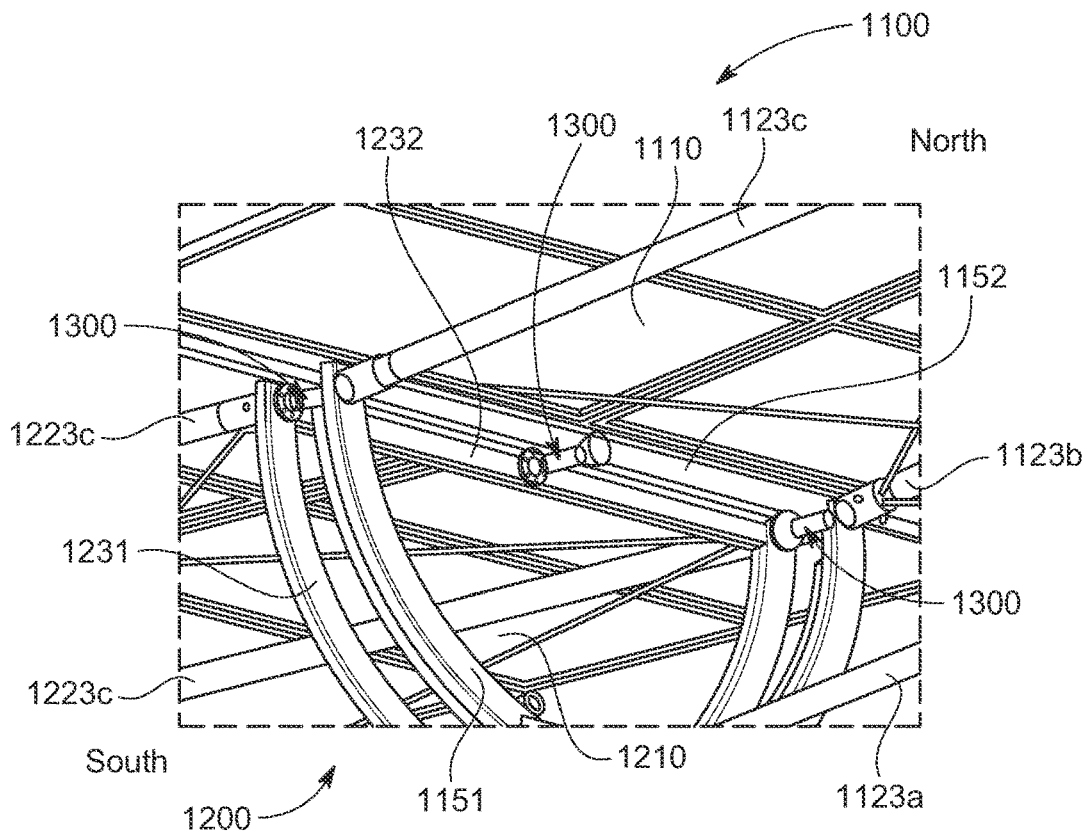
FIGS. 13a and 13b are two perspective views showing an application of the three universal joint connections mobile in translation according to the second embodiment of the present invention.
Figure 13B:
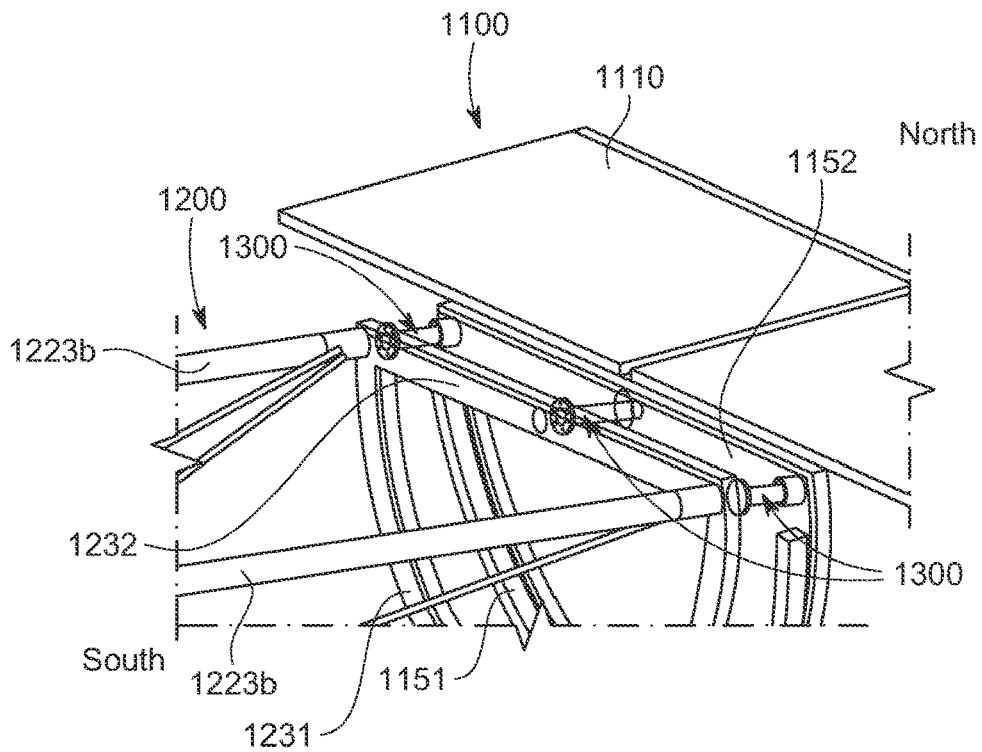

FIGS. 13*a* and 13*b* are two perspective views as if transparent of the three kinematic coupling devices 1300 in accordance with the second embodiment of the present invention. Each kinematic coupling device 1300 in accordance with this embodiment comprises a universal joint connection 1350 mobile in translation. This universal joint connection 1350 mobile in translation advantageously comprises a first part 1330 and a second part 1340.

In a preferred embodiment the first part 1330 is preferably configured to receive the second part 1340. The first part 1330 is preferably carried by the drive module 1100. This first part 1330 preferably comprises a female part 1331 configured to cooperate with a male part 1341 of the second part 1340 carried by the additional module 1200.

In a preferred embodiment, the three universal joint connections 1350 mobile in translation in accordance with this second embodiment are disposed at the level of the diameters 1132, 1152 and 1232 of the support arches 1130, 1150 and 1230.

Figure 14A:
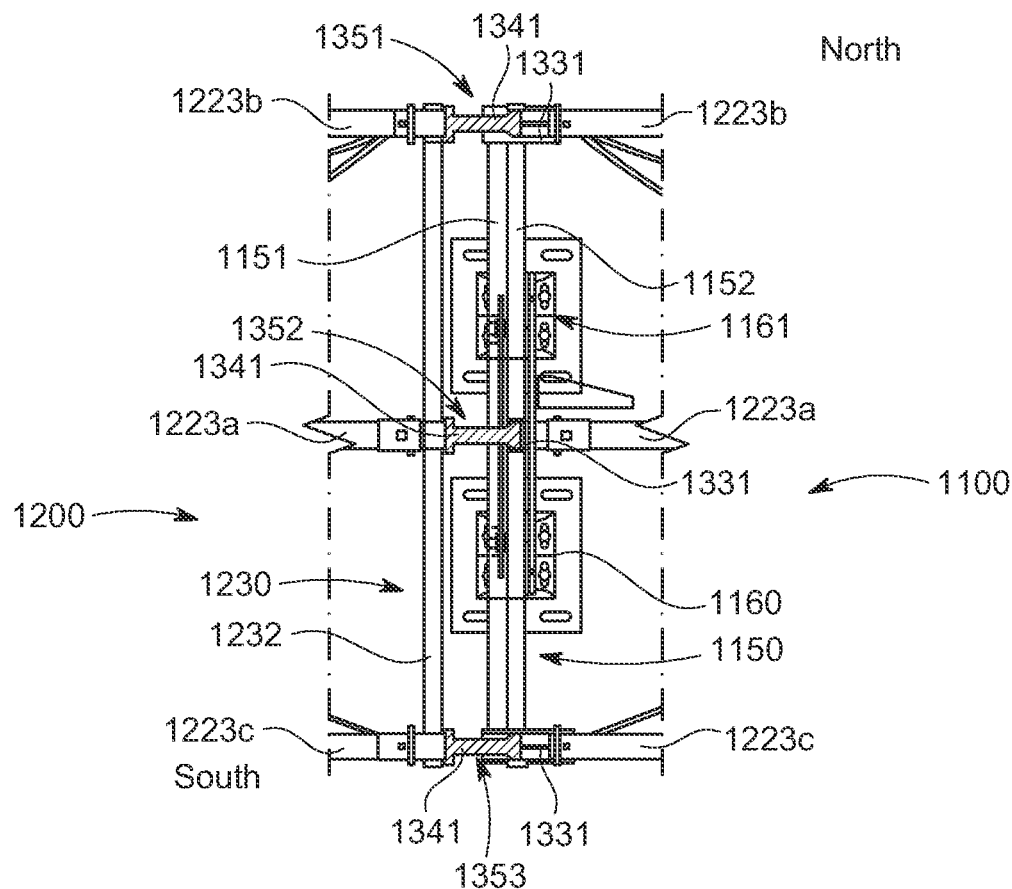
FIGS. 14a, 14b and 14c are three sectional views of the elements forming the three universal joint connections mobile in translation according to the second embodiment of the present invention. In the 14a and 14b views, there is no offset between the two modules.
Figure 14B:
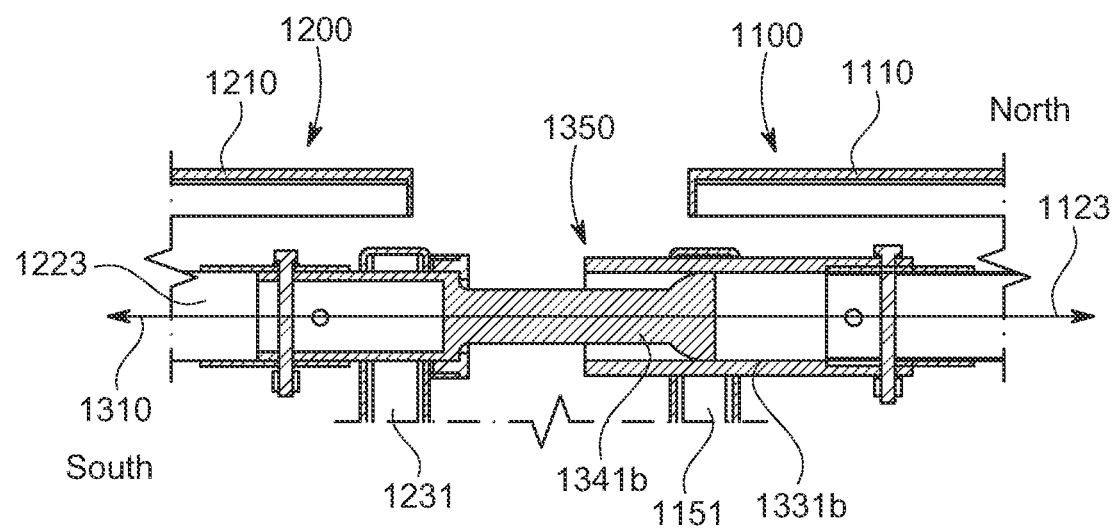
Figure 14C:
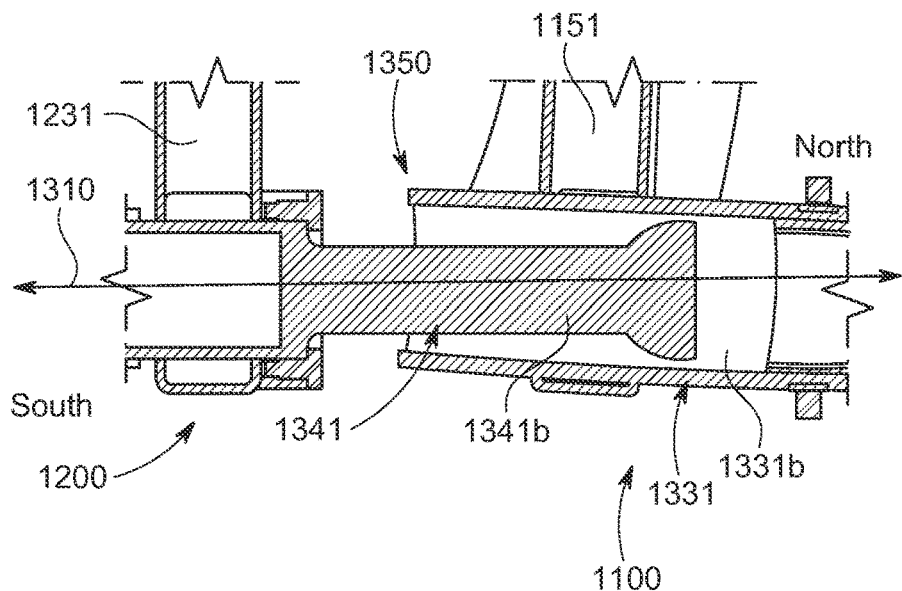

FIGS. 14*a*, 14*b* and 14*c* correspond to sectional views of these universal joint connections 1350 mobile in translation.

FIG. 14*a* is a view from above of three universal joint connections 1350 mobile in translation in accordance with the second embodiment. This figure therefore shows a first instance 1351, a second instance 1352 and a third instance 1353 of a universal joint connection 1350 mobile in translation.

The female part 1331 is configured to receive at least in part the male part 1341 so as to enable movement in translation of the male part 1341 in the female part 1331 along a secondary translation axis 1310.

In one embodiment, the secondary translation axis 1310 is an axis coplanar with the principal rotation axis 1141*a* and/or the additional rotation axis 1241*a*.

The universal joint connection 1350 mobile in translation in accordance with this second embodiment advantageously comprises a male part 1341 comprising a cylinder mounted on a spherical, preferably hemispherical, structure 1341*b* and a female part 1331 comprising a sheath 1331*b* configured to allow movement in translation along the secondary translation axis 1310 of the cylinder mounted on the spherical structure 1341*b* in the sheath 1331*b* and the universal joint function.

In one embodiment the second universal joint connection 1352 mobile in translation has a female part 1331 in which the depth of the sheath 1331b is reduced relative to the sheaths 1331 of the first universal joint connection mobile in translation 1351 and the second universal joint connection 1353 mobile in translation.

This forms universal joint connection 1350 mobile in translation in accordance with this second embodiment. Indeed, the female part 1331 mechanically connected to the lattice structure 1120 is configured to cooperate with the male part 1341 mechanically connected to the additional lattice structures 1220. In this configuration, the connection 1350 formed in this way has degrees of freedom in rotation and in translation: the spherical part of the male part 1341 can indeed move in the sheath 1331b of the female part 1331 with movements in translation but equally in rotation as the same terms as a universal joint.

The spherical part of the male part 1341 may advantageously comprise materials different from the materials that the cylindrical part of the male part 1341 comprises and/or materials that the sheath 1331b of the female part 1331 and/or at least the interior coating of said sheath 1331b comprise(s), in order to limit mechanical friction stresses.

FIGS. 14b and 14c are sectional views of a universal joint connection 1350 mobile in translation in accordance with this second embodiment.

FIG. 14b shows a quasi-perfect alignment of the extension axis of the male part 1341 relative to the extension axis of the female part 1331.

FIG. 14c for its part show a misalignment of the extension axis of the male part 1341 relative to the extension axis of the female part 1331, that is to say between the drive module 1100 and the additional module 1200. This misalignment results in a slight inclination of the male part 1341 relative to the female part 1331. This figure make it possible to show unambiguously the universal joint function of this universal joint connection 1350 mobile in translation.

Figure 14D:
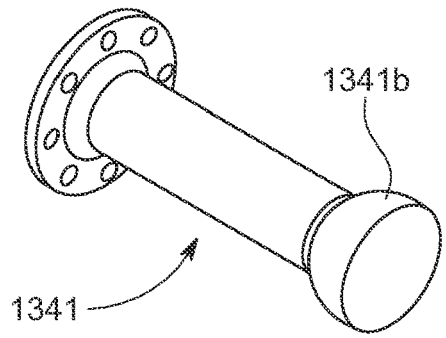
FIGS. 14d and 14e show a nonlimiting example of male and female parts forming the kinematic coupling device of this second embodiment.

FIG. 14d is a perspective view of the male part 1341 of the second part 1340 of the universal joint connection 1350 mobile in translation in accordance with this second embodiment. This male part 1341 preferably comprises a spatial extension in the form of a cylinder 1341b comprising at one of its ends means for fixing it to the additional module 1200, and preferably to the additional lattice structure 1220, and at the other of its ends a truncated sphere at the level of the distal part of the male part 1341.

Figure 14E:
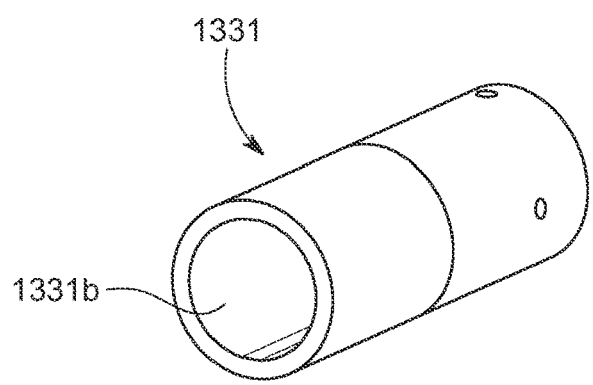

FIG. 14e is a perspective view of the female part 1331 of the first part 1330 of the universal joint connection 1350 mobile in translation in accordance with this second embodiment. This female part 1331 preferably takes the form of a sheath 1331b one of the ends of which features an oblong hole for example and the other end of which comprises means for fixing it to the drive module 1100 and preferably to the lattice structure 1120.

Figure 15A:
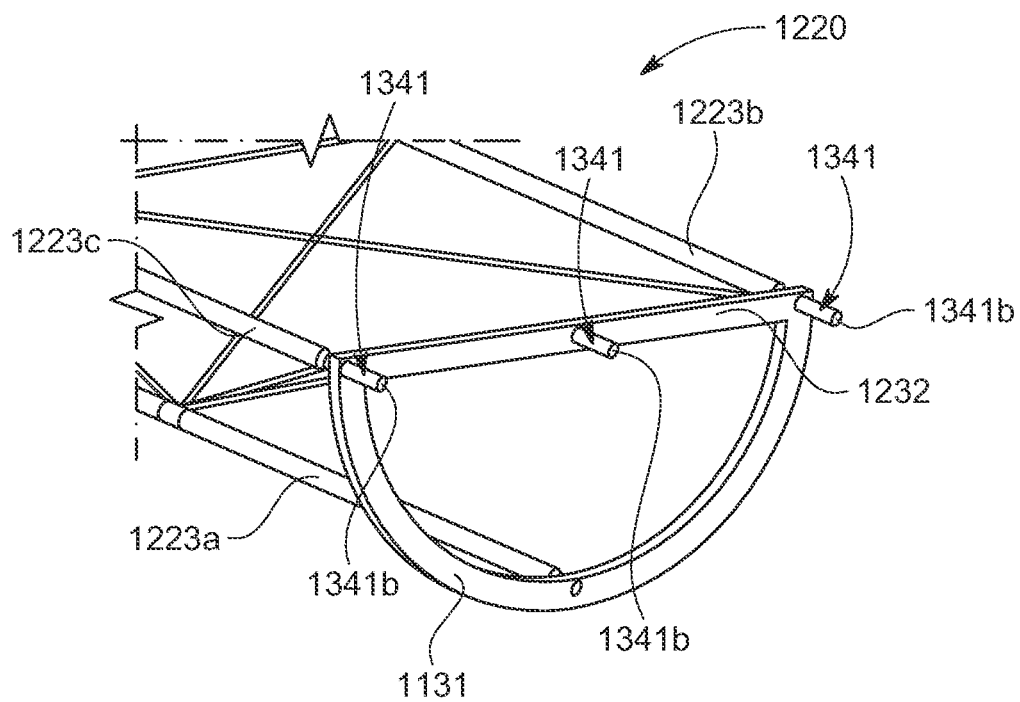
FIGS. 15a and 15b are perspective views of the elements constituting three kinematic coupling devices according to the second embodiment of the present invention.
Figure 15B:
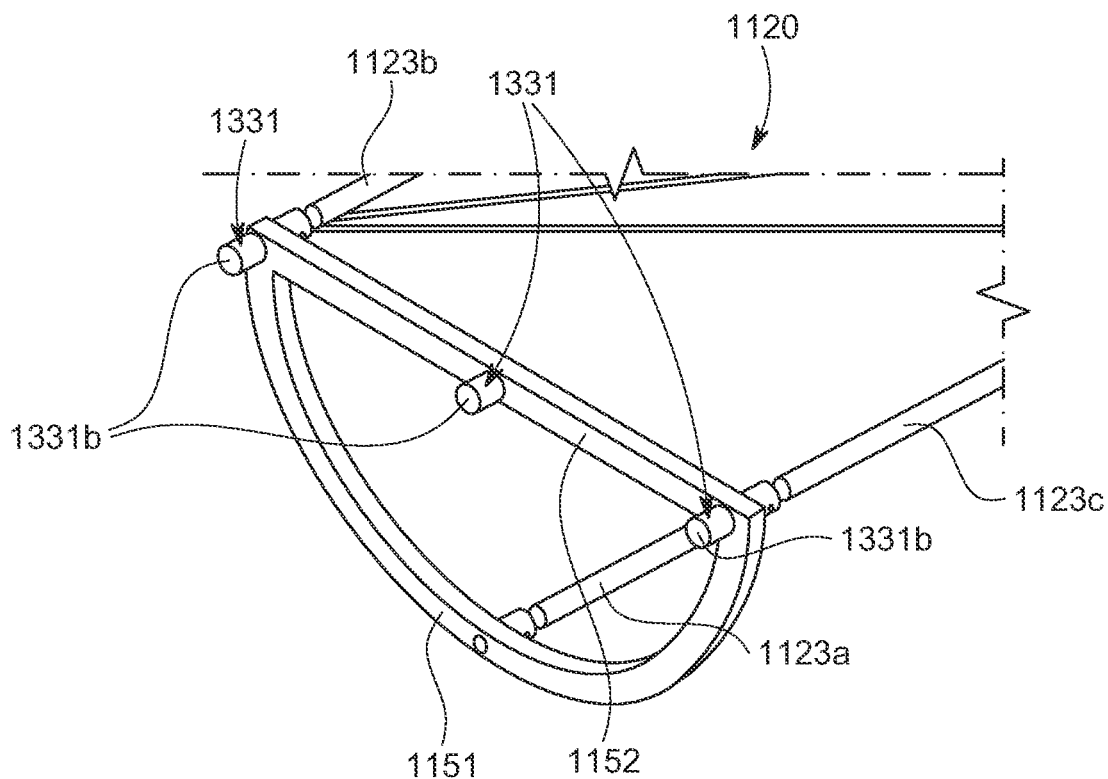

FIGS. 15a and 15b are respectively perspective views of the additional lattice structure 1220 of the additional module 1200 and the lattice structure 1120 of the drive module 1100.

In FIG. 15a will be noted the presence of the male parts 1341 of the three universal joint connections 1350 mobile in translation in accordance with this second embodiment.

As indicated above, these male parts 1341 are preferably disposed at the level of the additional diameter 1232 of the additional support arch 1230. In order to enable distribution of torques and mechanical forces, the male parts 1341 are advantageously gradually disposed equidistantly.

Thus one male part 1341 is disposed at the center of the additional diameter 1232 and the two other male parts 1341 are disposed one at each end of said additional diameter 1232.

In FIG. 15b will be noted the presence of the female parts 1331 of the three universal joint connections 1350 mobile in translation in accordance with this second embodiment.

As indicated above and in an image of the male parts 1341 from FIG. 15a, these female parts 1331 are preferably disposed at the level of the diameter 1152 of the second support arch 1150 of the drive module 1100. To enable distribution of the torques and mechanical forces, the female parts 1331 are advantageously gradually disposed equidistantly so as to coincide with the male parts 1341. Thus one female part 1331 is disposed at the center of the diameter 1152 and the two other female parts 1331 are disposed one at each end of said diameter 1152.

The present invention may optionally but preferably comprise ground suspensions 1170, 1270 configured to cooperate with this kinematic coupling device 1300 in order to enhance the effectiveness of this second embodiment.

Nonlimiting Embodiments

Figure 16A:
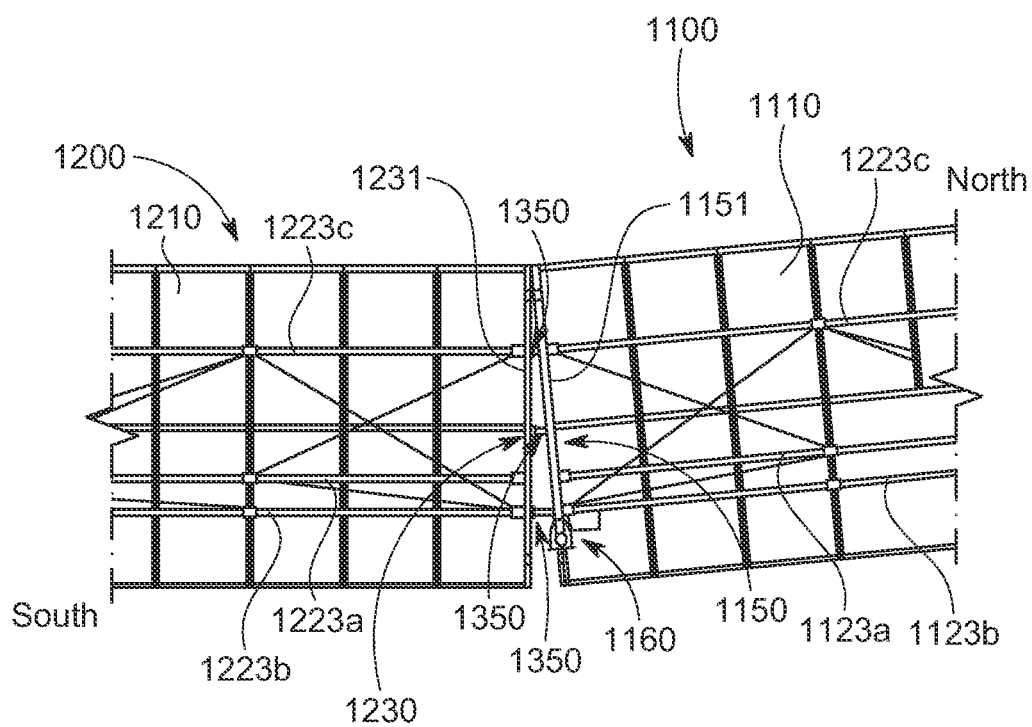
FIGS. 16a and 16b show an application of the three universal joint connections mobile in translation according to the second embodiment of the present invention in the presence of a misalignment between two modules.
Figure 16B:
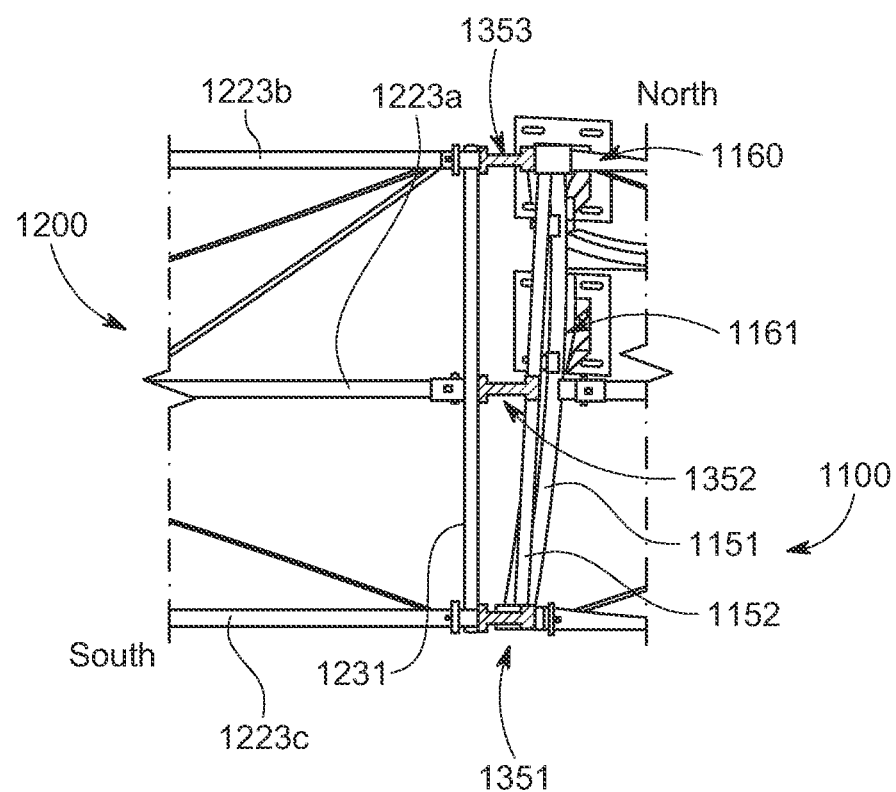

FIGS. 16a and 16b show a drive module 1100 and an additional module 1200 in one application of the second embodiment of the present invention.

There will be noted in these figures the misalignment between the drive module 1100 and the additional module 1200, seen clearly through the inclination of the tables 1110 and 1210 at an angle close to 60 degrees towards the West.

FIG. 16a is a profile view that shows the relative movement in translation of the drive module 1100 and the additional module 1200 via the three universal joint connections 1350 mobile in translation in accordance with this second embodiment.

As for the previous first embodiment, and as shown in FIG. 16b in a sectional view from above, the third universal joint connection 1353 mobile in translation features a maximum spatial extent, that is to say that only the spherical part of the cylinder 1341b of the male part 1341 of the connection 1353 is inserted in the sheath 1331b of the corresponding female part 1331. The first universal joint connection 1351 mobile in translation features a minimum spatial extent, that is to say that virtually all of the cylinder 1341b of the male part 1341 of the connection 1351 is inserted in the sheath 1331b of the corresponding female part 1331.

In a manner equivalent to the first embodiment, this embodiment enables kinematic coupling from a drive module 1100 to an additional module 1200 even when altitude differences of several degrees exist between the modules of each pair.

By way of nonlimiting example, the male part is made so as to confer the required strength and elasticity on the part.

Third Embodiment

There will now be described a nonlimiting third embodiment of the present invention. The features of this third embodiment remain compatible with the features described above.

Figure 17A:
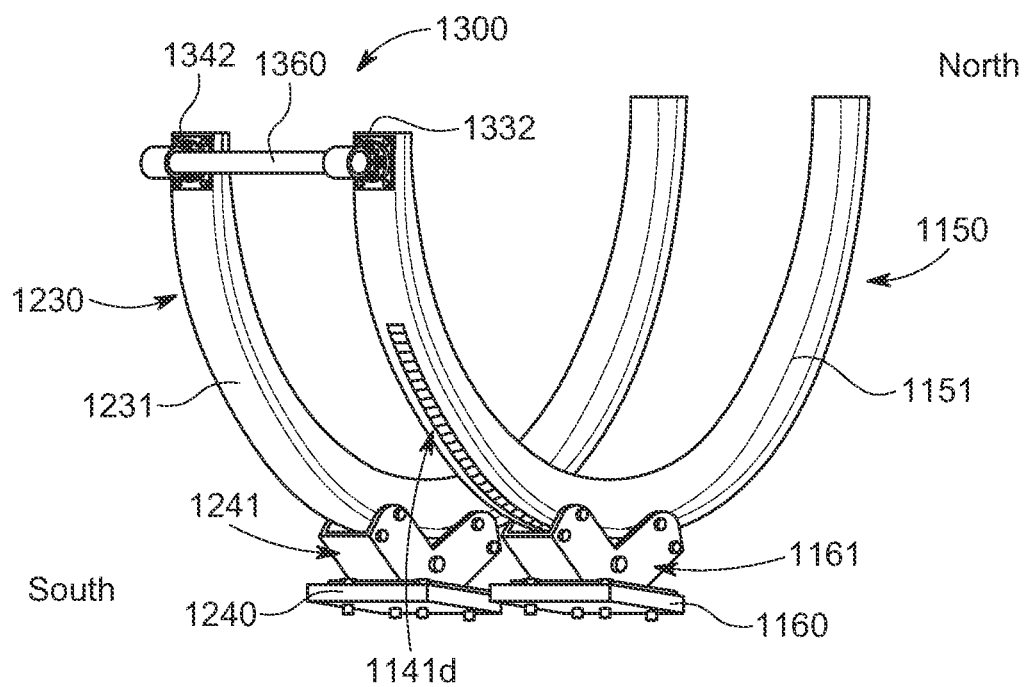
FIGS. 17a and 17b show an application of a third embodiment of the present invention.
Figure 17B:
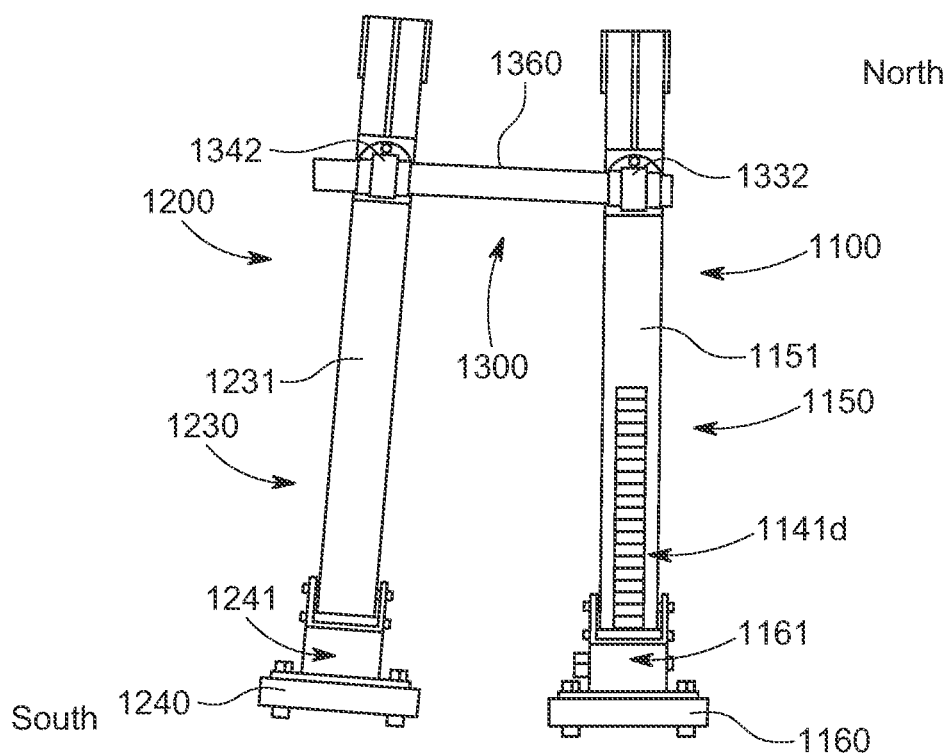

FIGS. 17a and 17b are two views of an application of the present invention, and more particularly of a kinematic coupling device 1300 in accordance with this third embodiment.

FIG. 17a is a perspective view of a support arch 1150 and an additional support arch 1230 resting on a respective ground support 1160 and 1240 and kinematically coupled to one another via a kinematic coupling device 1300 in accordance with this embodiment.

This kinematic coupling device 1300 is advantageously disposed at the level of one of the ends of diameters of the two support arches 1150 and 1230, which makes it possible to exploit the geometry of the modules and to limit the force generated by the torque upon transmission of movement from one module to another.

This moreover makes it possible not to impede the rotation of the support arches 1150 and 1230 when they are driven and/or guided at the level of their ground supports 1160 and 1240, respectively.

In this embodiment, this kinematic coupling device 1300 comprises at least one first pivot articulation device 1332, at least one second pivot articulation device 1342 and at least one kinematic transfer shaft 1360 configured to connect the first pivot articulation device 1332 and the second pivot articulation device 1342 mechanically. The first pivot articulation device 1332 and/or the second pivot articulation device 1342 is or are preferably limited in relative movement and comprise(s) a sliding connection preferably provided by tubes 1332a and 1342a in which slides a kinematic transfer shaft 1361.

The kinematic coupling device 1300 in accordance with this third embodiment is advantageously configured to form a gimbal joint type connection between the modules of each pair of modules of the solar tracker 1000.

FIG. 17b is a profile view of the elements from FIG. 17a. There will be noted more clearly in FIG. 17b the altitude difference and the misalignment of the supports in space or in parallel horizontal planes between the support arch 1150 and the additional support arch 1230. This altitude difference therefore leads to a misalignment between the principal rotation axis 1141a of the drive module 1100 and the additional rotation axis 1241a of the additional module 1200.

There will be noted in these two figures the optional presence of a rack 1141d at the level of the support arch 1150. As described above, this rack 1141d may be configured to cooperate with a pinion 1141c concealed at the level of the ground support 1160 in a kinematic drive device 1141 configured to drive the drive module 1100 and therefore the support arch 1150 in a first kinematic movement. This first kinematic movement preferably corresponds to rotation of the drive module 1100 about a principal rotation axis 1141a in order and preferably to track the movement of the sun.

FIGS. 18a to 18d are multiple perspective views of an application of the present invention and more particularly of two kinematic coupling devices 1300 in accordance with this third embodiment.

In this embodiment, two kinematic coupling devices 1300 in accordance with the third embodiment are used for kinematically coupling the drive module 1100 and the additional module 1200.

These four figures show from four different points of view these two kinematic coupling devices 1300 each comprising a first pivot articulation device 1332, a second pivot articulation device 1342 and a kinematic transfer shaft 1361 and 1362.

As described hereinafter, the kinematic transfer shaft 1361, 1362 is advantageously configured to be mobile in translation relative to the first pivot articulation device 1332 and the second pivot articulation device 1342.

As shown in these figures, in the presence of an altitude difference the two support arches 1150 and 1230 remain kinematically coupled by these two kinematic coupling devices 1300.

In this embodiment, the two kinematic coupling devices 1300 are each disposed at the level of one end of the diameter of each support arch 1150 and 1230.

Thus each support arch 1150 and 1230 comprises at the ends of its diameter a pivot articulation device 1332, 1342 configured to receive a kinematic transfer shaft 1361, 1362 connecting it mechanically to its twin pivot articulation device disposed on the opposite support arch.

Figure 18A:
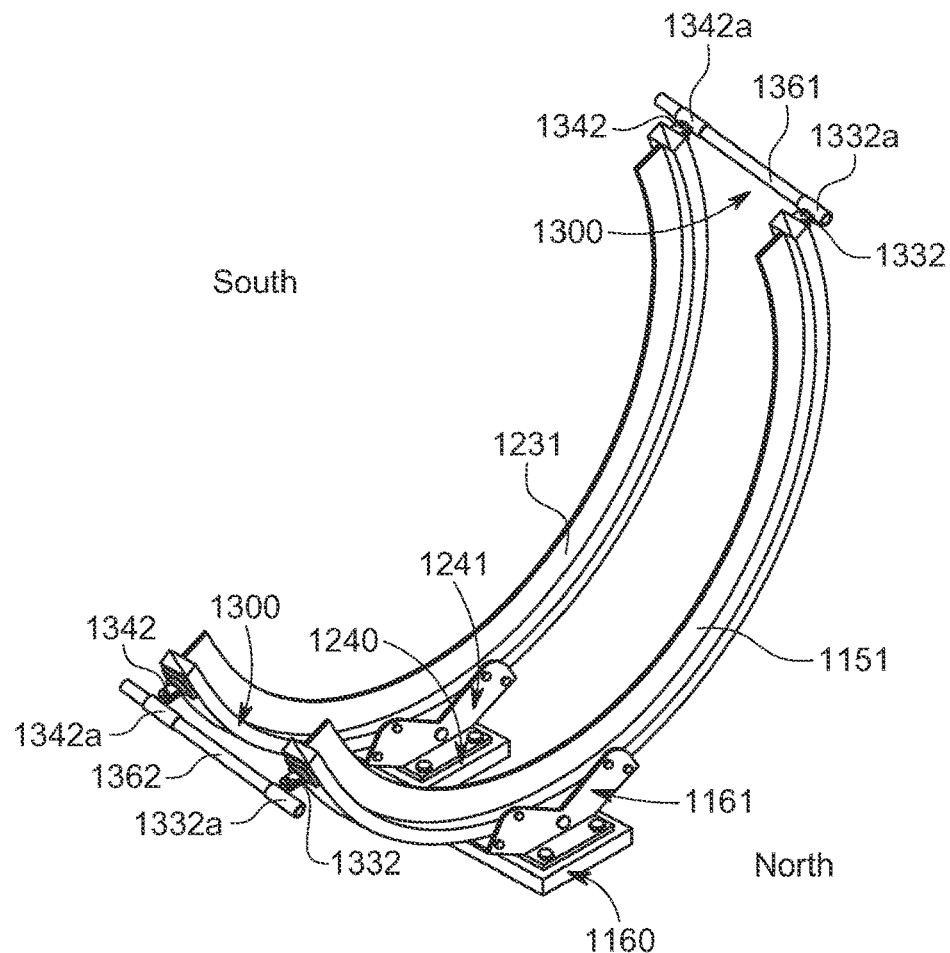
FIGS. 18a, 18b, 18c and 18d show another application of a third embodiment of the present invention.
Figure 18B:
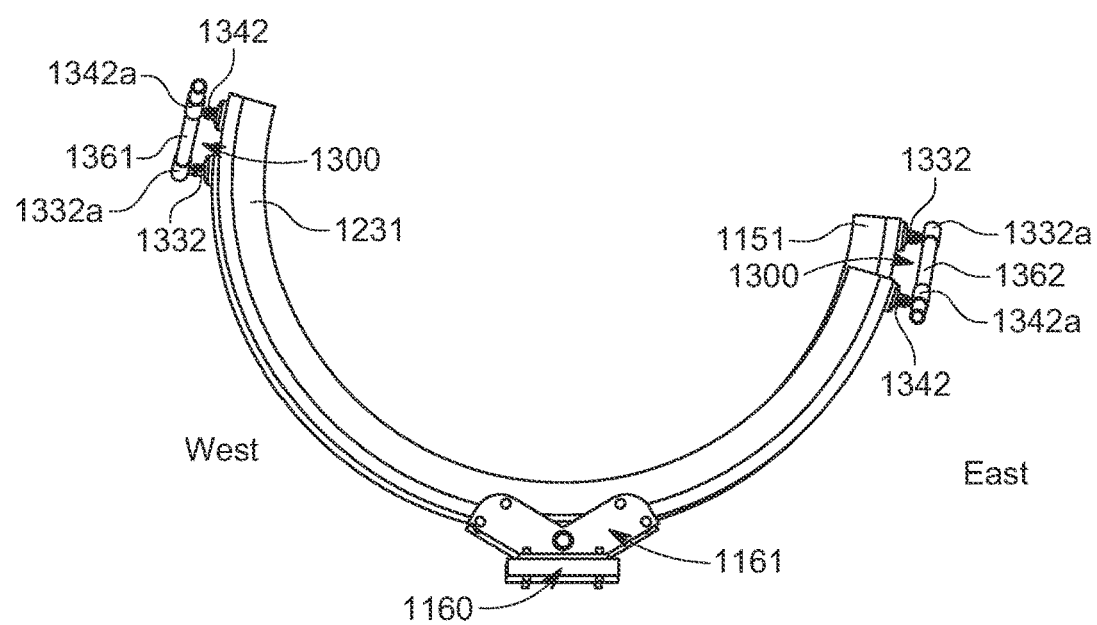
Figure 18C:
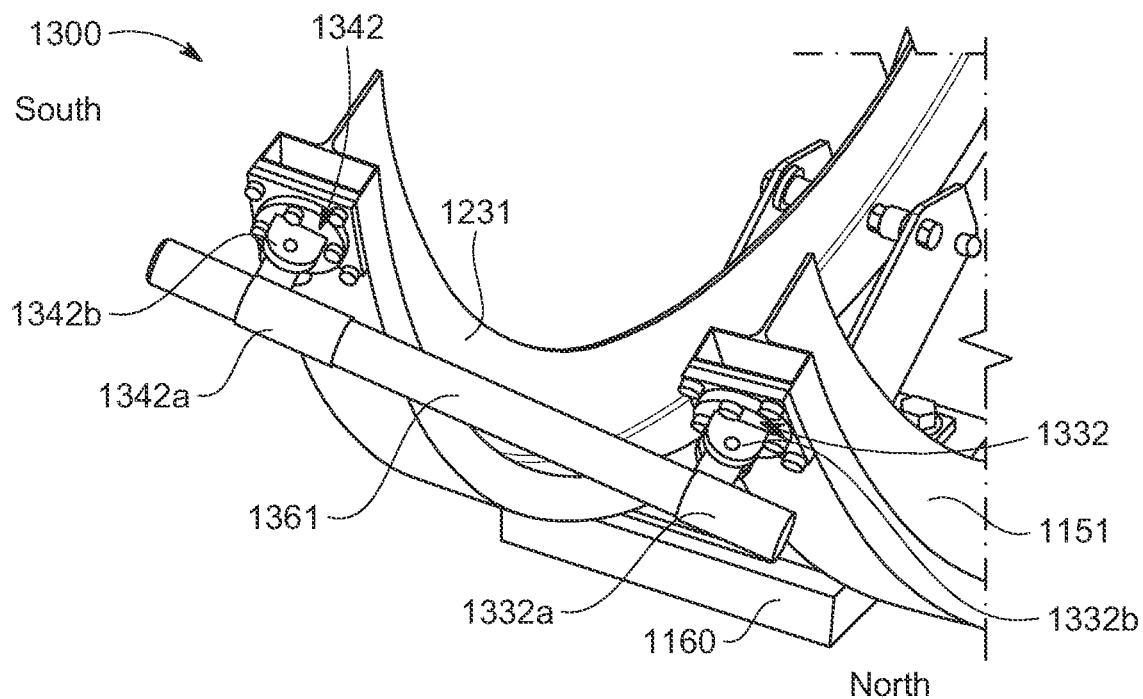
Figure 18D:
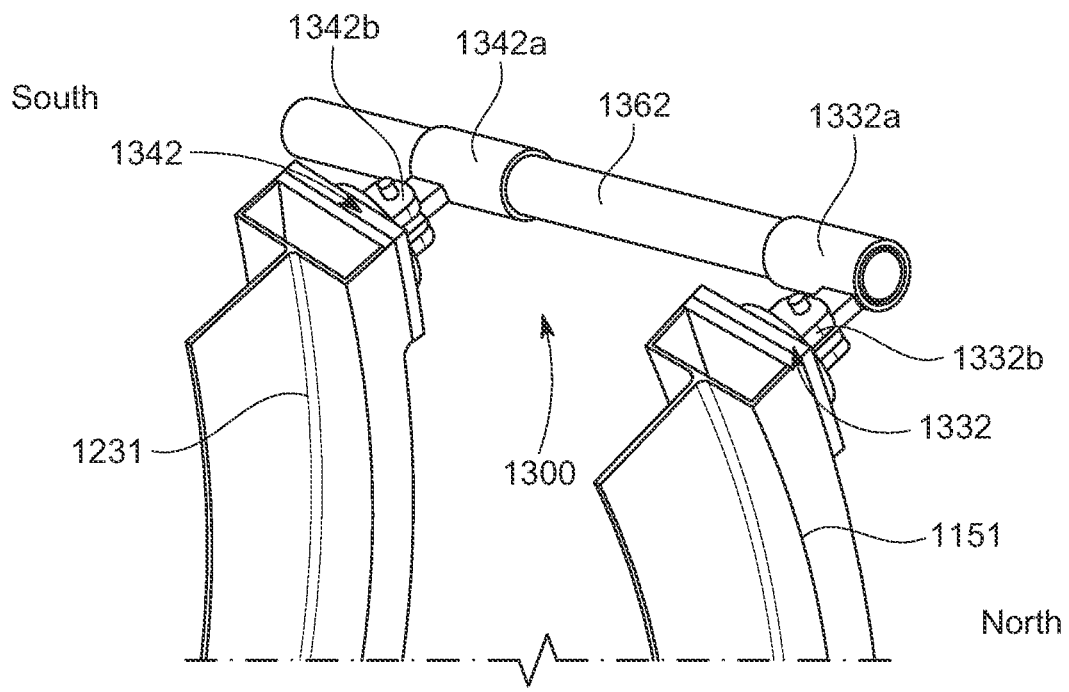

There will be noted in FIGS. 18c and 18d the presence of two tubes 1332a and 1342a each mechanically connected to at least one pivot articulation device 1332 and 1342.

These tubes 1332a and 1342a are respectively configured to receive the kinematic transfer shafts 1361 and 1362, respectively, also termed "force arms", in order to connect them mechanically to the pivot articulation devices 1332 and 1342, respectively, whilst enabling movement in translation thereof via the tubes 1332a and 1342a, respectively.

In a preferred embodiment, said movement in translation of the kinematic transfer shafts 1361 and 1362 through the tubes 1332a and 1342a, respectively, enables the kinematic coupling between the two modules to be established during the phase of adjustment of the solar tracker. Once this adjustment phase has been completed, the degree of freedom in translation of one of the two kinematic transfer shafts 1361 and 1362 is eliminated.

More generally, in a preferred embodiment, once the adjustment phase has finished, the degrees of freedom of one of the two coupling devices 1300 shown in FIGS. 18a and 18b are eliminated. Thus only one of the two coupling devices 1300 in this embodiment continues to have all of its degrees of freedom. Thus the solar tracker is configured so as to be able to eliminate at least one and preferably all of the degrees of freedom of some and preferably only one of the kinematic coupling devices.

Also, in these two figures, the first pivot articulation device 1332 comprises at least one articulation 1332b mechanically connecting the tube 1332a and the arcuate member 1151 of the second support arch 1150.

Also, in these two figures, the second pivot articulation device 1342 comprises at least one articulation 1342b mechanically connecting the tube 1342a and the additional arcuate member 1231 of the additional support arch 1230.

As before in the first and second embodiments, the kinematic coupling devices 1300 in this third embodiment are configured to enable tracking of the movement of the sun by all of the additional modules 1200 of the solar tracker 1000 by kinematically coupling the drive module 1100 and the additional modules 1200.

Pivot Articulation Devices and Kinematic Transfer Shaft

Figure 19A:
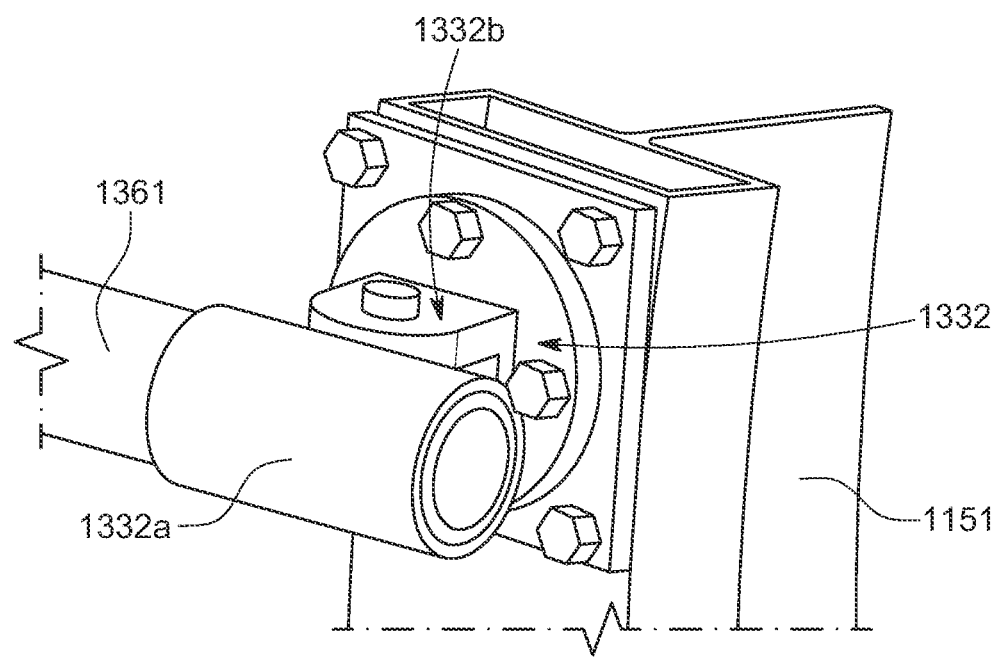
FIGS. 19a and 19b are perspective views of the elements forming a kinematic coupling device according to the third embodiment of the present invention.
Figure 19B:
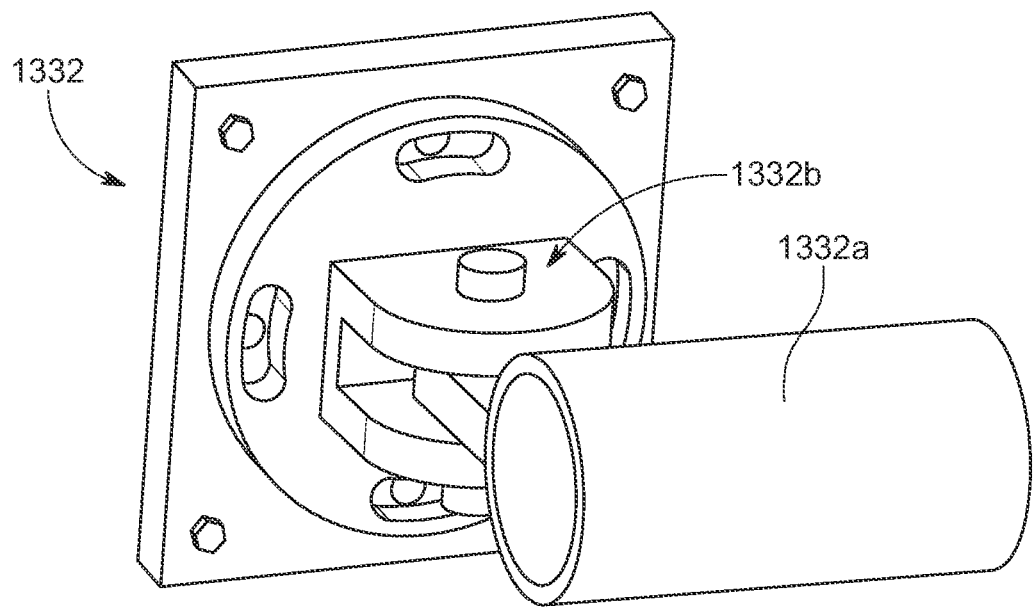

FIGS. 19a and 19b are two perspective views of the first pivot articulation device 1332 comprising a tube 1332a and an articulation 1332b and mechanically connected to the arcuate member 1151 of the second support arch 1150.

In FIG. 19a, the first kinematic transfer shaft 1361 is inserted in the first pivot articulation device 1332. The diameter of the kinematic transfer shaft 1361 is advantageously slightly smaller than the inside diameter of the tube 1332a so as to be able to slide inside it. This sliding thus enables the kinematic coupling device 1300 of this third embodiment to have mobility in translation.

In FIG. 19b, only the first pivot articulation device 1332 with the tube 1332a and the articulation 1332b are shown.

This articulation 1332*b* enables rotation about two mutually perpendicular axes on the first kinematic transfer shaft 1361.

Nonlimiting Embodiments

Figure 20A:
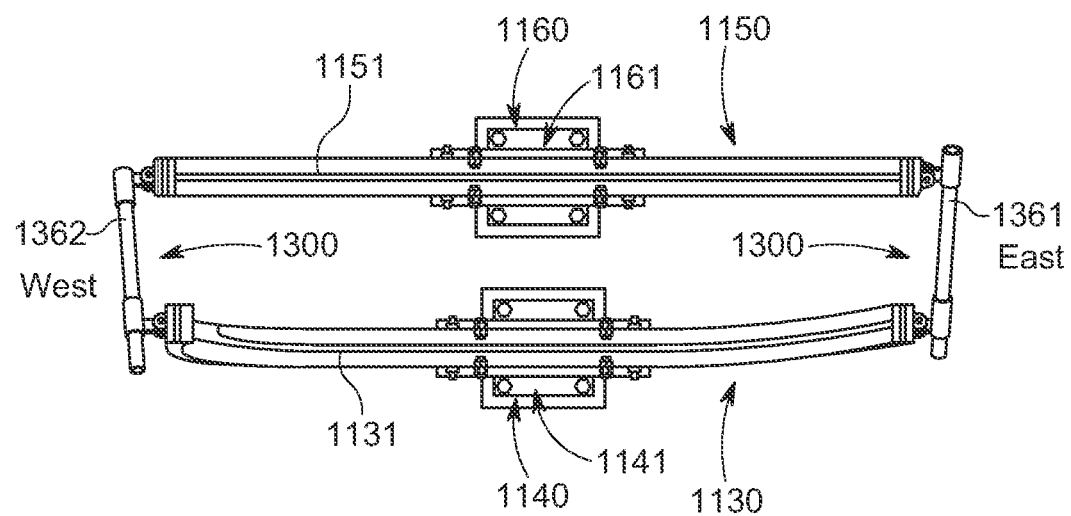
FIGS. 20a, 20b and 20c show an application of a kinematic coupling device according to the third embodiment of the present invention.
Figure 20B:
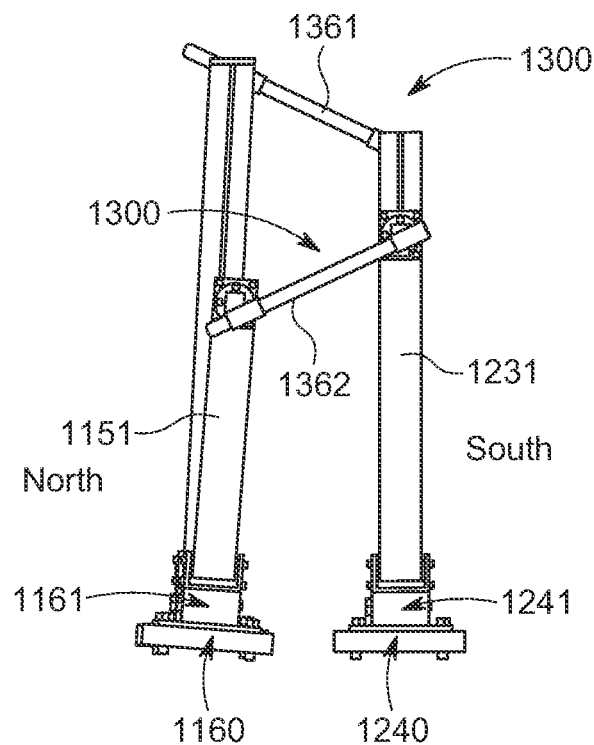
Figure 20C:
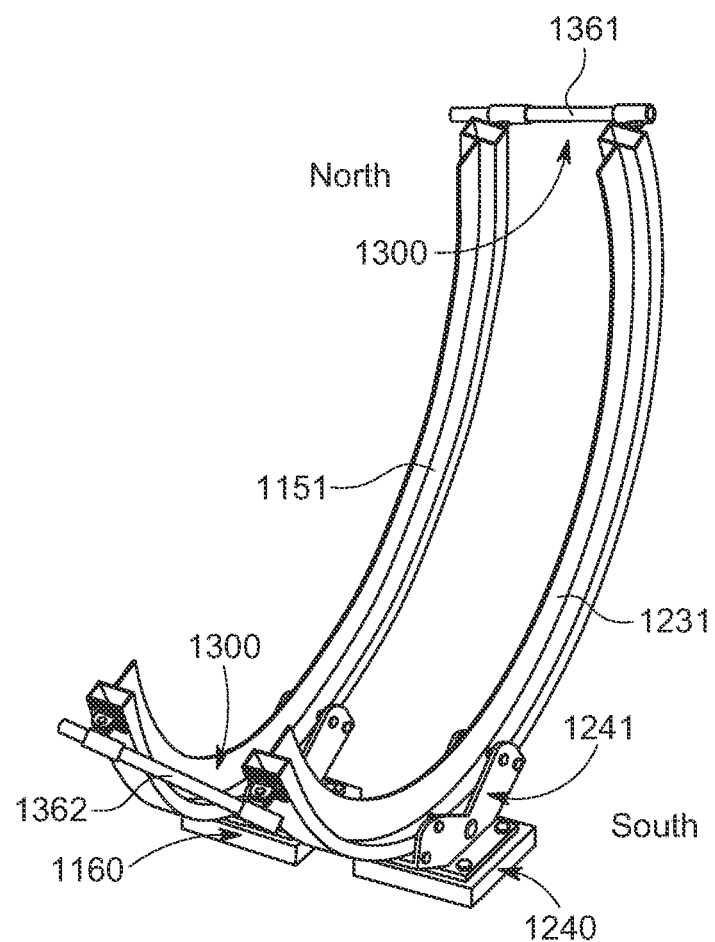

FIGS. 20*a*, 20*b* and 20*c* are three views of an example of application of the third embodiment of the present invention.

FIG. 20*a* is a view from above of FIG. 20*c* which for its part is a perspective view, whilst FIG. 20*b* is a profile view of that same view.

In these three figures, an altitude difference is present between the drive module 1100 and the additional module 1200. This altitude difference causing a misalignment of the rotation axes 1141*a* and 1241*a* of each of the modules 1100 and 1200, the kinematic coupling devices 1300 in this third embodiment are used in order to enable the additional module 1200 to track the movement of the sun in the sky in a synchronized manner kinematically coupled to the rotation of the drive module 1100 about its principal rotation axis 1141*a*.

These three figures also make it possible to emphasize the adaptability and the degrees of freedom of these two kinematic coupling devices 1300.

The present invention may optionally, but preferably, comprise ground suspensions 1170, 1270 configured to cooperate with this kinematic coupling device 1300 in order to enhance the effectiveness of this third embodiment.

Fourth Embodiment

There will now be described a nonlimiting fourth embodiment of the present invention. The features of this fourth embodiment remain compatible with the features described above. Thus all the features, functions and advantages described with reference to the previous embodiments are combined and applied to the following embodiment.

Figure 21A:
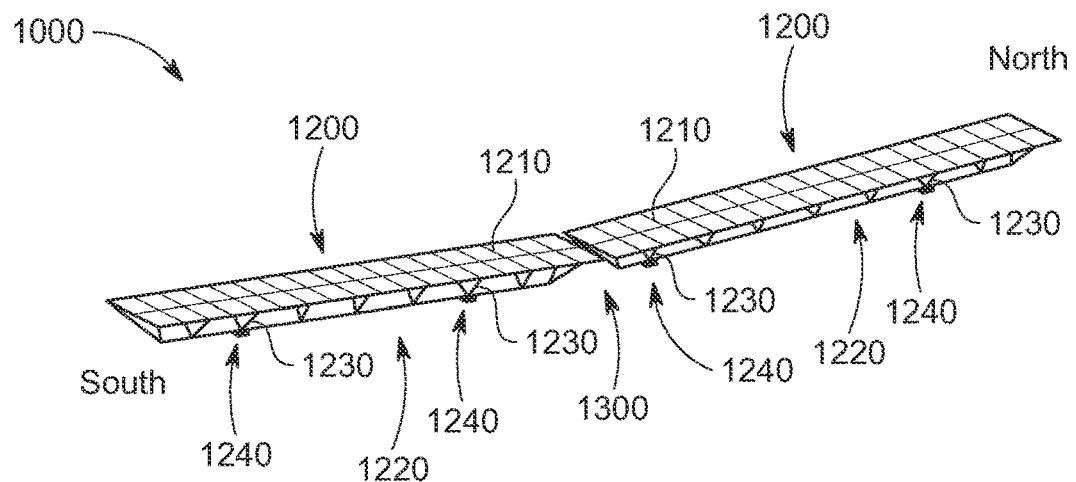
FIGS. 21a and 21b show a use of a fourth embodiment of the present invention.
Figure 21B:
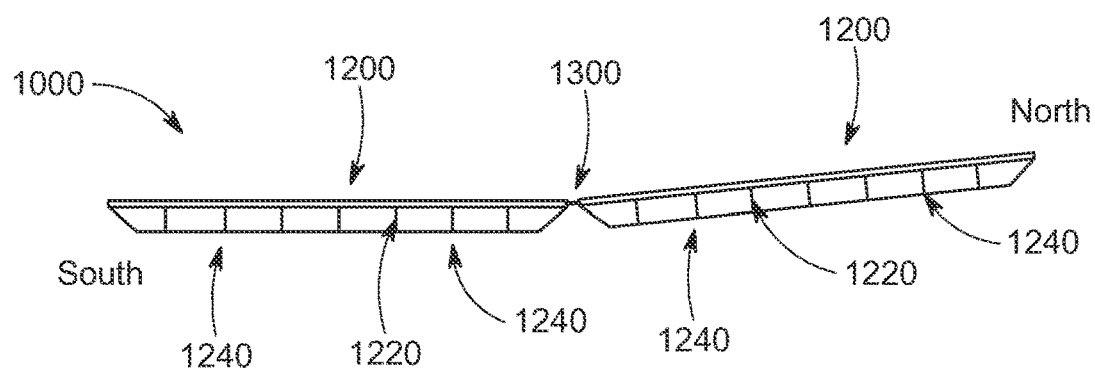

FIGS. 21*a* and 21*b* show two situations of application of the present invention, and more particularly of a kinematic coupling device 1300 in this fourth embodiment.

FIG. 21*a* is an isometric view of two additional modules 1200 having a non-zero altitude difference relative to one another. The two additional modules 1200 are kinematically coupled to one another by two kinematic coupling devices 1300.

FIG. 21*b* is a profile view of a solar tracker 1000 based on two additional modules 1200. Each of these additional modules 1200, as described above, comprises an additional table 1210 mounted on an additional lattice structure 1220 comprising three additional beams 1223*a*, 1223*b* and 1223*c* and two additional support arches 1230.

In this fourth embodiment, the two additional support arches 1230 are disposed between the middle and the two ends of the additional lattice structure 1220 inclusive. In a preferred embodiment, each additional support arch 1230 is disposed at a position between one third and one half inclusive of the distance separating one end of the additional lattice structure 1220 from its middle.

This position of the support arches relative to the lattice structure and to the kinematic coupling devices makes it possible to reduce the mechanical forces to which the solar tracker is subjected, making its manufacture less costly and its assembly easier.

This also makes it possible to retain the one-piece structure of each beam.

As before, each additional support arch 1230 rests on an additional ground support 1240 that may optionally be disposed on additional ground suspensions 1270, not shown, themselves optionally placed on support blocks 2200, not shown.

In an embodiment compatible with the previous embodiments, each support arch may rest on an adjustment system for the angle vane so as to compensate the altitude difference and to ensure a functional clearance and to enable the female parts of the kinematic coupling devices to remain well aligned with the facing male parts.

In a particularly advantageous manner, the kinematic coupling devices of the previous embodiments are compatible with the position of the support arches relative to the lattice structure in this fourth embodiment.

FIG. 22*a* is a perspective view of a lattice structure 1120 comprising a first end 1121 and a second end 1122. As indicated above, a support arch 1130, 1150 is disposed between the middle of the lattice structure 1120 and each of the ends 1121 and 1122 of the lattice structure 1120.

The support arches 1130, 1150, 1230 have similar shapes to the previous embodiments and may be closed by a diameter. In this fourth embodiment, this diameter is preferably formed by a small beam 1124, 1224 of the lattice structure 1120, 1220.

Figure 22B:
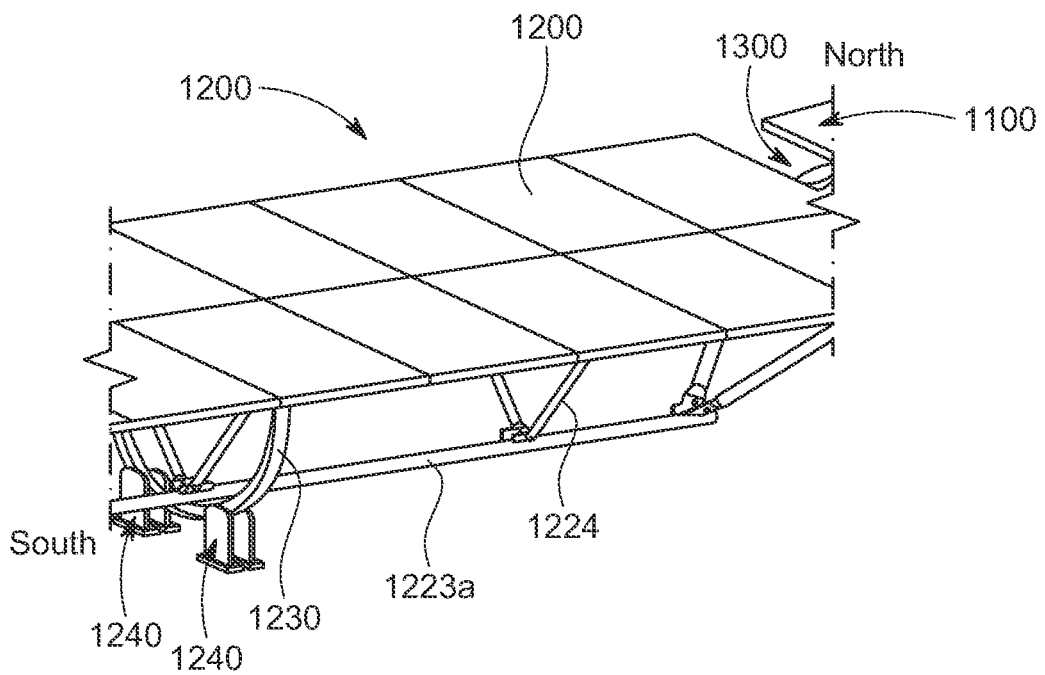

In FIG. 22*b*, the additional support arch 1230 rests on an additional ground support 1240 similar to those of the previous embodiments.

Figure 22C:
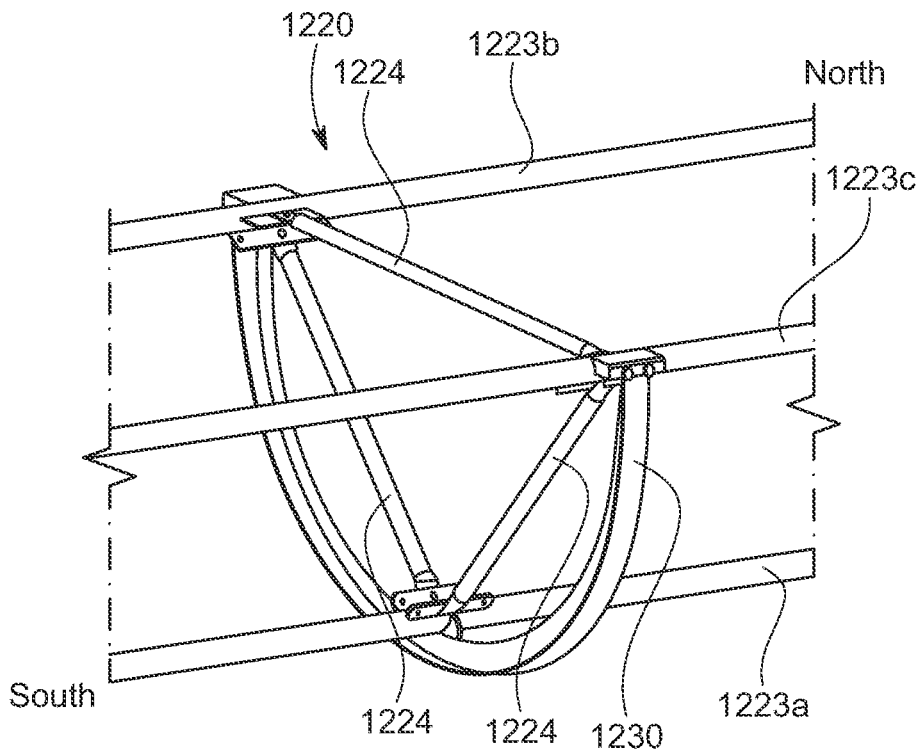

In FIG. 22*c*, the additional support arch is in the form of a rolling strip configured to cooperate with an additional rotation kinematic guide device, not shown.

Universal Joint Connection Mobile in Translation

FIGS. 23*a*, 23*b*, 24*a* and 24*b* are views of a kinematic coupling device 1300 in accordance with this fourth embodiment positioned between a drive module 1100 and an additional module 1200.

Figure 23A:
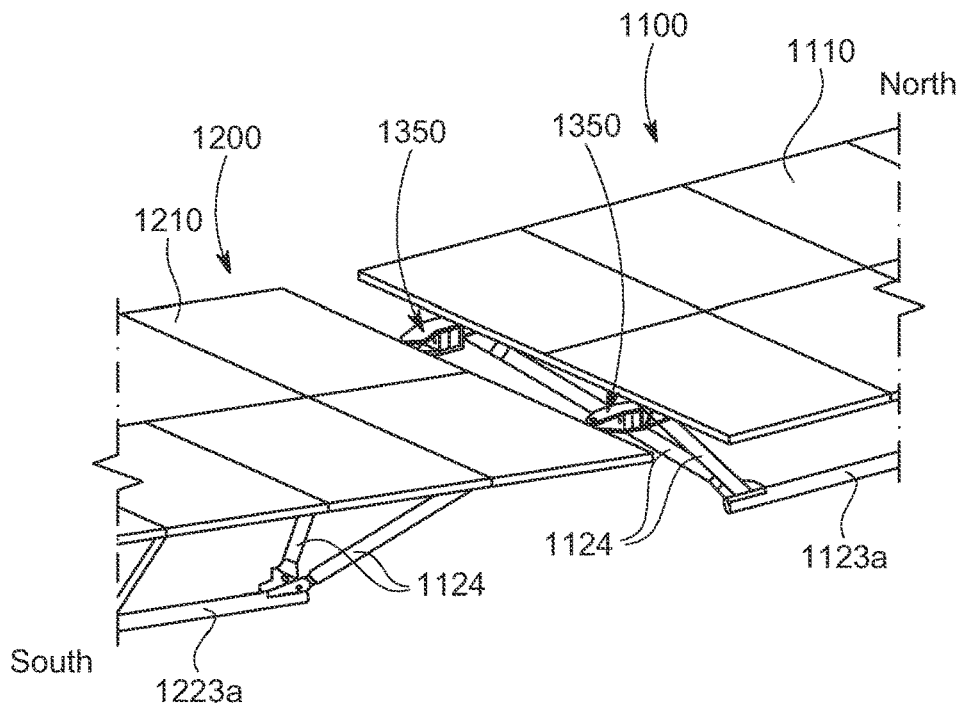
FIGS. 23a and 23b show use of two universal joint connections mobile in translation according to the fourth embodiment of the present invention.
Figure 23B:
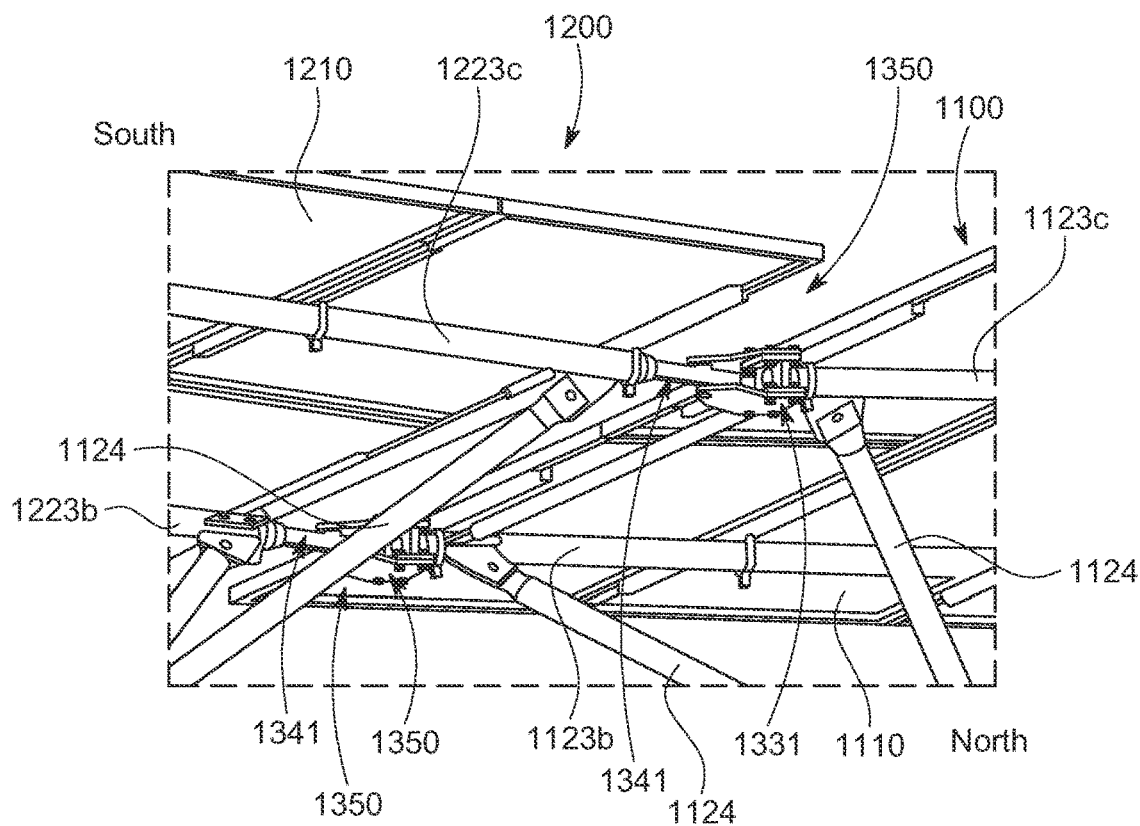

FIGS. 23*a* and 23*b* are two perspective views of this kinematic coupling device 1300 in accordance with this fourth embodiment. In an identical manner to the first embodiment, this kinematic coupling device 1300 is formed of a universal joint connection 1350 mobile in translation.

In this fourth embodiment, this kinematic coupling device 1300 comprises a first part 1330 and a second part 1340.

Each of these parts is advantageously fastened to a beam 1123 and 1223. Thus the first part 1330 is advantageously fastened to a beam 1123 of the lattice structure 1120 of the drive module 1100 and the second part 1340 is advantageously fastened to an additional beam 1223 of the additional lattice structure 1220 of the additional module 1200.

In FIG. 23*b* it will be noted that the drive module 1100 and the additional module 1200 are kinematically coupled via two kinematic coupling devices 1300 each comprising a connection 1350 mobile in translation formed at least in part of a female part 1331 and a male part 1341.

Figure 24A:
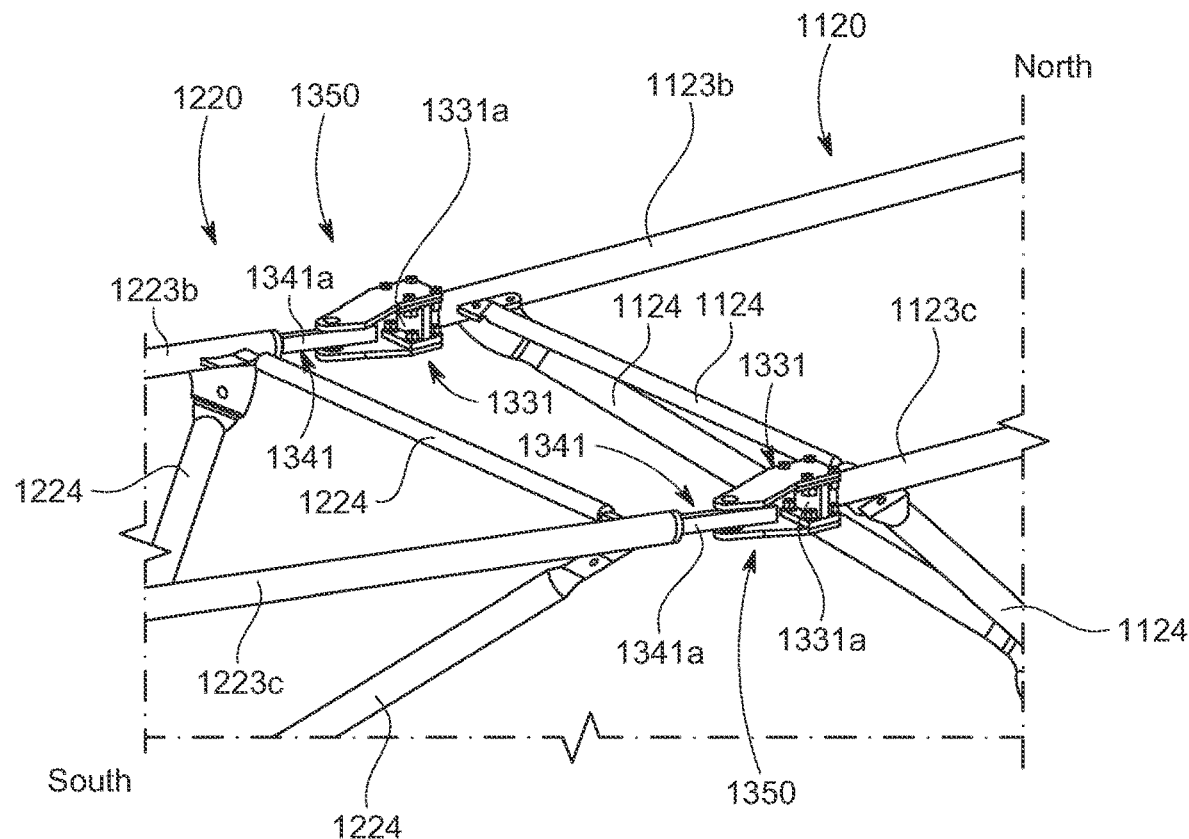
FIGS. 24a and 24b show use of two universal joint connections mobile in translation according to the fourth embodiment of the present invention.
Figure 24B:
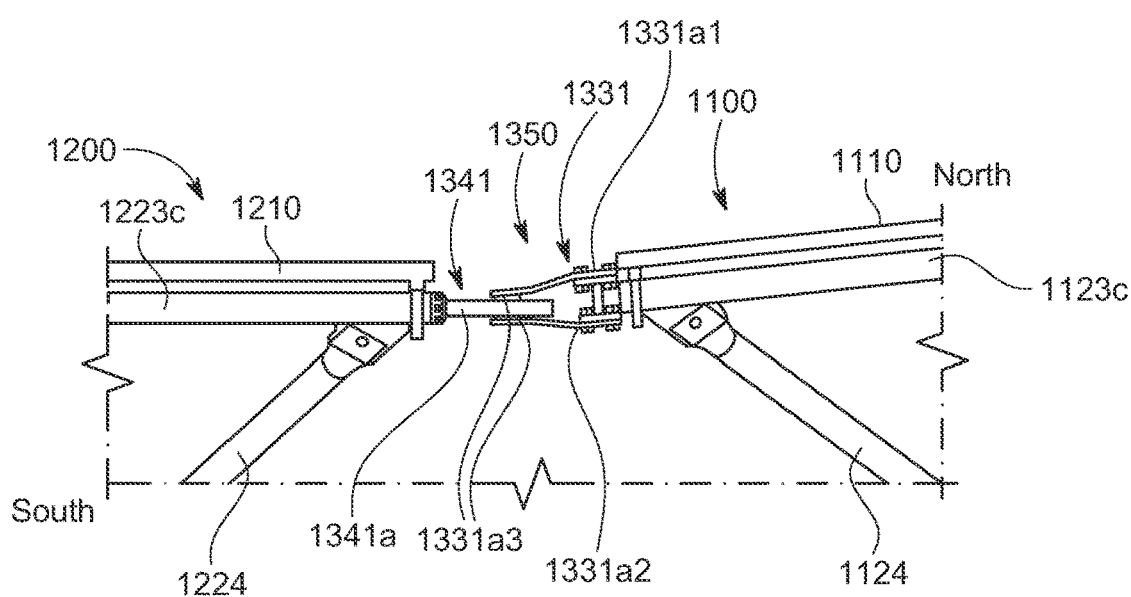

In FIGS. 24*a* and 24*b*, and in a similar manner to the first embodiment, the first part 1330 comprises a preferably metal jaw 1331*a* advantageously comprising shoes 1331*a*3 configured to limit friction and heating between the male part 1341 and the female part 1331. The shoes 1331*a*3 are preferably of metal, preferably of bronze, advantageously of any type of material having a low coefficient of friction such as PTFE for example. In this jaw 1331*a* is disposed a preferably metal tongue 1341*a* forming at least in part the second part 1340 of the universal joint connection 1350 mobile in translation.

The jaw 1331*a* advantageously comprises any type of mechanical interface that makes it possible to limit the friction on the tongue 1341*a* (ball thrust bearing type for example . . . ). By way of nonlimiting example, the jaw 1331*a* may comprise metal spring type materials, that is to say treated steel or a composite material.

This produces the universal joint connection 1350 mobile in translation. Indeed the tongue 1341*a* mechanically connected to an additional beam 1223 of the additional lattice structure 1220 is configured to cooperate with the jaw 1331*a* mechanically connected to a beam 1123 of the lattice structure 1120. In this configuration and as in the first embodiment the connection 1350 formed in this way has degrees of freedom in rotation and in translation: indeed the tongue 1341*a* can move in the jaw 1331*a* with movements in translation and also in rotation on the same terms as a universal joint. Indeed, the universal joint connection 1350 mobile in translation enables a relative angle to exist between the tongue 1341*a* and the jaw 1331*a*.

The tongue 1341*a* may preferably comprise rigid steel.

Surprisingly, this universal joint connection 1350 mobile in translation produced at least in part by the coupling of the jaw 1331*a* and the tongue 1341*a* provides the transmission of high forces between the modules whilst being very robust. Moreover this universal joint connection 1350 mobile in translation enablers relative movement in translation of the jaw 1331*a* and the tongue 1341*a* along numerous translation axes. Indeed, the relative movement in translation of the jaw 1331*a* and the tongue 1341*a* is not limited to only one translation axis.

Shoes 1331*a*3, preferably of bronze or of a composite material aiming to reduce friction, are advantageously disposed between the jaw 1331*a* and the tongue 1341*a* in order to limit the mechanical friction stresses.

The shoes 1331*a*3 preferably comprise a material having a ductility lower than that of the material or materials constituting the tongue 1341*a* and/or the jaw 1331*a*.

FIG. 24*b* is a profile view of the universal joint connection 1350 mobile in translation in this fourth embodiment. Note that in this figure the jaw 1331*a*, that is to say the first part 1330 of the kinematic coupling device 1300, comprises an upper part 1331*a*1 and a lower part 1331*a*2 which are joined to form the jaw 1331*a*. Said jaw 1331*a*1 may preferably be made of a material conferring elasticity on it, for example of spring steel type or a composite material assembly, whilst enabling transmission of the forces linked to torques and to stresses to which the structure is subjected.

By way of nonlimiting example, the tongue comprises at least one material from at least the following materials: an elastic material or a material imparting elasticity to the system.

Figure 25A:
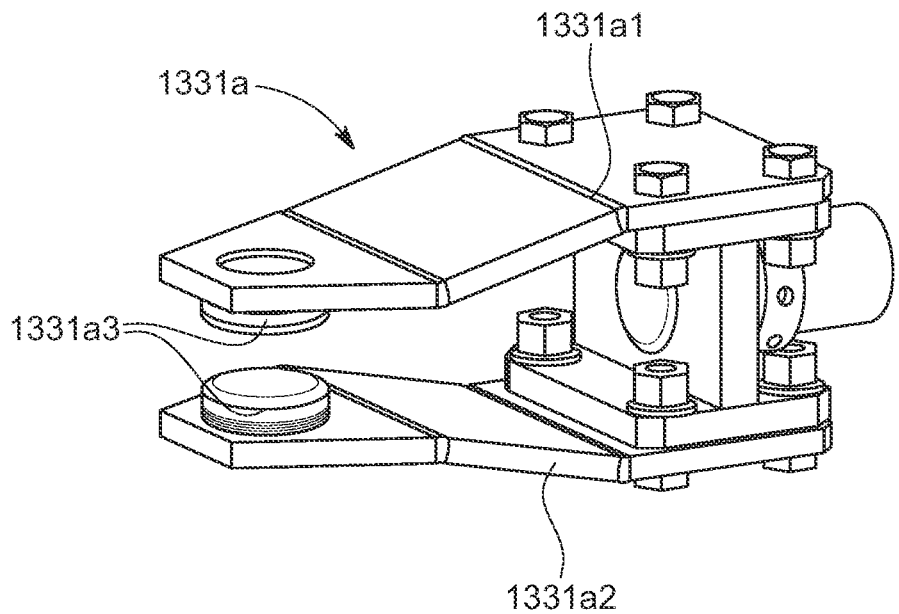
FIGS. 25a and 25b are perspective views of the elements forming the female part of the universal joint connection mobile in translation according to the fourth embodiment of the present invention.
Figure 25B:
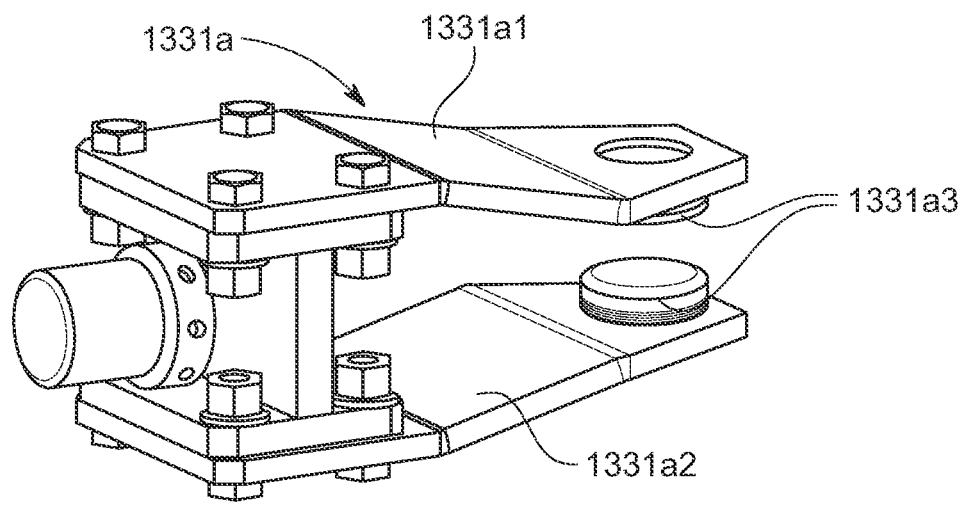

FIGS. 25*a* and 25*b* are two perspective views of the jaw 1331*a* in this fourth embodiment. As for the first embodiment, the upper part 1331*a*1 of the jaw 1331*a* is a preferably one-piece mechanical part. The lower part 1331*a*2 of the jaw 1331*a* advantageously corresponds to a mirror image of the upper part 1331*a*1 of the jaw 1331*a*. During production of the present invention this enables production of only one type of part able to serve as the upper part 1331*a*1 or the lower part 1331*a*2.

Thus this fourth embodiment differs from the first embodiment in that the support arches are disposed between the middle and the ends of each lattice structure and preferably at a distance from said middle preferably between one third and one half inclusive of the half-length of the lattice structure.

In this fourth embodiment, each kinematic coupling device 1300 is carried by the lattice structures 1120 and 1220. The degrees of freedom in movement that this fourth embodiment confers on the solar tracker 1000 are identical to those of the previous first embodiment.

Example of an Embodiment of a Cantilevered Lattice Structure

There will now be described a nonlimiting embodiment of the present invention in which the lattice structure is cantilevered. The features of this embodiment remain compatible with the features described above. Thus all the features, functions and advantages described with reference to the previous embodiments may be combined and applied to the following embodiment.

FIGS. 21*a* and 21*b* show two additional modules 1200 comprising tables 1210 each mounted on a lattice structure 1220 cantilevered from ground supports 1240.

In one embodiment, each additional support arch 1230 is disposed at a distance L3 from the nearest end 1221 of the additional lattice structure 1220, with L3 being at least equal to $\frac{1}{10}$, preferably $\frac{1}{5}$ and advantageously $\frac{1}{3}$ of the distance separating two ends 1221 of the additional lattice structure 1220 in the additional direction.

FIG. 22*a* is a perspective view of a lattice structure 1120 configured to be cantilevered from a first ground support 1140 and a second ground support 1160 by means of a first support arch 1130 and a second support arch 1150 both disposed at a distance from the first end 1121 and the second end 1122 of the lattice structure 1120. Thus the first support arch 1130 and the second support arch 1150 arch are disposed between the middle of the lattice structure 1120 and each of the ends 1121 and 1122 of the lattice structure 1120.

In one embodiment, the first support arch 1130 is disposed at a distance L1 from the first end 1121 of the lattice structure 1120 and the second support arch is disposed at a distance L2 from the second end 1122 of the lattice structure 1120, with L1 and L2 being at least equal to $\frac{1}{10}$, preferably $\frac{1}{5}$ and advantageously $\frac{1}{3}$ of the distance separating the first end 1121 and the second end 1122 of the lattice structure 1120.

The support arches 1130, 1150, 1230 have shapes similar to the previous embodiments and may be closed by a diameter. In this embodiment, this diameter is preferably formed by a small beam 1124, 1224 of the lattice structure 1120, 1220.

This cantilevered arrangement, among other things, enables each module to withstand static and dynamic mechanical stresses effectively.

The invention is not limited to the embodiments described, but encompasses any embodiment within the scope of the claims.

REFERENCES

1000. Solar tracker
  1100. Drive module
    1110. Table
      1111. Principal direction
      1112. Solar energy collector device
        1112*a*. Photovoltaic panel
    1120. Lattice structure
      1121. First end
      1122. Second end
      1123. Beam(s)
        1123*a*. First beam
        1123*b*. Second beam
        1123*c*. Third beam
      1124. Small beam(s)
      1125. Tie-rod(s)
    1130. First support arch 1131. Arcuate member of the first support arch
1132. Diameter of the first support arch
1140. First ground support
　1141. Rotation kinematic drive device
　　1141a. Principal rotation axis
　　1141b. Drive system
　　1141c. Pinion
　　1141d. Rack
　1142. Braking device
　　1142a. Upper braking roller(s)
　　1142b. Lower braking roller(s)
　1143. Rotation kinematic accompaniment device
　　1143a. Upper accompanying roller(s)
　　1143b. Lower accompanying roller(s)
1150. Second support arch
　1151. Arcuate member of the second support arch
　1152. Diameter of the second support arch
1160. Second ground support
　1161. Rotation kinematic guide device
　　1161a. Upper guide roller(s) of the rotation kinematic guide device
　　1161b. Lower guide roller(s) of the rotation kinematic guide device
　1162. Pivot support
1170. Ground suspension
　1171. U shape ground suspension
　　1171a. Base of the U
　　1171b. First branch of the U
　　1171c. Second branch of the U
　1172. Ground suspension of the first ground support
　1173. Ground suspension of the second ground support
　1174. Common ground suspension
　　1174a. Base of the common ground suspension
　　1174b. First branch of the common suspension
　　1174c. Second branch of the common suspension
　　1174d. First plate of the common suspension
　　1174e. Second plate of the common suspension
1200. Additional module
　1210. Additional table
　　1211. Additional direction
　　1212. Additional solar energy collector device
　　　1212a. Additional photovoltaic panel
　1220. Additional lattice structure
　　1221. End of the additional lattice structure
　　1223. Additional beam(s)
　　　1223a. First additional beam
　　　1223b. Second additional beam
　　　1223c. Third additional beam
　　1224. Additional small beam(s)
　　1225. Additional tie-rod(s)
　1230. Additional support arch
　　1231. Arcuate member of the additional support arch
　　1232. Diameter of the additional support arch
　1240. Additional ground support
　　1241. Additional rotation kinematic guide device
　　　1241a. Additional rotation axis
　　　1241b. Upper guide roller(s) of the additional rotation kinematic guide device
　　　1241c. Lower guide roller(s) of the additional rotation kinematic guide device
　　1242. Additional pivot support
　1270. Additional ground suspension of the additional ground support
1300. Kinematic coupling device
　1310. Secondary translation axis
　1320. Secondary rotation axis
　1330. First part
　　1331. Female part
　　　1331a. Jaw
　　　　1331a1. Upper part of the jaw
　　　　1331a2. Lower part of the jaw
　　　　1331a3. Shoe(s)
　　　1331b. Sheath
　　1332. First pivot articulation device
　　　1332a. Tube of the first pivot articulation device
　　　1332b. Articulation of the first pivot articulation device
　1340. Second part
　　1341. Male part
　　　1341a. Tongue
　　　1341b. Cylinder mounted on a spherical structure
　　1342. Second pivot articulation device
　　　1342a. Tube of the second pivot articulation device
　　　1342b. Articulation of the second pivot articulation device
　1350. Universal joint connection mobile in translation
　　1351. First universal joint connection mobile in translation
　　1352. Second universal joint connection mobile in translation
　　1353. Third universal joint connection mobile in translation
　　1354. Bottom universal joint connection mobile in translation
　　1355. Top universal joint connection mobile in translation
　1360. Kinematic transfer shaft
　　1361. First kinematic transfer shaft
　　1362. Second kinematic transfer shaft
　1370. Beam/support arch pivot connection
　　1371. Vertical beam/support arch pivot connection
　　1372. Horizontal beam/support arch pivot connection
2000. Terrain
　2100. Altitude difference
　2200. Support block

The invention claimed is:

1. A solar tracker comprising at least:
A drive module comprising at least:
　a mobile device comprising at least:
　　a table extending longitudinally in a principal direction and comprising at least one solar energy collector device;
　　a support structure extending longitudinally in said principal direction and supporting said table;
　　a first support arch configured to support the support structure, said first support arch having two ends fastened to the support structure;
　a first ground support configured to carry said first support arch, wherein said first ground support comprises a rotation kinematic drive device for driving rotation of said mobile device relative to the first ground support;
At least one additional module configured to be driven by the drive module, each additional module comprising at least:
　an additional mobile device comprising at least:
　　an additional table extending longitudinally in an additional direction comprising at least one additional solar energy collector device;

an additional support structure extending longitudinally in said additional direction and supporting said additional table;
an additional support arch configured to support said additional support structure, said additional support arch having two ends fastened to the additional support structure;
an additional ground support configured to carry said additional support arch; wherein:
Said rotation kinematic drive device is configured to directly drive the first support arch with a first kinematic movement relative to said first ground support about at least one principal rotation axis;
Said additional ground support comprises a rotation guide device configured to guide the additional support arch in a second kinematic movement relative to said additional ground support about at least one additional rotation axis, said at least one additional rotation axis being either one of the same as the at least one principal rotation axis, or different from said at least one principal rotation axis;
Said solar tracker comprises at least one kinematic coupling device, entirely supported by said mobile device and said additional mobile device, for coupling said drive module with said additional module, and configured so that the second kinematic movement is a function of the first kinematic movement;
said kinematic coupling device comprising at least one first part that is fastened to the mobile device of the drive module and at least one second part that is fastened to the additional mobile device of the additional module;
the first part and the second part are adapted to cooperate so as:
to drive the additional mobile device in rotation about the additional rotation axis when the mobile device of the drive module is driven in rotation by the rotation kinematic drive device about the principal rotation axis,
and such that said at least one first part is configured to move relative to said at least one second part, in translation, so as to allow relative movement between said mobile device and said additional mobile device,
wherein said kinematic coupling device acts as at least one universal joint connection mobile in translation along the translation axis relative to the additional module and the drive module,
wherein said at least one first part is either one of a male or female part fastened to said mobile device of the drive module, and wherein said at least one second part is the other of either one of a male or female part fastened to the additional mobile device of the additional module,
wherein said at least one female part comprises a jaw formed as two opposing flat tapered arms ending in a connection opening and wherein said at least one male part comprises a single flat tongue configured to fit between said connection opening of said two opposing arms of said jaw, with at least two shoes on either side of said single flat tongue of said male part, each of which abuts one of opposing flat tapered arms of said jaw of said female part, thereby fitting tightly within, in a manner enabling sliding of said tongue in the jaw.

2. The solar tracker as claimed in claim 1, in which:
Said first ground support comprises rollers configured to support on their own the first support arch, the first support arch extending primarily from the first ground support to the support structure;
Said additional ground support comprises at least additional rollers configured to support on their own the additional support arch, the additional support arch extending primarily from the additional ground support to the additional support structure, the solar tracker being configured so that the rollers and the additional rollers support on their own respectively the mobile device and the additional mobile device.

3. The solar tracker as claimed in claim 1, in which the second kinematic movement and the first kinematic movement share at least one common kinematic characteristic from at least one of the following kinematic characteristics: rotation angle, rotation amplitude, acceleration, speed, movement vector.

4. The solar tracker as claimed in claim 1, in which:
said at least one first part extends primarily in one of said principal direction and said additional direction,
said at least one second part extends primarily in the other of said principal direction and said additional direction.

5. The solar tracker as claimed in claim 1, wherein said shoes are constructed of a material having a ductility lower than the materials constituting the tongue and the jaw.

6. The solar tracker as claimed in claims 1 in which the mobile device comprises a second support arch configured to support the support structure and in which the kinematic coupling device comprises at least one kinematic transfer shaft, a first pivot articulation device and a second pivot articulation device, the first pivot articulation device making a mechanical connection between the second support arch and said kinematic transfer shaft and the second pivot articulation device making a mechanical connection between the additional support arch and said kinematic transfer shaft.

7. The solar tracker as claimed in claim 1 in which the mobile device comprises a second support arch configured to support the support structure, and in which at least one support structure selected among said support structure and said additional support structure, and at least one support arch selected among said first support arch, said second support arch, and said additional support arch are mechanically connected to one another by at least one pivot connection enabling a degree of freedom in rotation between said at least one support structure and said at least one support arch.

8. The solar tracker as claimed in claim 1 in which at least one of the first ground support and the additional ground support is or are disposed on at least one ground suspension having an elasticity in compression along at least one vertical axis.

9. The solar tracker as claimed in claim 1 in which the mobile device comprises a second support arch that rests on at least one second ground support of the drive module, said second ground support comprising at least one rotation guide device configured to guide the second support arch in said first kinematic movement relative to said second ground support about said principal rotation axis.

10. The solar tracker as claimed in claim 1 in which the rotation guide device comprises at least two rollers configured to be in contact with the additional support arch so as to guide said additional support arch in said second kinematic movement relative to said at least one additional ground support about said additional rotation axis.

11. The solar tracker as claimed in claim 1 in which said at least one first ground support comprises at least one pinion and in which the first support arch comprises at least one rack disposed on at least a part of the first support arch oriented toward the ground, said at least one pinion and said at least one rack being configured to drive kinematically in rotation said first support arch relative to said at least one first ground support about said principal rotation axis.

12. The solar tracker as claimed in claim 1 in which said support structure and said additional support structure are lattice structures.

13. The solar tracker as claimed in claim 1, said kinematic coupling device is coupled to said first support arch of said first mobile device and said additional support arch of said additional mobile device.

14. The solar tracker as claimed in claim 1, wherein said shoes are made from a material selected from the group consisting of bronze and PTFE.

* * * * *